US012365965B2

(12) United States Patent
Pun et al.

(10) Patent No.: US 12,365,965 B2
(45) Date of Patent: Jul. 22, 2025

(54) AL—MG—SI BASED NEAR-EUTECTIC ALLOY COMPOSITION FOR HIGH STRENGTH AND STIFFNESS APPLICATIONS

(71) Applicant: Divergent Technologies, Inc., Los Angeles, CA (US)

(72) Inventors: Chan Cheong Pun, Costa Mesa, CA (US); Michael Thomas Kenworthy, Rancho Palos Verdes, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 17/856,406

(22) Filed: Jul. 1, 2022

(65) Prior Publication Data
US 2023/0011781 A1    Jan. 12, 2023

Related U.S. Application Data

(60) Provisional application No. 63/217,749, filed on Jul. 1, 2021.

(51) Int. Cl.
*C22C 21/08* (2006.01)
*B22F 10/28* (2021.01)
*B33Y 10/00* (2015.01)
*B33Y 70/00* (2020.01)
*B33Y 80/00* (2015.01)

(52) U.S. Cl.
CPC .............. *C22C 21/08* (2013.01); *B22F 10/28* (2021.01); *B22F 2301/052* (2013.01); *B33Y 10/00* (2014.12); *B33Y 70/00* (2014.12); *B33Y 80/00* (2014.12)

(58) Field of Classification Search
CPC ....... C22C 21/08; C22C 1/0416; C22C 21/00; B22F 2301/052
See application file for complete search history.

(56) References Cited

U.S. PATENT DOCUMENTS

| | | |
|---|---|---|
| 3,879,194 A | 4/1975 | Morris et al. |
| 3,958,987 A | 5/1976 | Chia et al. |
| 4,021,271 A | 5/1977 | Roberts |
| 4,049,474 A | 9/1977 | Zakharov et al. |
| 4,531,977 A | 7/1985 | Mishima et al. |
| 4,828,008 A | 5/1989 | White et al. |

(Continued)

FOREIGN PATENT DOCUMENTS

| | | |
|---|---|---|
| CN | 101233252 A | 7/2008 |
| CN | 102312135 A | 1/2012 |

(Continued)

OTHER PUBLICATIONS

US 9,202,136 B2, 12/2015, Schmidt et al. (withdrawn)

(Continued)

*Primary Examiner* — Anthony M Liang
(74) *Attorney, Agent, or Firm* — ArentFox Schiff LLP

(57) ABSTRACT

Alloy materials and three-dimensional (3-D) printed alloys are disclosed. An alloy in accordance with an aspect of the present disclosure comprises aluminum, magnesium, and silicon wherein a composition of the alloy comprises from at least 5 percent (%) by weight to 20% by weight of silicon and from at least 7% by weight to 10% by weight of magnesium.

20 Claims, 62 Drawing Sheets

(56) References Cited

U.S. PATENT DOCUMENTS

| | | |
|---|---|---|
| 4,869,870 A | 9/1989 | Rioja et al. |
| 4,973,522 A | 11/1990 | Jordan et al. |
| 5,203,226 A | 4/1993 | Hongou et al. |
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,342,112 B1 | 1/2002 | Barlat et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,908,516 B2 | 6/2005 | Hehmann et al. |
| 6,919,035 B1 | 7/2005 | Clough |
| 6,926,755 B2 | 8/2005 | Shamblen et al. |
| 6,926,970 B2 | 8/2005 | James et al. |
| 6,955,785 B2 | 10/2005 | Saga et al. |
| 7,152,292 B2 | 12/2006 | Hohmann et al. |
| 7,177,384 B2 | 2/2007 | Murakami et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,713,470 B2 | 5/2010 | Toyoda et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |

(56) References Cited

U.S. PATENT DOCUMENTS

| | | |
|---|---|---|
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,072,322 B2 | 9/2018 | Park |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |

(56) References Cited

U.S. PATENT DOCUMENTS

| | | |
|---|---|---|
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 11,410,787 B2 | 8/2022 | Araki et al. |
| 2002/0000270 A1 | 1/2002 | Doko et al. |
| 2002/0102179 A1 | 8/2002 | Murai et al. |
| 2005/0271543 A1 | 12/2005 | Pfannen-Mueller et al. |
| 2006/0108783 A1 | 5/2006 | Ni et al. |
| 2006/0169371 A1 | 8/2006 | Cosse et al. |
| 2007/0000583 A1 | 1/2007 | Rioja et al. |
| 2008/0175750 A1 | 7/2008 | Li et al. |
| 2008/0193322 A1 | 8/2008 | Gibson et al. |
| 2010/0054985 A1 | 3/2010 | Dieringa et al. |
| 2010/0180989 A1 | 7/2010 | Ahmad et al. |
| 2011/0259479 A1 | 10/2011 | Telioui et al. |
| 2012/0000578 A1 | 1/2012 | Wang et al. |
| 2013/0146186 A1 | 6/2013 | Telioui et al. |
| 2013/0240095 A1 | 9/2013 | Pandey |
| 2014/0277669 A1 | 9/2014 | Nardi et al. |
| 2017/0069403 A1 | 3/2017 | Yoshida et al. |
| 2017/0113344 A1 | 4/2017 | Schönberg |
| 2017/0121802 A1 | 5/2017 | Kamat et al. |
| 2017/0165795 A1 | 6/2017 | Lenczowski |
| 2017/0182595 A1 | 6/2017 | Nelson et al. |
| 2017/0198152 A1 | 7/2017 | Blumenau et al. |
| 2017/0341309 A1 | 11/2017 | Piepenbrock et al. |
| 2018/0010215 A1 | 1/2018 | Sanaty-Zedah et al. |
| 2018/0298478 A1 | 10/2018 | Shih et al. |
| 2019/0161836 A1 | 5/2019 | Martin et al. |
| 2019/0169717 A1 | 6/2019 | Li et al. |
| 2019/0249285 A1 | 8/2019 | Bes et al. |
| 2019/0271061 A1 | 9/2019 | Tang et al. |
| 2019/0368008 A1 | 12/2019 | Araki et al. |
| 2020/0063242 A1 | 2/2020 | Valls Angles |
| 2020/0232070 A1 | 7/2020 | Pun et al. |
| 2020/0232071 A1 | 7/2020 | Chaudhury et al. |
| 2020/0276638 A1 | 9/2020 | King et al. |
| 2022/0161353 A1 | 5/2022 | Zrodowski |
| 2022/0195561 A1 | 6/2022 | Pun et al. |
| 2022/0305554 A1 | 9/2022 | Bielecki et al. |

FOREIGN PATENT DOCUMENTS

| | | |
|---|---|---|
| CN | 102676855 A | 9/2012 |
| CN | 104561677 A | 4/2015 |
| CN | 105177368 A | 12/2015 |
| CN | 105734464 A | 7/2016 |
| CN | 106574329 A | 4/2017 |
| CN | 107299260 A | 10/2017 |
| CN | 108380865 A * | 8/2018 |
| CN | 108796320 A | 11/2018 |
| CN | 108884520 A | 11/2018 |
| CN | 110181193 A | 8/2019 |
| CN | 113528901 A | 10/2021 |
| EP | 1917373 A2 | 5/2008 |
| EP | 3137639 B1 | 1/2020 |
| FR | 3066129 A1 | 11/2018 |
| GB | 595929 A | 12/1947 |
| JP | H05179384 A | 7/1993 |
| JP | H10226839 A | 8/1998 |
| JP | 2001131670 A | 5/2001 |
| JP | 2003268476 A | 9/2003 |
| JP | 2005139537 A | 6/2005 |
| JP | 2005139538 A | 6/2005 |
| JP | 2007092117 A | 4/2007 |
| JP | 2008179838 A | 8/2008 |
| JP | 2015052131 A | 3/2015 |
| JP | 5985165 B2 | 9/2016 |
| JP | 2018184659 A | 11/2018 |
| JP | 2019160361 A | 9/2019 |
| KR | 20210113640 A | 9/2021 |
| WO | 1996036455 A1 | 11/1996 |
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007020041 A2 | 2/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2013144343 A1 | 10/2013 |
| WO | 2014016437 A1 | 1/2014 |
| WO | 2014114625 A1 | 7/2014 |
| WO | 2014187720 A1 | 11/2014 |
| WO | 2014195340 A1 | 12/2014 |
| WO | 2015193331 A1 | 12/2015 |
| WO | 2016032758 A1 | 3/2016 |
| WO | 2016116414 A1 | 7/2016 |
| WO | 2016145397 A1 | 9/2016 |
| WO | 2017036461 A1 | 3/2017 |
| WO | 2017077137 A2 | 5/2017 |
| WO | 2018155531 A1 | 8/2018 |
| WO | 2018185259 A1 | 10/2018 |

(56) References Cited

FOREIGN PATENT DOCUMENTS

| WO | 2019030248 | A1 | | 2/2019 | |
|---|---|---|---|---|---|
| WO | 2019042504 | A1 | | 3/2019 | |
| WO | 2019048010 | A1 | | 3/2019 | |
| WO | 2019048498 | A1 | | 3/2019 | |
| WO | 2019048680 | A1 | | 3/2019 | |
| WO | 2019048682 | A1 | | 3/2019 | |
| WO | 2019092641 | A1 | | 5/2019 | |
| WO | WO-2019109135 | A1 | * | 6/2019 | ............ B22F 10/00 |
| WO | 2019155180 | A1 | | 8/2019 | |
| WO | 2019161137 | A1 | | 8/2019 | |
| WO | WO-2020058646 | A1 | * | 3/2020 | ............ B22F 10/20 |
| WO | 2020150055 | A1 | | 7/2020 | |
| WO | 2020220143 | A1 | | 11/2020 | |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion in PCT/US2022/036020, mailed Sep. 27, 2022, 7 pages.
Office Action in JP2021541462, mailed Feb. 13, 2024, 7 pages.
Atlas Steels "Aluminum Alloy Data Sheet 5083", Oct. 2013, www.atlassteels.com.au, 3 pages.
Brodova et. al. "Effect of rapid hardening of melt, annealing, and severe plastic deformation on formation of scandium and zirconium aluminides in Al Mg Mn alloys," Metal Science and Heat Treatment, 2008, vol. 50, Nos. 9-10, pp. 495-501.
Chen, "3D Print and Maker," Huazhong University of Science and Technology Press Co., Ltd., Nov. 30, 2017, p. 7.
Dalmoro, "Droplet size prediction in the production of drug delivery microsystems by ultrasonic atomization," Translational Medicine @ UniSa, 2013, vol. 7, No. 2, pp. 6-11.
Extended European Search Report in EP20741246.1, mailed Oct. 24, 2022, 7 pages.
Extended European Search Report in EP20741841.9, mailed Sep. 14, 2022, 7 pages.
Gulyaev, A.P., Metal Science, M., Metallurgy, 1986, pp. 88-89.
International Search Report and Written Opinion in PCT/US2020/012726, mailed Apr. 2, 2020, 6 pages.
International Search Report and Written Opinion in PCT/US2020/012733, mailed Apr. 2, 2020, 8 pages.
International Search Report and Written Opinion in PCT/US2021/064732, mailed Mar. 17, 2022, 8 pages.
International Search Report and Written Opinion in PCT/US2021/064742, mailed Mar. 9, 2022, 6 pages.
International Search Report and Written Opinion in PCT/US2021/064748, mailed Mar. 7, 2022, 6 pages.
International Search Report and Written Opinion in PCT/US2023/061311, mailed May 1, 2023, 7 pages.
Invitation to Pay Additional Fees in PCT/US2023/077455, mailed Jan. 11, 2024, 3 pages.
Kumanin V.I., Current Metallurgical Dictionary, Basic Terms, Russian language, 1989, p. 328.
Kuznetsov, S.A., Big Explanatory Dictionary of the Russian Language, 1998, Norint, St. Petersburg, p. 1249.
Office Action in CN202080016939.0, mailed Mar. 18, 2022, 6 pages.
Office Action in CN202080016939.0, mailed Aug. 10, 2022, 6 pages.
Office Action in CN202080018077.5, mailed Mar. 9, 2022, 10 pages.
Office Action in CN202080018077.5, mailed Aug. 10, 2022, 6 pages.
Office Action in IN202117037227, mailed Nov. 18, 2022, 7 pages.
Office Action in RU2021124350, mailed Sep. 26, 2023, 8 pages.
Rajan et al., "Correlations to predict droplet size in ultrasonic atomization," Ultrasonics, 2001, vol. 39, pp. 235-255.
Wen et al., "The effect of erbium on the microstructure and mechanical properties of AlMgMnZr alloy," Materials Science and Engineering A, 2009, vol. 516, pp. 42-49.
"Aluminium and aluminium alloys—Chemical composition and form of wrought products—Part 3: Chemical composition and form of products," European Committee for Standardization, Aug. 2007, 37 pages.
Office Action in JP2021541462, mailed Feb. 13, 2024, 20 pages.
Sergey Dobatkin et al., "Improvement in the strength and ductility of Al—Mg—Mn alloys with Zr and Sc additions by equal channel angular pressing", Baikov Institute of Metallurgy and Materials Science, Russian Academy of Sciences, Moscow, Russia, International Journal of Materials Research downloaded from [www.hanser-elibrary.com] by Uppsala Universitetsbibliotek on Nov. 17, 2014.
International Search Report and Written Opinion in PCT/US2023/035452, mailed Feb. 15, 2024, 11 pages.
International Search Report and Written Opinion in PCT/US2023/077455, mailed Apr. 8, 2024, 46 pages.
Giulio Caccioppoli et al., "Fabrication of metal powders by ultrasonic atomisation", Materiaux, vol. 100, Jan. 1, 2002.
M.V. Chepak-Gizbrekht et al., "Grain-boundary diffusion modeling in a microstructural material", Computational Materials Science 184, Nov. 1, 2020:109896.
Mao, et al. "The diffusion behaviors at the Cu—Al solid-liquid interface: A molecular dynamics study", Results in Physics 16, Mar. 1, 2020:102998.
Zrodowski, et al., "Novel cold crucible ultrasonic atomization powder production method for 3D printing," Materials 14.10, May 13, 2021:2541.
"Aluminium and aluminium alloys—Chemical composition and form of wrought products—Part 3: Chemical composition and form of products", CEN, EN 573-3, Aug. 2007.
Extended European Search Report received for European Patent Application No. 22834339.8, mailed on Apr. 14, 2025, 12 pages.

* cited by examiner

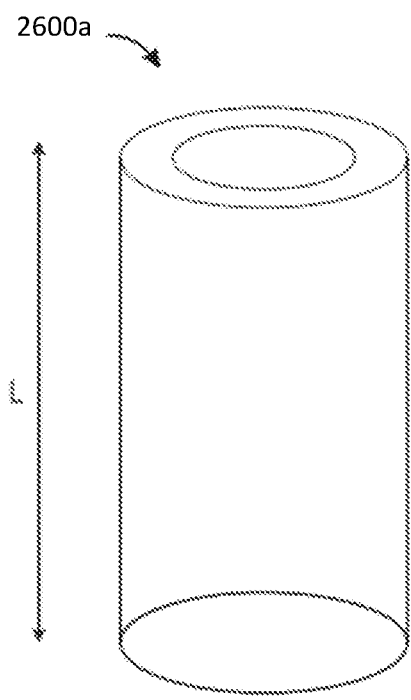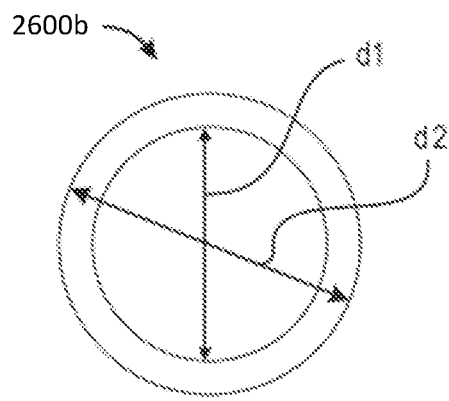
FIG. 26A
FIG. 26B

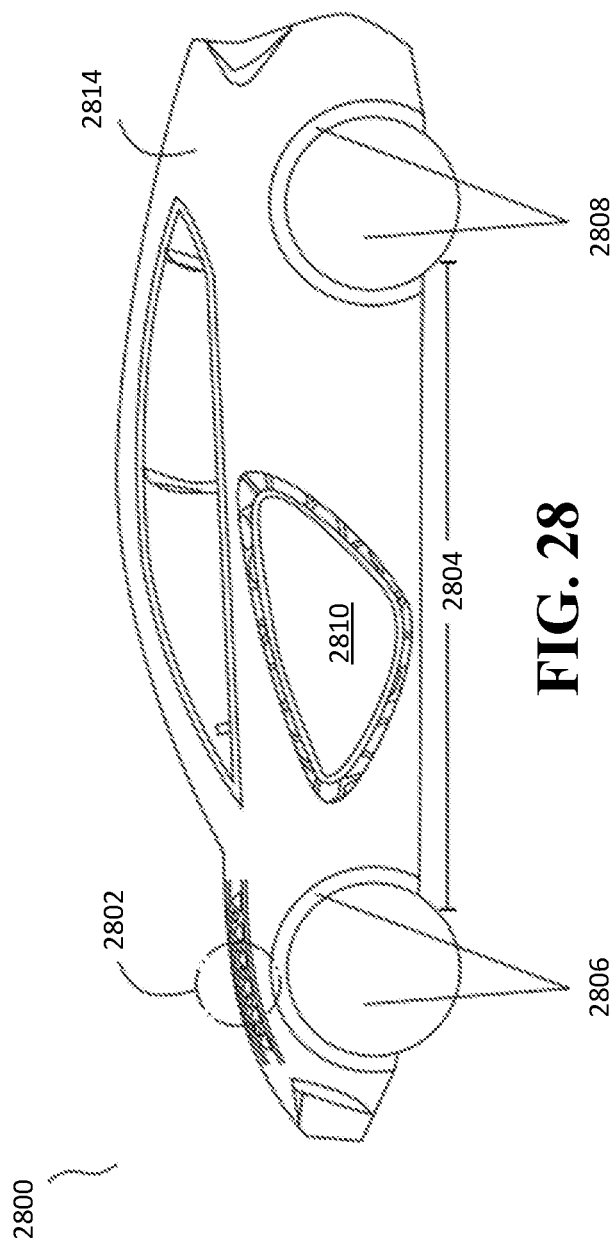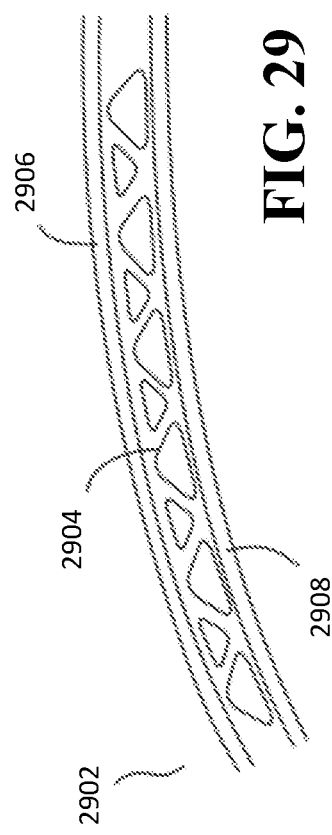
FIG. 28
FIG. 29

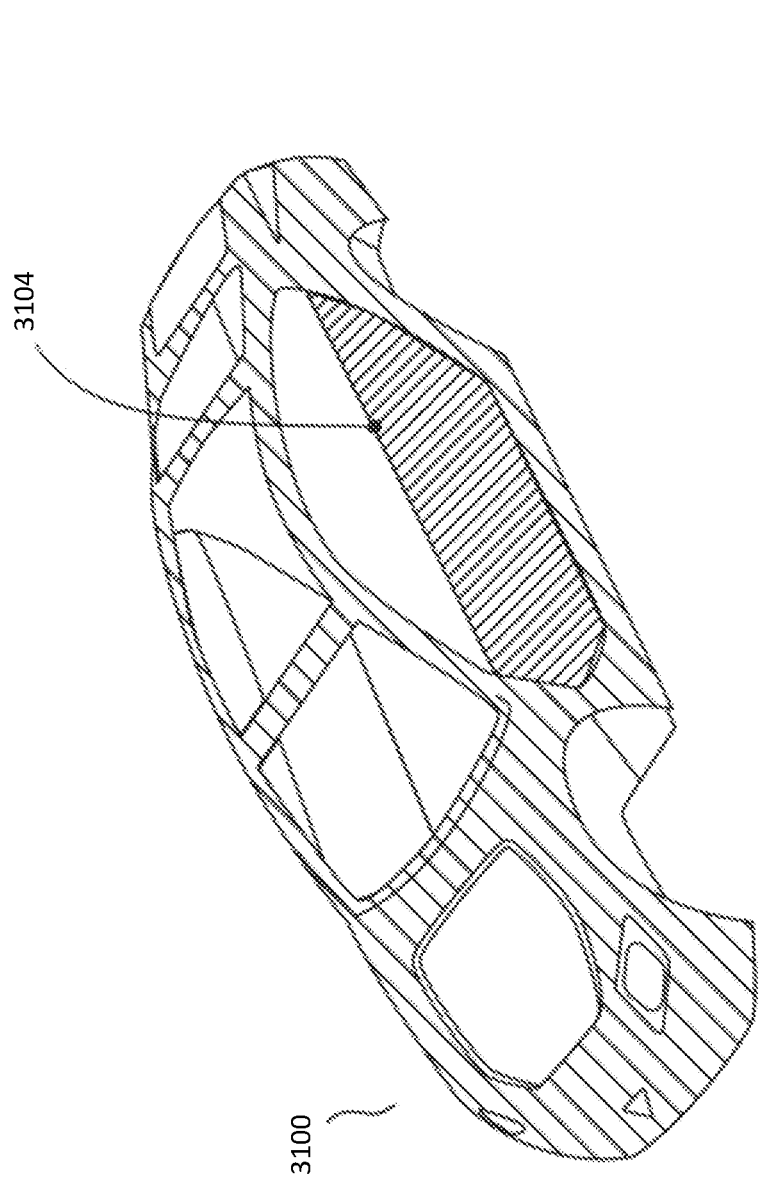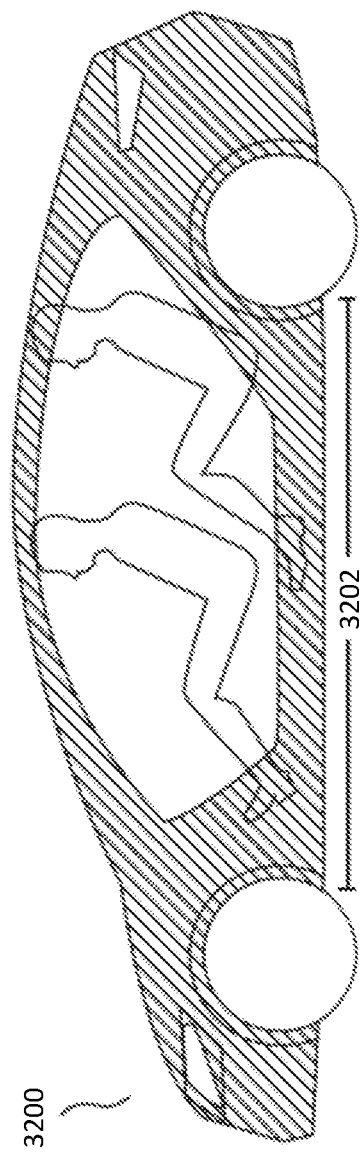
FIG. 31
FIG. 32

AL—MG—SI BASED NEAR-EUTECTIC ALLOY COMPOSITION FOR HIGH STRENGTH AND STIFFNESS APPLICATIONS

CROSS-REFERENCE TO RELATED APPLICATIONS

The present disclosure claims the benefit under 35 U.S.C. 119 of U.S. Provisional Patent Application No. 63/217,749, filed Jul. 1, 2021 and entitled "AL-MG-SI BASED NEAR-EUTECTIC ALLOY COMPOSITION FOR HIGH STRENGTH AND STIFFNESS APPLICATIONS", which application is incorporated by reference herein in its entirety.

BACKGROUND

Field

The present disclosure relates generally to alloys, and more specifically to aluminum alloys and structures of aluminum alloys.

Description of the Related Technology

Additive Manufacturing (AM) processes involve the use of a stored geometrical model for accumulating layered materials on a "build plate" to produce three-dimensional (3-D) objects having features defined by the model. AM techniques are capable of printing complex components using a wide variety of materials. A 3-D object is fabricated based on a computer-aided design (CAD) model. The AM process can manufacture a solid three-dimensional object directly from the CAD model without additional tooling.

One example of an AM process is powder bed fusion (PBF), which uses a laser, electron beam, or other source of energy to sinter or melt metallic powder deposited in a powder bed, thereby consolidating powder particles together in targeted areas to produce a 3-D structure having the desired geometry. Different materials or combinations of materials, such as metals, plastics, and ceramics, may be used in PBF to create the 3-D object. Other more advanced AM techniques, including those discussed further below, are also available or under current development, and each may be applicable to the present disclosure.

Another example of an AM process is called Binder Jet (BJ) process that uses a powder bed (similar to PBF) in which metallic powder is spread in layers and bonded by using an organic binder. The resulting part is a green part which requires burning off the binder and sintering to consolidate the layers into full density. The metallic powder material can have the same chemical composition and similar physical characteristics as PBF powders.

Another example of an AM process is called Directed Energy Deposition (DED). DED is an AM technology that uses a laser, electron beam, plasma, or other method of energy supply, such as those in Tungsten Inert Gas (TIG), or Metal Inert Gas (MIG) welding to melt the metallic powder or wire and rod, thereby transforming it into a solid metal object. Unlike many AM technologies, DED is not based on a powder bed. Instead, DED uses a feed nozzle to propel the powder or mechanical feed system to deliver wire and rod into the laser beam, electron beam, plasma, or other energy stream. The powdered metal or the wire and rod are then fused by the respective energy beam. While supports or a freeform substrate may in some cases be used to maintain the structure being built, almost all the raw material (powder, wire, or rod) in DED is transformed into solid metal, and consequently, little waste powder is left to recycle. Using a layer by layer strategy, the print head, comprised of the energy beam or stream and the raw material feed system, can scan the substrate to deposit successive layers directly from a CAD model.

PBF, BJ, DED, and other AM processes may use various raw materials such as metallic powders, wires, or rods. The raw material may be made from various metallic materials. Metallic materials may include, for example, aluminum, or alloys of aluminum. It may be advantageous to use alloys of aluminum that have properties that improve functionality within AM processes. For example, particle shape, powder size, packing density, melting point, flowability, stiffness, porosity, surface texture, density electrostatic charge, as well as other physical and chemical properties may impact how well an aluminum alloy performs as a material for AM. Similarly, raw materials for AM processes can be in the form of wire and rod whose chemical composition and physical characteristics may impact the performance of the material. Some alloys may impact one or more of these or other traits that affect the performance of the alloy for AM.

One or more aspects of the present disclosure may be described in the context of the related technology. None of the aspects described herein are to be construed as an admission of prior art, unless explicitly stated herein.

SUMMARY

Several aspects of one or more alloys and compositions of alloys, as well as methods of making and/or using the same, are described herein. For example, one or more alloys or compositions thereof may be aluminum alloys. The one or more alloys may be used in three-dimensional (3-D) printing and/or additive manufacturing to produce additively manufactured structures with the one of more alloys. Illustratively, an alloy may include a composition containing a plurality of materials (e.g., elements, metals, etc.).

An alloy in accordance with an aspect of the present disclosure comprises aluminum (Al), silicon (Si), and magnesium (Mg), wherein a composition of the alloy comprises from at least 5 percent (%) by weight to 20% by weight of Si and from at least 7% by weight to 10% by weight of Mg. Such an alloy may consist essentially of the Al, Si, and Mg.

Such an alloy may have a yield strength of the alloy is at least 450 Megapascals (MPa), an elongation of at least 4 percent, and/or a material hardness of the alloy is at least 80 on a Rockwell hardness (HRB) scale.

Such an alloy may further optionally include at least one of silver, nickel, manganese, calcium, and/or zirconium. The alloy may comprise between 0.1 and 0.45 percent by weight of calcium, between 2 and 3.5 percent by weight of zirconium, or between 0.1 and 0.45 percent by weight of calcium and between 2 and 3.5 percent by weight of zirconium. Such an alloy may further optionally be produced by an additive manufacturing process, which may include a cooling rate of at least 1000 degrees Celsius per second and may include at least one of Laser-Powder Bed Fusion, Electron Beam Powder Bed Fusion, or Directed Energy Deposition. The alloy may be a hyper-eutectic alloy or a hypo-eutectic alloy.

It will be understood that other aspects of alloys will become readily apparent to those of ordinary skill in the art from the following detailed description, wherein it is shown and described only several embodiments by way of illustration. As will be realized by those of ordinary skill in the art, the manufactured structures and the methods for manufacturing these structures are capable of other and different embodiments, and its several details are capable of modification in various other respects, all without departing from the disclosure. Accordingly, the drawings and detailed description are to be regarded as illustrative in nature and not as restrictive.

BRIEF DESCRIPTION OF THE DRAWINGS

Various aspects of alloys that may be used for additive manufacturing, for example, in automotive, aerospace, and/or other engineering contexts are presented in the detailed description by way of example, and not by way of limitation, in the accompanying drawings, wherein:

FIG. 26A illustrates a side perspective view of a microtube in accordance with an aspect of the present disclosure.

FIG. 26B illustrates a cross-section view of the microtube in accordance with an aspect of the present disclosure.

FIG. 28 illustrates a side view of a vehicle additively manufactured with an exoskeleton frame and having a transparent and cutaway portions for revealing internal structure in accordance with an aspect of the present disclosure.

FIG. 29 illustrates a side-sectional view of a contoured sandwich panel from the exoskeleton frame of the vehicle of FIG. 28 in an aspect of the present disclosure.

FIG. 31 illustrates another perspective view of an AM frame in accordance with an aspect of the present disclosure.

FIG. 32 illustrates a side view of an AM vehicle having a structural outer sandwich skin, enabling improved aerodynamics by eliminating the need for external frame rails in accordance with an aspect of the present disclosure.

DETAILED DESCRIPTION

Figure 1A:
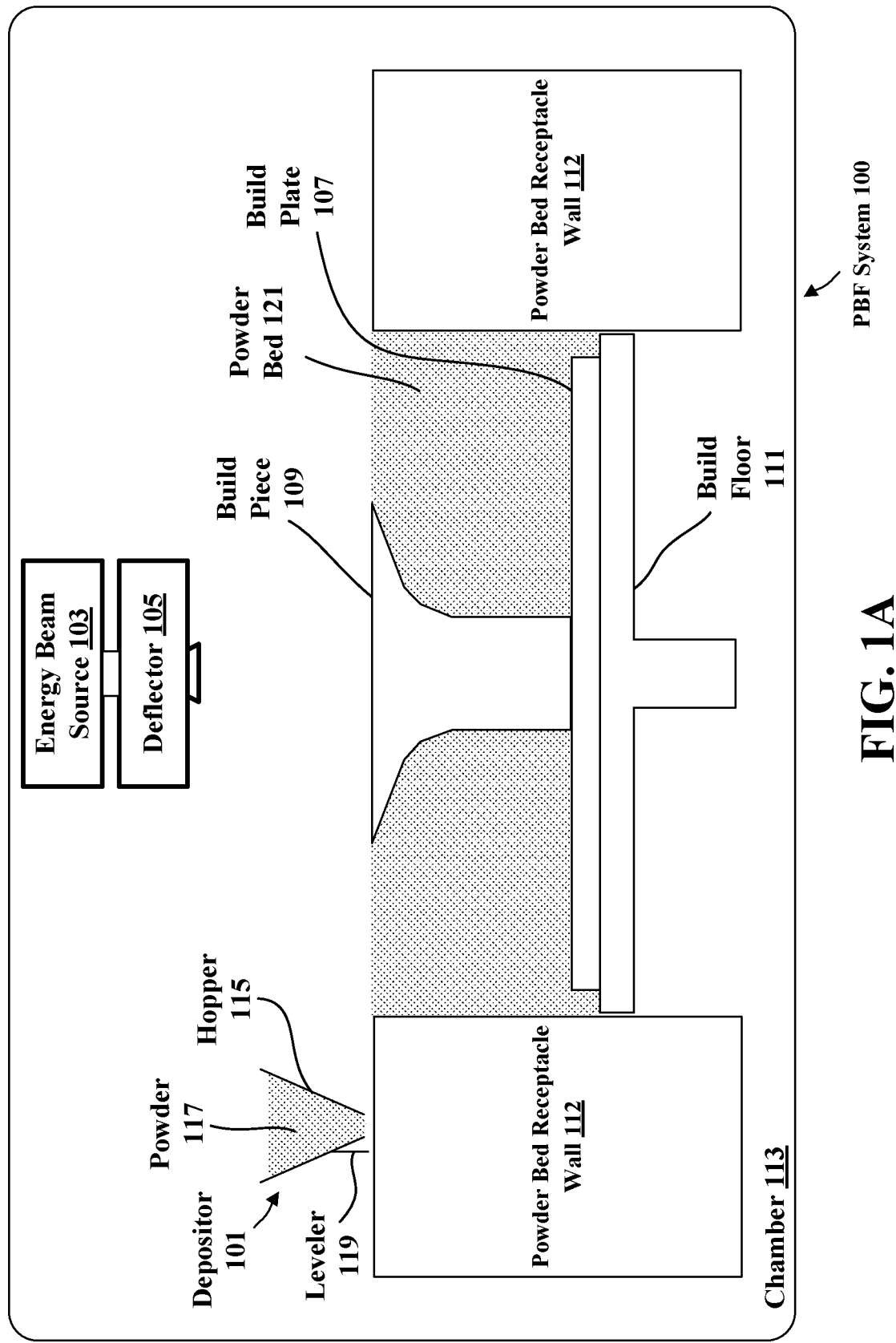
FIGS. 1A-1D illustrate respective side views of a 3-D printer system in accordance with an aspect of the present disclosure.

The detailed description set forth below in connection with the appended drawings is intended to provide a description of various exemplary embodiments of aluminum alloys are not intended to represent the only embodiments in which the disclosure may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the disclosure to those of ordinary skill in the art. However, the techniques and approaches of the present disclosure may be practiced without these specific details. In some instances, well-known structures and components may be shown in block diagram form, or omitted entirely, in order to avoid obscuring the various concepts presented throughout this disclosure.

Metal alloys, such as aluminum alloys, are often utilized in various engineering applications, such as automotive and aerospace. In many applications, these engineering applications may benefit from alloys that offer high performance and sustainability. Moreover, alloys that are economical may be more advantageous, e.g., as alloys that include rare and/or expensive elements may be impractical for relatively large-scale and/or commercial applications.

While some alloys that fulfill the aforementioned conditions exist, these existing alloys are mostly unsuitable for additive manufacturing (AM) applications, such as Selective Laser Melting (SLM) and/or Powder Bed Fusion (PBF). For example, AM processes with alloys commonly used for traditional manufacturing (i.e., non-AM manufacturing) may result in microstructure and/or other characteristics of these alloys that are unacceptable—e.g., by resulting in defective and/or unsafe products.

AM processes may include a small melt pool and/or high cooling rate from liquid to solid states for alloys, e.g., in comparison with traditional manufacturing processes. Therefore, alloys used in AM processes may be expected to develop microstructure and/or other characteristics (e.g., through the relatively small melt pool and/or relatively high cooling rate) that yield high strength, ductility, fracture toughness, fatigue strength, corrosion resistance, and/or elevated temperature strength and, therefore, result in satisfactory products.

In view of the foregoing, there exists a need for alloys that are high performance and economically feasible for AM in various automotive, aerospace, and/or other engineering applications. The present disclosure describes alloys that may be implemented in AM processes, such as SLM, PBF, DED, and others. In this way, for example, additively manufactured structures of the alloys disclosed in this disclosure may be produced. The alloys of the present disclosure may provide improved properties for AM in automotive, aerospace, and/or other engineering applications. The alloys may yield improved performance in AM contexts, such as one or more of high strength (e.g., yield strength), ductility, fracture toughness, fatigue strength, corrosion resistance, elevated temperature strength, percent elongation, and/or any combination thereof. Furthermore, application of the alloys of the present disclosure may be economically feasible, for example, in a commercial context and/or production scale for AM in automotive, aerospace, and/or other engineering applications.

AlSi10Mg (AA 4046) is an aluminum alloy that may be used for Additive Manufacturing (AM) techniques, such as Selective Laser Melting (SLM) and/or Powder Bed Fusion (PBF). However, AA 4046 is primarily a welding alloy for joining automotive aluminum parts. When processed by additive manufacturing, this alloy yields moderate strength but poor ductility. AA 4046 has good welding properties where the weld pool is large and cooling rate is relatively slow. Additionally, AA 4046 may be used in cases where a joint design can tolerate poor properties. For example, some environments may cause a reduction in fatigue life of a component due to a corrosive environment compared to the performance of the component in air. The reduction in fatigue life may be referred to as a knockdown factor. However, in AM, the whole part is built with micro-welds with extremely small weld pools and rapid melting and cooling.

Accordingly, with AM, there should be little or no compromise through design knockdown. Extremely high attention has been placed on the improvement of properties of AA 4046, resulting in a voluminous array of investigations without significant property improvements for engineering applications that require high performance and reliability. Still, the tested mechanical properties of AA 4046 may be inferior to those commonly used in wrought and cast form for high-strength applications. In addition, some aluminum alloys are unavailable and/or impractical for commercial use in AM, such as aluminum alloys in the 6000 and 7000 series.

Some high-performance aluminum alloys have been developed that may differ from AA 4046, aluminum alloys in the 6000 and 7000 series, and/or other commercially available aluminum alloys. Such high-performance alloys may include Scalmalloy® and A205. However, the applications of various high-performance aluminum alloys, including Scalmalloy® and A205, may be economically prohibitive in AM contexts.

In view of the foregoing, there exists a need for alloys that are high performance and economically feasible for AM in various automotive, aerospace, and/or other engineering applications. The present disclosure describes alloys that may be implemented in AM processes, such as SLM, PBF, DED, and others. In this way, for example, additively manufactured structures of the alloys disclosed in this disclosure may be produced. The alloys of the present disclosure may provide improved properties for AM in automotive, aerospace, and/or other engineering applications. The alloys may yield improved performance in AM contexts, such as one or more of high strength (e.g., yield strength), ductility, fracture toughness, fatigue strength, corrosion resistance, elevated temperature strength, percent elongation, and/or any combination thereof. Furthermore, application of the alloys of the present disclosure may be economically feasible, for example, in a commercial context and/or production scale for AM in automotive, aerospace, and/or other engineering applications.

In an aspect, high-performance aluminum alloys are described. Crashworthiness depends on a combination of tensile, shear, and compression strengths that make up a material's crash performance. The analytical and experimental data are utilized by a variety of industries (e.g., automotive) while designing and engineering structures incorporating the materials.

High-performance aluminum alloys processed with conventional techniques (e.g., non-AM processes) may obtain various properties through one or combination of the following processes: solid solution strengthening, strain hardening, precipitation strengthening, and/or dispersion strengthening. The processes of solid solution strengthening, strain hardening, precipitation strengthening, grain or phase boundary strengthening, and/or dispersion strengthening may take place during solidification, subsequent thermal processing, intermediate cold working, or some combination of these.

Solidification processes and subsequent cooling in solid state in AM may differ from those processes occurring through conventional techniques. For example, the solidification in PBF processing occurs on a microscale, layer by layer, with each layer undergoing one or more melting, solidification, and cooling cycles. In such a process, melting may begin at approximately 610° C. and may conclude at approximately 696° C. Due to the small size of the melt pool, the cooling rate is extremely high relative to conventional techniques—e.g., the cooling rate may be from approximately $10^{3°}$ C./second (s) to approximately $10^{6°}$ C./s. Therefore, non-equilibrium thermodynamics and phase transformation kinetics may become the dominant drivers during AM, thereby making alloys exhibit different properties with AM, such as through inheriting element supersaturation and alloy partitioning.

Not all alloys (e.g., AA 4046, etc.) may be suitable for the rapid solidification through AM, which may include relatively small weld pools (and may include a cooling rate of approximately 1000 degrees Celsius per second ($10^{3°}$ C./s) to approximately 1 million degrees Celsius per second ($10^{6°}$ C./s). The present disclosure describes alloys that may provide high performance with AM, e.g., in comparison to currently available alloys. The performance of these alloys of the present disclosure may be improved in the as-printed state, e.g., after undergoing thermal processing (post AM), or some combination of both in the as-printed state and after undergoing thermal processing.

In one exemplary configuration, one or more alloys of the present disclosure may be tailored for superior strengthening where the one or more alloys would have high ultimate and tensile strength at room and elevated temperature. In another exemplary configuration, one or more of the alloys of the present disclosure may be designed for superior ductility where the one or more alloys would have high elongation at room and elevated temperatures.

The nominal chemical composition of the common AA 4046 includes 11% silicon (Si), 0.55% iron (Fe), 0.45% manganese (Mn), 0.45% magnesium (Mg), and balance aluminum (Al). The as-printed tensile properties of AA 4046 are up to 6% elongation, up to 301 megapascal (MPa) yield strength, and up to 459 MPa ultimate tensile strength. High-performance aluminum alloys, such as Scalmalloy®, have nominal chemical compositions of 4.5% Mg, 0.7% scandium (Sc), 0.3% zirconium (Zr), 0.5% Mn, with heat-treated properties of up to 13% elongation, up to 469 MPa yield strength, and up to 495 MPa ultimate tensile strength. However, the aforementioned high-performance aluminum alloys are economically infeasible for production scale and/or commercial consumer applications (e.g., automotive applications).

According to some configurations, one or more alloys of the present disclosure may be configured with elongation percentage exceeding that of some existing aluminum alloys, such as AA 4046. While the advertised and tested elongation percentage of AA 4046 is approximately 6% and 4%, respectively, an elongation of one or more alloys of the present disclosure may be approximately 8%. Therefore, one or more alloys described herein may exceed the elongation percentage of the conventional AA 4046 by approximately 2%, e.g., in the as-printed condition. Post-processing techniques, such as heat treatment and/or surface (shot) peening, may further increase the elongation percentage of the one or more alloys described herein. For example, heat treatment may include treating an aluminum alloy as described herein at a temperature between approximately 100° C. to approximately 400° C. for a time of approximately 30 minutes to approximately 30 hours.

FIGS. 1A-D illustrate respective side views of an exemplary 3-D printer system.

In this example, the 3-D printer system is a powder-bed fusion (PBF) system 100. FIGS. 1A-D show PBF system 100 during different stages of operation. The particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein.

PBF System 100 may be an electron-beam PBF system 100, a laser PBF system 100, or other type of PBF system 100. Further, other types of 3-D printing, such as Directed Energy Deposition, Selective Laser Melting, Binder Jet, etc., may be employed without departing from the scope of the present disclosure.

PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. Although the terms "fuse" and/or "fusing" are used to describe the mechanical coupling of the powder particles, other mechanical actions, e.g., sintering, melting, and/or other electrical, mechanical, electromechanical, electrochemical, and/or chemical coupling methods are envisioned as being within the scope of the present disclosure.

PBF system 100 can also include a build floor 111 positioned within a powder bed receptacle. The powder bed receptacle walls 112 of the powder bed receptacle generally define the boundaries of the powder bed receptacle, which is sandwiched between the powder bed receptacle walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

AM processes may use various metallic powders, such as one or more alloys of the present disclosure. The particular embodiments illustrated in FIGS. 1A-D are some suitable examples of a PBF system employing principles of the present disclosure. Specifically, one or more of the alloys, which may be aluminum alloys, described herein may be used in at least one PBF system 100 described in FIGS. 1A-D. While one or more alloys described in the present disclosure may be suitable for various AM processes (e.g., using a PBF system, as shown in FIGS. 1A-D), it will be appreciated that one or more alloys of the present disclosure may be suitable for other applications, as well. For example, one or more alloys described herein may be used in other fields or areas of manufacture without departing from the scope of the present disclosure. Accordingly, AM processes employing the one or more alloys of the present disclosure are to be regarded as illustrative, and are not intended to limit the scope of the present disclosure.

Prior to use in PBF system 100, the elements of an alloy, which may be an aluminum alloy, may be combined into a composition according to one of the examples/configurations described herein. For example, the elements in respective concentrations described in one of the examples/configurations of the present disclosure may be combined when the elements are molten. The composition may be mixed while the elements are molten, e.g., in order to promote even distribution of each element with the balance of the base material, which may be aluminum. The molten composition may be cooled and atomized. Atomization of the composition may yield a metallic powder that includes the elements of the one of the examples/configurations of the present disclosure, and can be used in additive manufacturing systems such as PBF system 100. Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
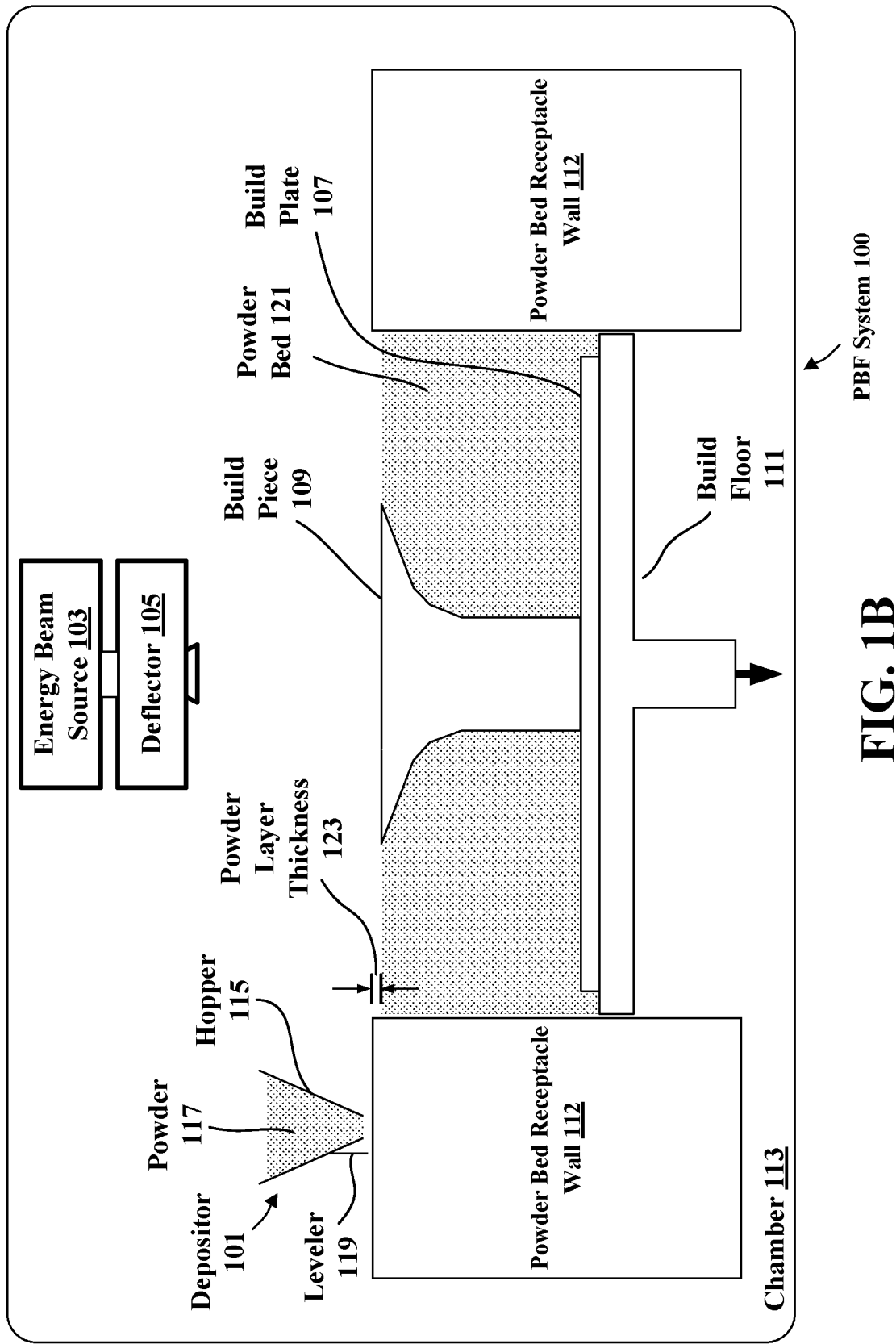

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle walls 112 by an amount equal to the powder layer thickness. In this way, for example, a space with a consistent thickness equal to powder layer thickness 123 can be created over the tops of build piece 109 and powder bed 121.

Figure 1C:
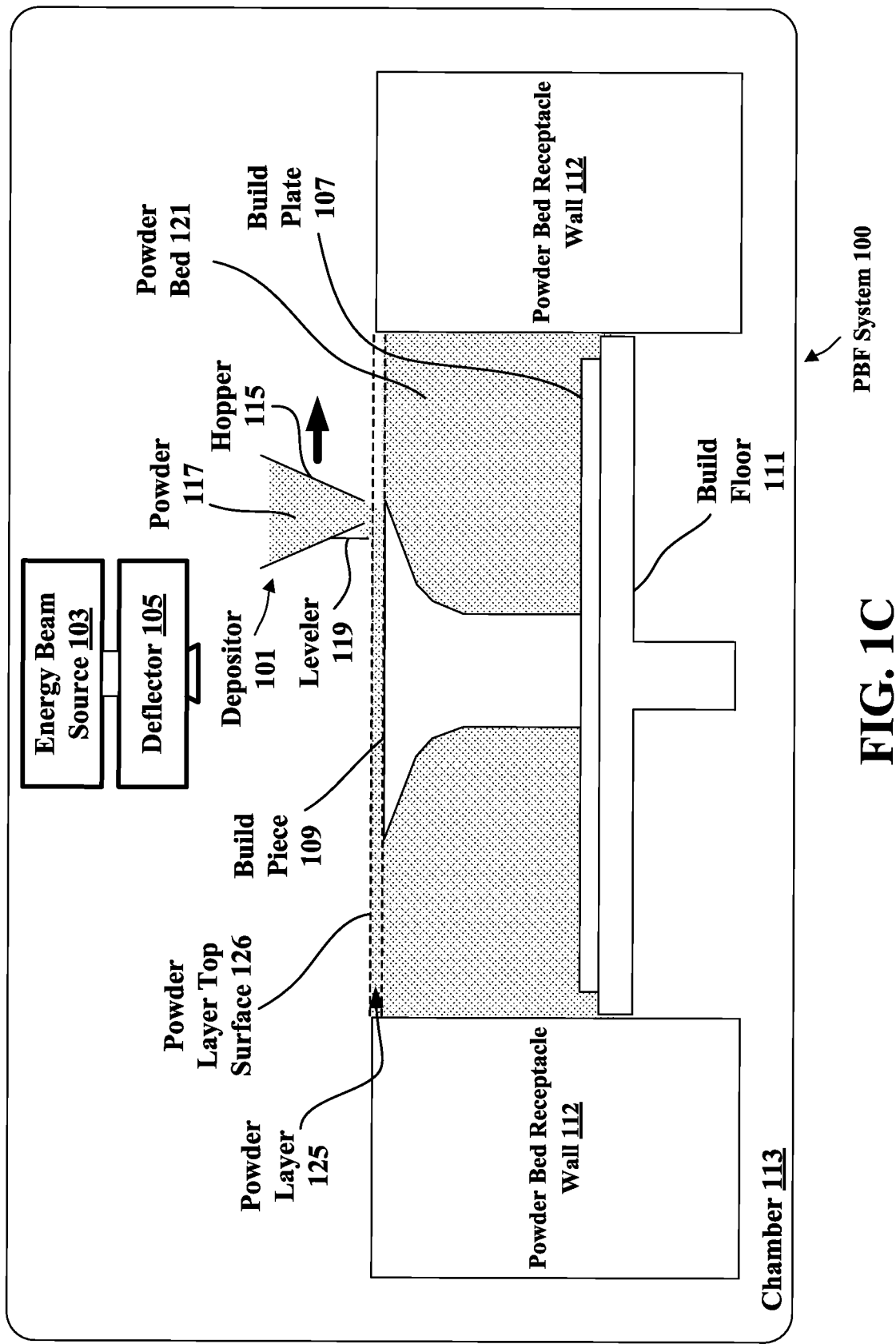

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 126 that has a thickness substantially equal to the powder layer thickness 123 (see FIG. 1B). Thus, the powder in a PBF system can be supported by a powder material support structure, which can include, for example, a build plate 107, a build floor 111, a build piece 109, powder bed receptacle walls 112, and the like. It should be noted that the illustrated thickness of powder layer 125 (i.e., powder layer thickness 123 (FIG. 1B)) is greater than an actual thickness used for the example involving 150 previously-deposited layers discussed herein with reference to FIG. 1A.

Figure 1D:
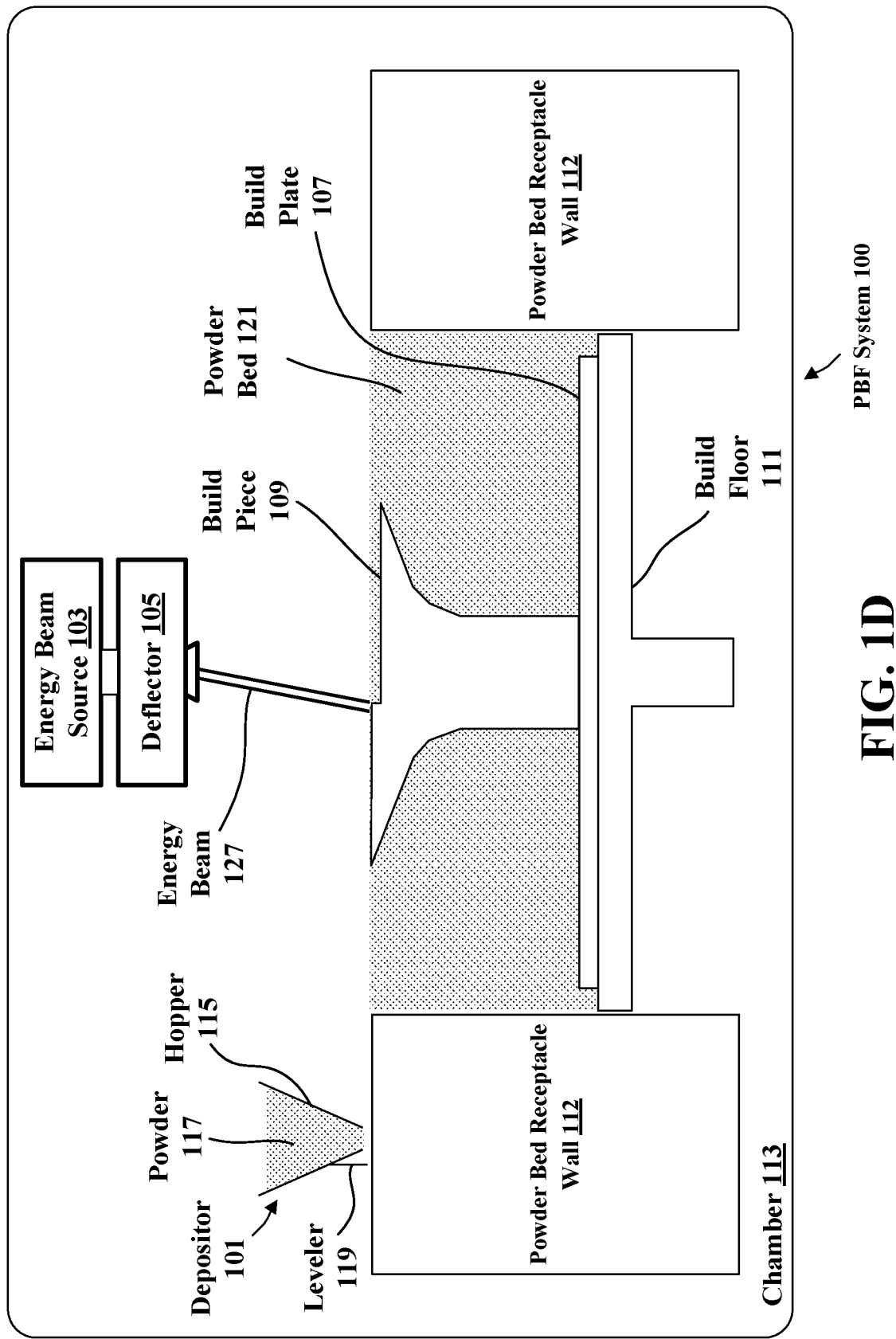

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 1E:
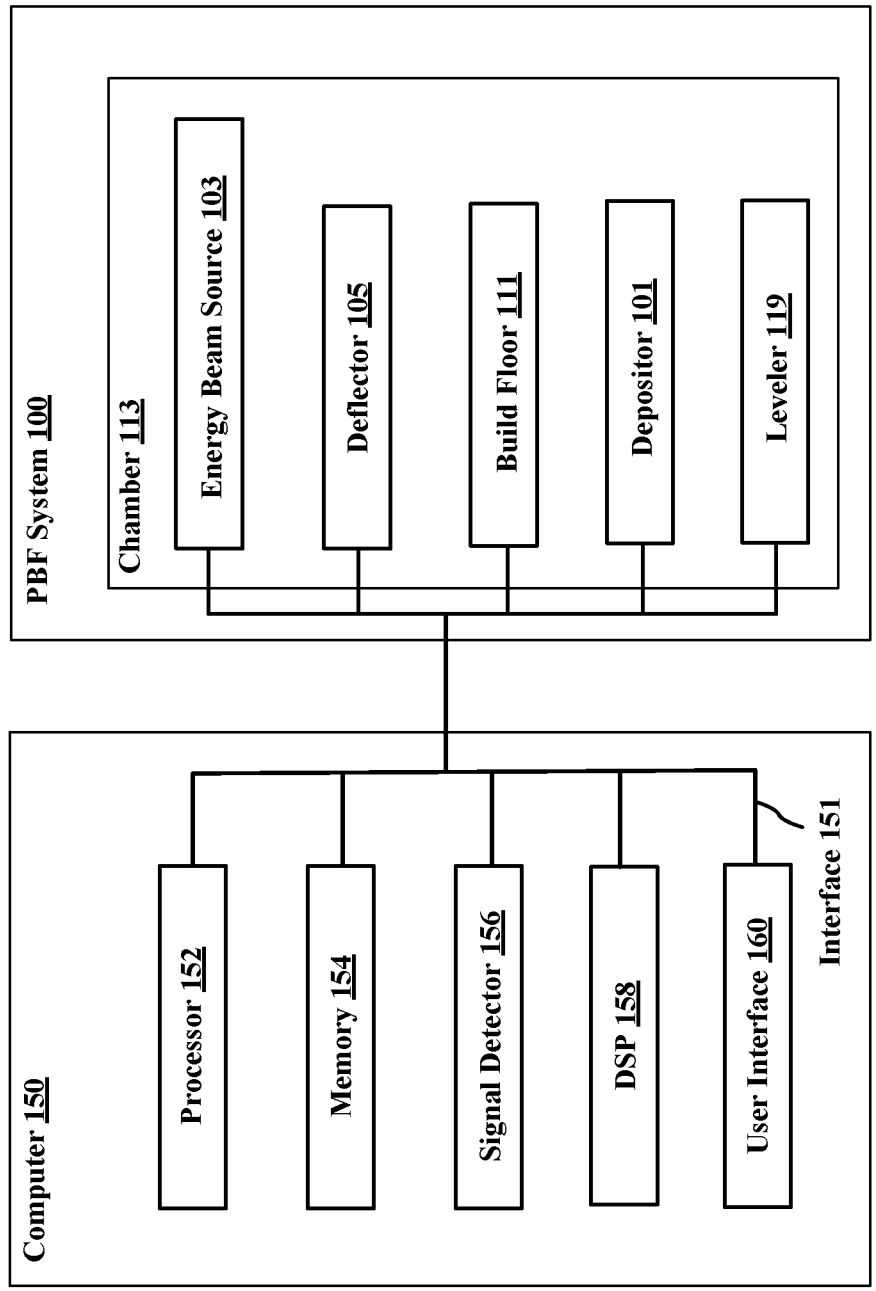
FIG. 1E illustrates a functional block diagram of a 3-D printer system in accordance with an aspect of the present disclosure.

FIG. 1E illustrates a functional block diagram of a 3-D printer system in accordance with an aspect of the present disclosure.

In an aspect of the present disclosure, control devices and/or elements, including computer software, may be coupled to PBF system 100 to control one or more components within PBF system 100. Such a device may be a computer 150, which may include one or more components that may assist in the control of PBF system 100. Computer 150 may communicate with a PBF system 100, and/or other AM systems, via one or more interfaces 151. The computer 150 and/or interface 151 are examples of devices that may be configured to implement the various methods described herein, that may assist in controlling PBF system 100 and/or other AM systems.

In an aspect of the present disclosure, computer 150 may comprise at least one processor 152, memory 154, signal detector 156, a digital signal processor (DSP) 158, and one or more user interfaces 160. Computer 150 may include additional components without departing from the scope of the present disclosure.

Processor 152 may assist in the control and/or operation of PBF system 100. The processor 152 may also be referred to as a central processing unit (CPU). Memory 154, which may include both read-only memory (ROM) and random access memory (RAM), may provide instructions and/or data to the processor 152. A portion of the memory 154 may also include non-volatile random access memory (NVRAM). The processor 152 typically performs logical and arithmetic operations based on program instructions stored within the memory 154. The instructions in the memory 154 may be executable (by the processor 152, for example) to implement the methods described herein.

The processor 152 may comprise or be a component of a processing system implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor 152 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

Signal detector 156 may be used to detect and quantify any level of signals received by the computer 150 for use by the processor 152 and/or other components of the computer 150. The signal detector 156 may detect such signals as energy beam source 103 power, deflector 105 position, build floor 111 height, amount of powder 117 remaining in depositor 101, leveler 119 position, and other signals. DSP 158 may be used in processing signals received by the computer 150. The DSP 158 may be configured to generate instructions and/or packets of instructions for transmission to PBF system 100.

The user interface 160 may comprise a keypad, a pointing device, and/or a display. The user interface 160 may include any element or component that conveys information to a user of the computer 150 and/or receives input from the user.

The various components of the computer 150 may be coupled together by interface 151, which may include, e.g., a bus system. The interface 151 may include a data bus, for example, as well as a power bus, a control signal bus, and a status signal bus in addition to the data bus. Components of the computer 150 may be coupled together or accept or provide inputs to each other using some other mechanism.

Although a number of separate components are illustrated in FIG. 1E, one or more of the components may be combined or commonly implemented. For example, the processor 152 may be used to implement not only the functionality described herein with respect to the processor 152, but also to implement the functionality described herein with respect to the signal detector 156, the DSP 158, and/or the user interface 160. Further, each of the components illustrated in FIG. 1E may be implemented using a plurality of separate elements.

Alloy Structures

Figure 2A:
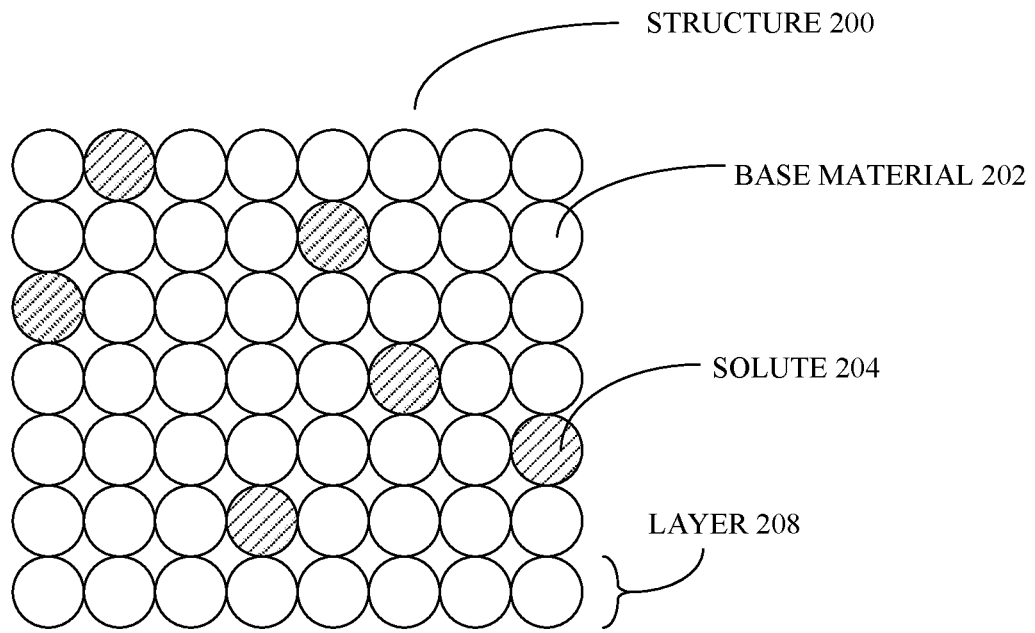
FIGS. 2A-2C illustrate alloy structures in accordance with an aspect of the present disclosure.
Figure 2B:
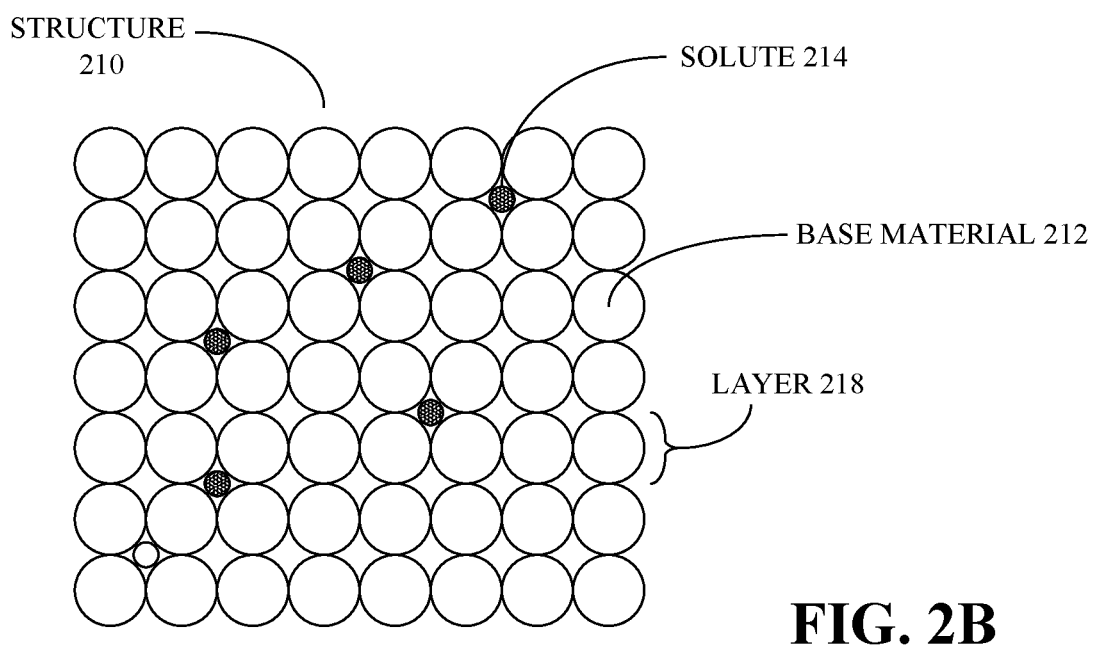

FIGS. 2A and 2B illustrate alloy structures in accordance with an aspect of the present disclosure.

FIG. 2A illustrates an alloy structure 200 with base material atoms and solute 204 atoms included in alloy structure 200. In an aspect of the present disclosure, alloy structure 200 may have an underlying structure of the base material, which may be, for example, a crystalline-type or periodic structure, such as a cubic structure, i.e., where an atom of the base material is located at each corner of a cube, a face-centered cubic structure, i.e., where an atom of the base material is located at the corners and in at least one face of a cube, etc. For example, as a base material, aluminum (Al) metal arranges in a face-centered cubic (fcc) structure, titanium arranges in a body-centered cubic (bcc) structure or a hexagonal close packed (hcp) structure, etc. As shown in FIG. 2A, atoms of base material 202 can be arranged in layers, such as a base material layer 208, which may include one or more atoms of substitutional solute 204.

In FIG. 2A, the base material structure of alloy structure 200 is shown as a cubic structure, however, the principles described with respect to alloy structure 200 may be applied to any base material structural arrangement without departing from the scope of the present disclosure. In FIG. 2A, at some locations within alloy structure 200, base material 202 has been replaced by solute 204. With a replacement approach, an alloy may be referred to as a "substitutional alloy," because the solute 204 is substituting for the base material 202 within the base material structure of alloy structure 200. In an aspect of the present disclosure, solute 204 may be one or more different atoms and/or compounds that act as substitutional replacements for base material 202. For example, and not by way of limitation, base material 202 may be iron (Fe), and solute 204 may be one or more of nickel (Ni), chromium (Cr), and/or tin (Sn). Substitutional alloys may be formed when the solute 204 is of approximately the same atomic size as base material 202.

In FIG. 2B, an alloy structure 210 includes a base material 212 within a cubic structure like the base material structure shown in FIG. 2A. Like FIG. 2A, the principles described with respect to alloy structure 210 may be applied to any base material structural arrangement without departing from the scope of the present disclosure. Alloy structure 210 also includes a solute 214. Solute 214 is included in alloy structure 210 at locations other than the locations of base material 212, i.e., at interstitial locations within base material structure of alloy structure 210. In such an aspect of the present disclosure, an alloy with such an addition to base material 212 may be referred to as a "interstitial alloy," because the solute 214 is being made part of the structure at interstitial locations within the base material structure of alloy structure 210. In such an aspect, solute 214 may be one or more different atoms and/or compounds that act as interstitial insertions into the base material structure of alloy structure 210. For example, and not by way of limitation, base material 212 may be aluminum (Al), and solute 214 may be one or more of magnesium (Mg), zirconium (Zr), and/or manganese (Mn). Interstitial alloys may be formed when solute 214 is of a smaller atomic size than base material 212. As shown in FIG. 2B, atoms of base material 212 can be arranged in layers, such as a base material layer 218, which may include one or more atoms of interstitial solute 214 interspersed between the layers.

Figure 2C:
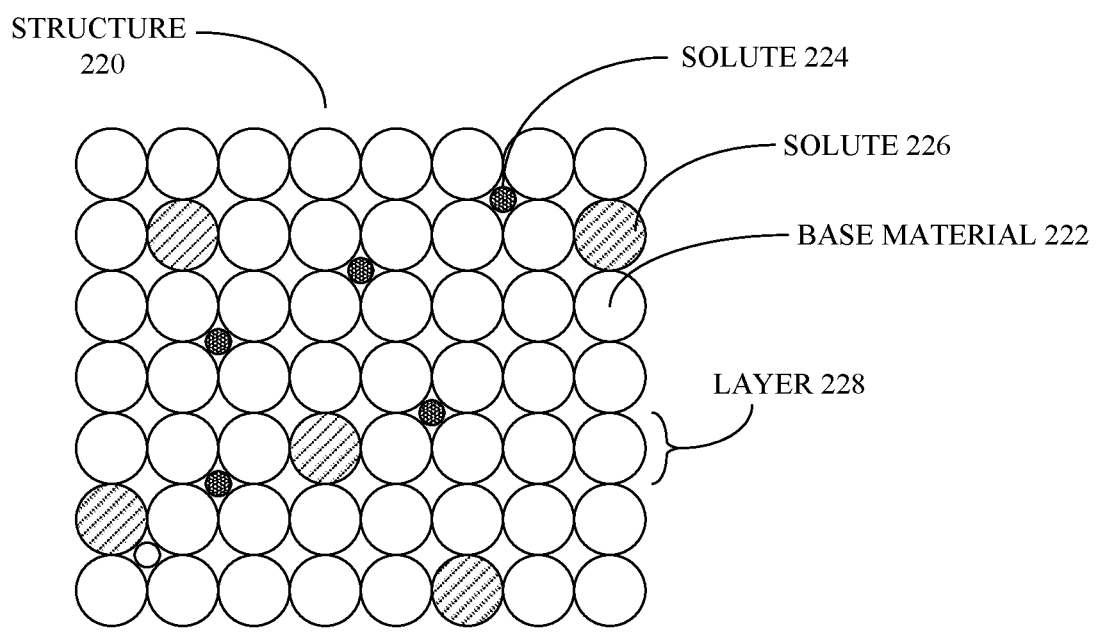

FIG. 2C illustrates an example of a combination alloy, with an alloy structure 220 that can include a base material 222, an interstitial solute 224, and a substitutional solute 226. As shown in FIG. 2C, atoms of base material 222 can be arranged in layers, such as a base material layer 228, which may include one or more atoms of substitutional solute 204 and interspersed with one or more atoms of interstitial solute 224.

Aspects of the present disclosure can include substitutional alloys, interstitial alloys, and combination alloys with combinations of substitutional/interstitial solutes in a given alloy. Further, a base material (such as base material 202, 212, and 222) may include one or more elements, e.g., the base material may be a plurality of two materials, e.g., copper (Cu) and zinc (Zn), without departing from the scope of the present disclosure. Although the use of "base" in base material may mean that the base material is the majority of the composition of the alloy, such meaning is not necessarily the case in many aspects of the present disclosure. In various embodiments, base material may indicate an underlying structure of the alloy, since different materials have different atomic arrangements, e.g., fcc, bcc, cubic, hcp, etc.

In an aspect of the present disclosure, solutes can be included with a base material to change one or more properties that the base material exhibits. For example, and not by way of limitation, carbon (C) may be added to Fe to increase strength and reduce oxidation. In other words, solutes may be added as impurities to a base material to change the characteristics of the bonds between atoms within a base material structure.

In many materials, and in many alloys, there are several basic characteristics that determine the suitability of that material/alloy for a given application. For example, and not by way of limitation, strength, heat resistance, and ductility are three characteristics that may be of interest in certain applications.

As shown in FIGS. 2A-C, a structure of an alloy, which may include base material(s) and solutes, can be classified in terms of its underlying atomic arrangements (e.g., fcc, bcc, hcp, etc.). Alloy structures can be made in a number of ways, but they are primarily fashioned by mixing together a base material with solutes (e.g., substitutional and/or interstitial) in various ratios and/or percentages. This may be done through smelting and/or melting the various components into a homogenous liquid and allowing the liquid to cool into a solid form.

The resultant alloy structure, whether interstitial, substitutional, polycrystalline, amorphous, or various combinations, provides different values for the properties of the alloy than the properties of the base material in a pure form. For example, alloying gold (Au) with silver (Ag) makes the resultant alloy harder, i.e., the resultant alloy of Au and Ag has a higher tensile strength than pure Au. Another reason that a pure base material structure may show reduced strength is that covalent and/or ionic bonding between atoms of the same element is limited. Since alloys contain a mixture of atom sizes, and a variety of valence electrons because some of the atoms in the alloy's structure can have slightly different sizes and/or different localized electrical properties, it is more difficult for layers in the base material arrangement, such as base material layers 208, 218, and 228, to shift with respect to one another, as the arrangement of atoms is no longer uniform and the localized bond strength between neighboring atoms may be increased. This increase in strength of the alloy may be due to the slight difference in size of a substitutional solute, the inclusion of an interstitial solute, and/or other reasons.

Strengthening Mechanisms in Metals

As seen with respect to the descriptions accompanying FIGS. 2A-C, there can be a plurality of ways to increase strength of a base material. The "strength" of a given material can also be described in a plurality of ways. The amount of force required to break a material is often referred to as the "tensile strength" or "ultimate tensile strength" of the material, while the amount of force required to permanently bend or deform a material may be referred to as the "yield strength" of the material. Several mechanisms may be responsible for increasing the tensile strength and/or yield strength of a given material. Such mechanisms in alloys may include, for example, changing the "smoothness" between base material layers in the alloy structure, either by introducing a substitutional solute, an interstitial solute, or a combination of substitutional and interstitial solutes. The introduction of solutes can create areas within an alloy structure that are not uniform, and may be referred to as "dislocations" within the alloy.

Dislocations may introduce different attraction and/or repulsion forces, known as stress fields, within an alloy structure. This creates a localized differential between forces within the alloy structure, known as a "pinning point," that opposes motion of one or more base material layers of the structure proximate that pinning point.

Increasing the number of dislocations per unit of volume of the alloy structure will normally increase the tensile strength and/or yield strength of an alloy versus its base material structure in pure form. However, above a certain point, which may be different for each base material, an increased density of dislocations will begin to lower the tensile strength and/or yield strength of the alloy. If the localized differential of attractive and/or repulsive forces becomes widespread enough, it can reduce and/or eliminate any contribution of attraction and/or repulsive forces of the base material from the overall strength determination for the alloy, or it can cause the alloy structure to change form to a different underlying arrangement of the atoms in the alloy structure (e.g., from fcc to bcc, etc.).

As such, increasing the dislocation density, to a point, increases the shearing force needed to move one base material layer with respect to another. This is so because additional shearing force would be required to move the dislocations that lie within the layer(s) as well as the force needed to move the base material in those base material layers. This increase in shearing force needed to move the dislocations is exhibited as an increase in tensile strength and/or yield strength in the alloy.

However, increasing the strength of a base material may decrease other properties that the base material exhibits when the base material is in a pure form. For example, and not by way of limitation, increasing the strength may decrease the malleability of that base material. It may be known that stronger materials are harder to bend or dent. The malleability and/or elongation abilities of a material is often referred to as the "ductility" of the material. Changing how strong a material is, i.e., the ability of the material to resist force, often also changes how "workable" the material is, i.e., the ability to absorb force through deformation of the material rather than breakage of the material. Although many of the discussions herein refer to strengthening a material, in an aspect of the present disclosure, the strength of a given alloy can be improved without causing a significant effect on the ductility of the alloy.

Work Hardening

A typical structure of a pure base material may be a regular, nearly defect-free lattice. To harden a material through "work hardening," dislocations are introduced into the base material through forming or otherwise "working" the material. These dislocations can create localized fluctuations of the stress fields in the material, which slightly rearranges the structure of the base material.

Work hardening of a base material may be achieved by applying mechanical and/or thermal stresses to the base material. For example, a sheet of Cu may be hammered, stretched, or run through pressurized rollers to reduce the material thickness. These mechanical stresses introduce dislocations into the Cu structure (which is face centered cubic). This forming of Cu increases the hardness (strength) and decreases the elasticity (commonly referred to as the "ductility"). Similar hardening can be achieved through thermal cycling, e.g., heating and cooling of the material, such as is done with furnaces and quenching of iron to "temper" the material.

As described herein, if "working" a base material continues beyond a certain point, the base material will contain too large a concentration of dislocations which may result in fractures, such as micro-fractures and/or visible fractures. Such fractures may be reversible, e.g., through one or more heating and cooling cycles of the material during and/or after working of the base material. Heating and cooling of the material in such a manner may be referred to as "annealing" the base material.

Work hardening may be performed on a base material without introducing a substitutional and/or interstitial solute to form an alloy. Work hardening may also be performed on alloys that include solutes with a base material.

Solid Solution Strengthening

In an aspect of the present disclosure, a substitutional and/or interstitial solute may be added to a base material, which can result in substitutional and/or interstitial point defects in the alloy structure. The solute atoms can cause lattice distortions in the alloy structure that impede dislocation motion. When dislocation motion is impeded, the strength of the material is increased. This particular mechanism of strengthening a base material may be referred to as "solid solution strengthening."

In solid solution strengthening, the presence of solute atoms can introduce compressive or tensile stresses to the alloy structure lattice, which may interact with nearby dislocations, causing the solute atoms to act as potential barriers to the movement of layers of the structure with respect to each other. These interactions may increase the tensile strength and/or yield strength of a given alloy.

Solid solution strengthening generally depends on the concentration of the solute atoms present in the alloy structure. Some physical properties of substitutional and/or interstitial solute atoms that may be considered when determining which particular element to include in a given alloy may be the shear modulus of the solute atoms, the physical size of solute atoms, the number of valence electrons (also known as the "valency") of solute atoms, and the symmetry of the solute stress field, as well as other properties.

Precipitation Hardening

As a molten metal alloy cools, the base material atoms may form molecules and/or bond directly with solute(s) (or other impurities) instead of forming bonds with other base material atoms. The molecules/bonds formed between the base material and solute(s) or impurities will likely create different localized properties than in the pure base material structure and/or pure solute(s) structure. One of these properties may be the melting point of the molecule, which may be different than that of the pure base material and/or pure solute(s).

In an aspect of the present disclosure, the molecules may harden at a higher temperature than the pure base material and/or pure solute(s), which may create dislocations in the alloy structure. These dislocations may create substructures within the alloy structure that may be referred to as a different "phase" of the alloy structure. Because molecules of different sizes within the alloy structure may make it more difficult for base material layers to move with respect to each other within the alloy structure, these molecules may assist in creation of a stronger alloy.

This change in properties of the molecules, which may be referred to as a change in "solid solubility" with respect to temperature, when it affects the strength of the resultant alloy, may be referred to as a "precipitation hardening" mechanism. Because the melting points of the elements included in the alloy may be different, precipitation hardening (also known as "precipitation strengthening") may be dependent upon temperature.

Precipitation hardening uses these changes in solid solubility with respect to temperature to produce fine particles, e.g., molecules as described herein, of an impurity phase, or "second phase," which impede the movement of dislocations. These particles that compose the second phase precipitates act as pinning points in a similar manner.

The particles may be of a similar size, or coherent size, as the base material. If the sizes of the particles and the base material are similar enough, the alloy structure can remain relatively coherent, e.g., can remain in a bcc or cubic form.

However, in localized areas of the alloy structure, bowing and/or depressions may exist in the base material layers. This mechanism may be referred to as "coherency hardening" of the alloy structure, which is similar to solid solution hardening.

Where the particles have a different response to shear stress than the base material, this difference may change the tension and or internal stresses within the alloy structure. This response to shear stress is known as the "shear modulus" and because the particles can withstand a different amount of stress, the overall amount of stress that the alloy structure can withstand can be increased. This mechanism of precipitation hardening may be referred to as "modulus hardening" of the alloy structure.

Other types of precipitation hardening may be chemical strengthening and/or order strengthening, which are changes in the surface energy and/or an ordered structure of the particles within the alloy structure, respectively. Any one or more of these mechanisms may be present as a part of precipitation hardening in an alloy in an aspect of the present disclosure.

Dispersion Strengthening

Similar to precipitation hardening, changes in properties of the molecules, scattering different particles, molecules, and/or solutes within an alloy structure that are of different sizes than the base material may create dislocations within the alloy structure. Although these particles may be larger than those used for precipitation hardening, the mechanism of reducing the ability of base material layers from moving with respect to each other is similar. This mechanism may be referred to as "dispersion strengthening" to differentiate it from precipitation hardening. One type of dispersion strengthening is the introduction of an oxide of a base material in the alloy structure.

Grain Boundary Strengthening

In an aspect of the present disclosure, a unit cell of the alloy structure, e.g., one cube of an fcc, bcc, or cubic structure, etc., may be referred to as a "grain" or "crystallite" within the alloy structure. Solutes may affect the alloy structure by changing the average grain size within the alloy structure. When grains within the alloy structure have different sizes, the interface between adjacent grains, known as the "grain boundary," acts as a dislocation within the alloy structure. Grain boundaries act as borders for dislocation movement, and any dislocation within a grain affects how stresses build up or are relaxed in adjacent grains.

Such a mechanism may be referred to as "grain boundary strengthening" of a base material in an alloy. In an aspect of the present disclosure, grains within the alloy structure may have different crystallographic orientations, e.g., bcc, fcc, cubic, etc. These differing orientations and sizes create grain boundaries within the alloy structure. When the alloy structure is subjected to external stress, slip motion between base material layers may take place. However, the grain boundaries act as an impediment to slip motion between base material layers because the base material layers do not have uniform, even surfaces where slip motion can occur.

Transformation Strengthening

As described herein with respect to precipitation hardening, a base material may cool into different "phases" depending on the rate of cooling, the temperature of cooling, and/or other factors. For example, titanium (Ti) may form two different types of grains, known as α-titanium and β-titanium. α-titanium is formed when the molten titanium metal crystallizes at low temperatures, and forms a hcp lattice structure. β-titanium forms when the molten titanium crystallizes at higher temperatures, and forms a bcc lattice structure. These different structures within an overall alloy structure create a stronger alloy, because the base material layers' smooth interfaces with each other are interrupted by the change in grain size and lattice structure of the different phases of the base material and/or solute(s). This mechanism for strengthening alloys is known as "transformation strengthening."

In an aspect of the present disclosure, transformed phases of various base materials and/or solutes may occur as a function of heating and/or cooling the resultant alloy during formation of the alloy, e.g., heating the alloy to a certain temperature, cooling the alloy at a certain rate, heat treatment, etc. In an aspect of the present disclosure, during the 3D printing process of a given alloy, the temperature of the energy beam source 103 (e.g., the amount of energy being delivered by energy beam source 103), the speed that the energy beam travels across the powder bed 121 (e.g., the speed of deflector 105), and/or other factors may be selected to supply a desired temperature profile to the powder bed 121. For example, and not by way of limitation, the heating and/or cooling of a given powder 117 may be selected to approximate a heating and/or cooling profile to create desired phases of the base materials and/or solutes in the resultant alloy, and a different heating and/or cooling of a different powder 117 may be selected to create a different temperature profile to create desired phases in that powder 117's resultant alloy. In an aspect of the present disclosure, the temperature profile(s) delivered by PBF system 100 may also take into account any post-printing heat treatments, such that the combined printing/heat treatments may be performed in a more efficient manner.

In iron (Fe) structures, high levels of carbon (C) and manganese (Mn) solutes create two different grains within the alloy structure; ferrite, which is a bcc lattice structure, and martensite, which is a body-centered tetragonal (bct) lattice structure. These differing lattices within a Fe-based alloy structure strengthen the Fe into steel, because adjacent ferrite and martensite lattice structures disrupt the planar continuity of the base material layer interfaces, and the solutes (C and Mn) act as interstitial solutes to further disrupt the base material layer planes. Depending on how the alloy is heat treated, other lattice structures of Fe, e.g., austenite (which has an fcc lattice structure), bainite (which has a slightly different sized bct lattice structure than martensite), cementite (orthorhombic $Fe_3C$), and/or other compounds, may also be formed.

A form of transformation strengthening, such as the creation of cementite in a Fe-based alloy structure, may also be referred to as "triferrite particle formation" within the alloy structure. Of course, if the base material is titanium, such transformation strengthening may be referred to as "tri-titanium particle formation; if the base material is aluminum (Al), such transformation strengthening may be referred to as "trialuminide particle formation," etc. There also may be other forms of particles formed, such as a base material with two interstitial solutes or between interstitial and substitutional solutes, which may have a "di-" prefix, e.g., titanium diboride where both titanium and boron are used as solutes, etc., without departing from the scope of the present disclosure. Any number of different compounds, described with chemical prefixes, suffixes, and numerical monikers, comprising, consisting essentially of, and/or consisting base material(s) and/or solute(s) may be created within an alloy without departing from the scope of the present disclosure.

Alloy Compositions

In an aspect of the present disclosure, one or more base materials may be used to create an alloy. For example, and not by way of limitation, aluminum (Al) may be used as the base material; however, Al may be mixed with other materials, such as nickel (Ni), copper (Cu), titanium (Ti), iron (Fe), cobalt (Co), molybdenum (Mo), magnesium (Mg), chromium (Cr), and/or other materials, e.g., high entropy alloy (HEA) materials, etc., can be used by themselves as the base material. Other single base materials may also be substituted for Al without departing from the scope of the present disclosure.

One or more alloys of the present disclosure are configured with a balance of Al. In some aspects, the balance may include at most 0.1% by weight of trace elements. The Al may be alloyed with a set of other materials, such as one or more elements.

Example elements that may be used to form Al alloys in some configurations may include magnesium (Mg), manganese (Mn), silicon (Si), chromium (Cr), titanium (Ti), zirconium (Zr), Yttrium (Y), and/or some combination of all or subset of the foregoing set of elements.

In an aspect of the present disclosure, an alloy comprising aluminum (Al), magnesium (Mg), and silicon (Si) may be used. Such an alloy "system" or baseline may be referred to as the "Al—Mg—Si" alloy system herein.

In an aspect of the present disclosure, an Al—Mg—Si alloy composition may be manufactured that has increased strength. In an aspect of the present disclosure, an Al—Mg—Si alloy composition may be manufactured that has increased stiffness. In an aspect of the present disclosure, an Al—Mg—Si alloy composition may be manufactured that has increased strength and stiffness.

Eutectic alloys are a mixture of substances that melts or solidifies at a single temperature that is lower than the melting point of any of the constituents. The melting point of a eutectic alloy is referred to as the eutectic temperature, and is the lowest possible melting temperature over all of the mixing ratios for the component species used in the alloy. A non-eutectic mixture of materials has different melting temperatures for each, or at least some, of the species involved, as one species' lattice will melt at a lower temperature than others. Similarly, as a non-eutectic mixture cools, some of the components will solidify at a different temperature until the entire mixture is a solid.

When the proper ratio of elements are combined, the resultant material displays eutectic behavior, i.e., solidifies at or near a given temperature. When a mixture contains a smaller percentage of one of the species, it is considered to be "under active" or hypo-eutectic. When a mixture contains a larger percentage of one of the species, it is considered to be "over active" or hyper-eutectic. These changes in percentages of the various species included in an alloy In PBF additive manufacturing systems such as those described in FIGS. 1A-1D, the cooling of the fused material occurs at approximately $10^3$ to $10^{6}$° C./second, (or ° K/second). Such cooling rates induce a shift of the eutectic limits, e.g., the eutectic temperature, relative to those experienced in conventional alloy formation. For example, and not by way of limitation, excess Si in the Al—Mg—Si system can create undesirable eutectic Si phases in the final alloy. As another example, excess Mg in an alloy composition can result in microcracks in the as-printed material during solidification, narrowing the stable process window.

In an aspect of the present disclosure, compositions in the Al—Mg—Si alloy system of the present disclosure may include increased amounts of $Mg_2Si$, and employ additional solid solution strengthening in Al, while still allowing for PBF additive manufacturing with Si.

Combining Mg with Al and Si often increases the solid solution strengthening and precipitation strengthening of a resultant alloy through the formation of $Mg_2Si$ within the alloy. However, in PBF systems, such as laser PBF systems, excess Mg that does not form $Mg_2Si$ can lead to reduced strength of the overall alloy, as the excess Mg produces microcracks in the material upon solidification.

Al alloys that include nanograins may allow for any excess Mg to occupy the Al grain boundary. In such alloys, the alloy would enter an equilibrium, energy-balanced condition.

In an energy-balanced condition, the resultant Al—Mg—Si alloy in accordance with an aspect of the present disclosure may have increased overall material hardness and strength, because segregated Mg changes the nature of formation energy at the grain boundary and may reduce dislocation pile-up. In such an alloy, there may be a local increase of lattice strain related to the effects of residual stress from processing the material, e.g., machining, welding, additive manufacturing, etc.

In an aspect of the present disclosure, the percentage of Si to Mg in an additively manufactured Al—Mg—Si alloy may be controlled to reduce the amount of Mg that does not form $Mg_2Si$ in the final alloy. To reduce or eliminate microcracks in an additively manufactured Al—Mg—Si alloy, the Si/Mg ratio may be greater than a certain amount. In some embodiments of the present disclosure, an additively manufactured Al—Mg—Si alloy may have an Si/Mg ratio greater than 0.13.

Figure 2D:
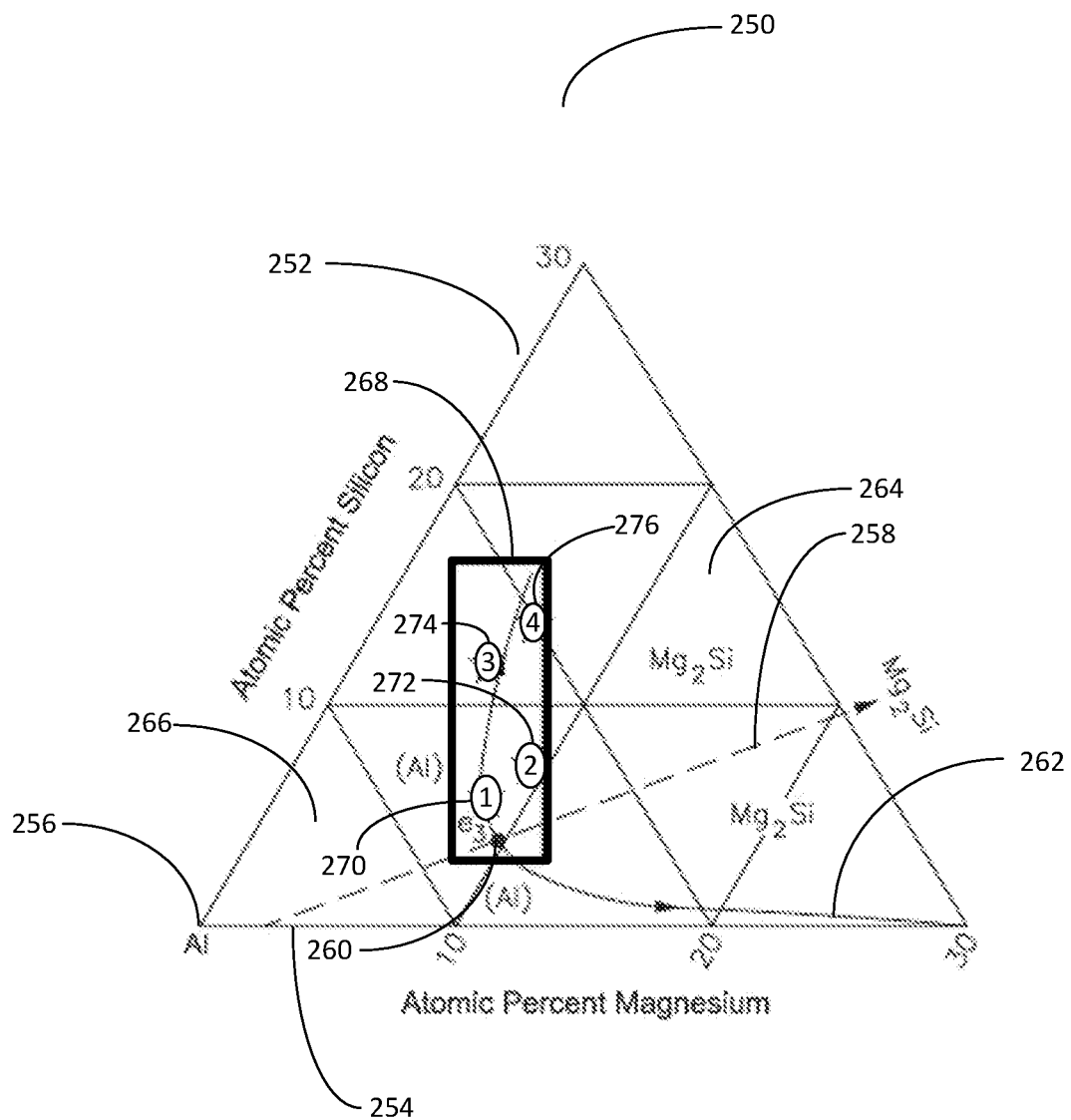
FIG. 2D illustrates a ternary diagram of alloy compositions in accordance with an aspect of the present disclosure.

FIG. 2D illustrates a ternary diagram of alloy compositions in accordance with an aspect of the present disclosure.

In an aspect of the present disclosure, hyper-eutectic and/or hypo-eutectic Al—Mg—Si Hyper- and hypo-eutectic Al—Mg—Si alloys in accordance with an aspect of the present disclosure may have increased strength.

In an aspect of the present disclosure, alloys of the form AlXSiYMg, where X≥5 and Y≥7 may be produced. As shown in FIG. 2D, ternary diagram 250 illustrates a combination of Al with various percentages of Si and Mg. Increases in percentages in silicon are shown on axis 252, and increases in the percentage of magnesium are shown on axis 254, with the origin 256 being pure aluminum. Dashed line 258 illustrates a constant percentage of Mg to Si, i.e., $Mg_2Si$. Point 260 is the location where there is no additional Mg or Si in the alloy, and arc 262 is the eutectic line where the Al—Mg—Si alloy cools at substantially the same temperature. To the left of arc 262, i.e., area 264, aluminum cools prior to the $Mg_2Si$ and other constituents; to the right of the line, i.e., area 266, $Mg_2Si$ cools before the overall alloy. However, in an aspect of the present disclosure, alloys may be formed in area 268, i.e., the hypo-eutectic and hyper-eutectic areas near arc 262.

Within area 268, compositions 270-276 are shown. Composition 270 is shown as comprising 5 percent Si, 9 percent Mg, and the balance of the alloy being Al (not accounting for any trace elements). Composition 270 is to the right of arc 262, and thus would be considered hyper-eutectic. Composition 272 is shown as comprising 7 percent Si, 10 percent Mg, and the balance of the alloy being Al (not accounting for any trace elements). Composition 272 is to the right of arc 262, and thus would be considered hyper-eutectic.

Composition 274 is shown as comprising 15 percent Si, 8 percent Mg, and the balance of the alloy being Al (not accounting for any trace elements). Composition 274 is to the left of arc 262, and thus would be considered hypo-eutectic. Composition 276 is shown as comprising 20 percent Si, 8 percent Mg, and the balance of the alloy being Al (not accounting for any trace elements). Composition 276 is to the right of arc 262, and thus would be considered hyper-eutectic. In an aspect of the present disclosure, other hypo- and hyper-eutectic Al—Mg—Si alloys are possible without departing from the scope of the present disclosure. Some of these hypo- and hyper-eutectic alloy compositions are illustrated in Table 1, along with compositions 270-276.

TABLE 1

| Al<u>X</u>Si<u>Y</u>Mg | Si (% by weight) | Mg (% by weight) | Al (and any trace elements) |
|---|---|---|---|
| SiMg-57 | 5 | 7 | Balance |
| SiMg-58 | 5 | 8 | Balance |
| SiMg-59 | 5 | 9 | Balance (composition 270) |
| SiMg-510 | 5 | 10 | Balance |
| SiMg-67 | 6 | 7 | Balance |
| SiMg-68 | 6 | 8 | Balance |
| SiMg-69 | 6 | 9 | Balance |
| SiMg-610 | 6 | 10 | Balance |
| SiMg-77 | 7 | 7 | Balance |
| SiMg-78 | 7 | 8 | Balance |
| SiMg-79 | 7 | 9 | Balance |
| SiMg-710 | 7 | 10 | Balance (composition 272) |

TABLE 1-continued

| Al<u>X</u>Si<u>Y</u>Mg | Si (% by weight) | Mg (% by weight) | Al (and any trace elements) |
|---|---|---|---|
| SiMg-158 | 15 | 8 | Balance (composition 274) |
| SiMg-208 | 20 | 8 | Balance (composition 276) |

In an aspect of the present disclosure, an alloy may include about 5-20% Si and 7-10% Mg by weight. In an aspect of the present disclosure, other elements may be added to any of the hypo- and hyper-eutectic alloys to enhance various characteristics and properties of the resultant alloy. In an aspect of the present disclosure, such additions may include, e.g., silver (Ag), nickel (Ni), manganese (Mn), calcium (Ca), zirconium (Zr), various rare earth metals, etc.

In an aspect of the present disclosure, one or more additional elements may be added to the Al—Mg—Si alloy to enhance or change one or more characteristics or properties of the resultant alloy. In such an aspect, calcium (Ca) and/or zirconium (Zr) may be added to the Al—Mg—Si alloy. Table 2 illustrates various combinations of an Al—Mg—Si alloy and additions of Ca, Zr, and Ca with Zr, in accordance with aspects of the present disclosure. Compositions 270-276 are noted in the table as SiMg-59 (composition 270), SiMg-710 (composition 272), SiMg-158 (composition 274), and SiMg-198 (composition 276).

In various embodiments including either Ca or Zr, or both Ca and Zr, the compositions may be represented by the following table:

TABLE 2

| Al<u>X</u>Si<u>Y</u>Mg | Si (% by weight) | Mg (% by weight) | Al (% by weight) | +Ca ONLY (% by weight) | +Zr ONLY (% by weight) | +(Ca & Zr) (% by weight) |
|---|---|---|---|---|---|---|
| SiMg-57 | 5 | 7 | Bal | 0.1-0.45 | 0.5-3 | 0.1-0.25 Ca & 0.5-1.5 Zr |
| SiMg-58 | 5 | 8 | Bal | 0.1-0.45 | 0.5-3 | 0.1-0.25 Ca & 0.5-1.5 Zr |
| SiMg-59 (270) | 5 | 9 | Bal | 0.1-0.45 | 0.5-3 | 0.1-0.25 Ca & 0.5-1.5 Zr |
| SiMg-510 | 5 | 10 | Bal | 0.1-0.45 | 2-5 | 0.1-0.35 Ca & 2.0-3.0 Zr |
| SiMg-67 | 6 | 7 | Bal | 0.1-0.45 | 0.5-3 | 0.1-0.35 Ca & 0.5-1.5 Zr |
| SiMg-68 | 6 | 8 | Bal | 0.1-0.45 | 0.5-3 | 0.1-0.35 Ca & 0.5-1.5 Zr |
| SiMg-69 | 6 | 9 | Bal | 0.1-0.45 | 2-5 | 0.1-0.35 Ca & 2.0-3.0 Zr |
| SiMg-610 | 6 | 10 | Bal | 0.1-0.45 | 2-5 | 0.1-0.35 Ca & 2.0-3.0 Zr |
| SiMg-77 | 7 | 7 | Bal | 0.1-0.45 | 0.5-3 | 0.1-0.35 Ca & 2.0-3.0 Zr |
| SiMg-78 | 7 | 8 | Bal | 0.1-0.45 | 0.5-3 | 0.1-0.35 Ca & 2.0-3.0 Zr |
| SiMg-79 | 7 | 9 | Bal | 0.1-0.45 | 0.5-3 | 0.1-0.35 Ca & 2.0-3.0 Zr |
| SiMg-710 (272) | 7 | 10 | Bal | 0.1-0.45 | 2-5 | 0.1-0.45 Ca & 2.0-3.5 Zr |
| SiMg-158 (274) | 15 | 8 | Bal | 0.1-0.45 | 2-5 | 0.1-0.45 Ca & 2.0-3.5 Zr |
| SiMg-198 (276) | 20 | 8 | Bal | 0.1-0.45 | 2-5 | 0.1-0.45 Ca & 2.0-3.5 Zr |

The aluminum alloys of the present disclosure may be formed into a powder, wire, or rod, e.g., for use in AM. AM raw materials may be manufactured by powder making processes as well as other methods, such as ingot metallurgy (I/M) in which a solid ingot is manufactured by melting the metal along with added alloying elements and solidifying in a mold (e.g., ingot). The molded solid or ingot is then deformed by various wrought material production methods, such as rolling, extrusion, drawing, etc. The ingots, wires, and rods are either melted and atomized to make powders or fed directly into the laser, electron, plasma beams, or electrical arc, such as TIG, MIG, to melt the metal layer by layer for the manufacture of AM products.

Powder characteristics may be important for successful fusion within an AM machine such as PBF and/or DMD. Some aspects of alloy powders that may be advantageous for use with AM may include but are not limited to, good flow, close packing of particles and spherical particle shape. These aspects may lead to consistent and predictable layers.

The remainder of the disclosure describes various embodiments in which the alloys described above may be implemented. One of ordinary skill in the art will readily understand how various structures described below may be formed in various ways from the alloys. For example, various structures may be 3D printed with the alloys, extruded with the alloys, forged with the alloys, and may or may not undergo various post-processing such as heat treatment, shot peening, machining, etc. Any structure described herein may be formed of one or more of the alloys described above. For example, nodes, vehicle chassis parts, suspension structures, frames, load-bearing structures, non-load bearing structures, panels, tubes, etc. may be formed of one or more of the alloys.

The alloy may be produced with a 3D printing process that includes a cooling rate greater than 1000 degrees Celsius per second, and may be at least one of Laser-Powder Bed Fusion, Electron Beam Powder Bed Fusion, or Directed Energy Deposition.

Although the alloy may consist essentially of the aluminum, the magnesium, and the silicon, such an alloy may optionally further comprise at least one of silver (Ag), nickel (Ni), manganese (Mn), calcium (Ca), zirconium (Zr), various rare earth metals, etc. Such an alloy may also have a yield strength of at least 450 MPa, and may have a yield strength of at least 480 MPa. Any of the herein-mentioned alloys in aspects of the present disclosure may include aluminum in a range between 76 percent by weight of the alloy and 88 percent by weight of the alloy.

In an aspect of the present disclosure, an Al—Mg—Si alloy may have an elongation of at least 4 percent. In another aspect of the present disclosure, an Al—Mg—Si alloy may have an elongation of at least 7%.

In an aspect of the present disclosure, an Al—Mg—Si alloy may have a hardness of at least 80 on the Rockwell hardness scale (HRB). In another aspect of the present disclosure, an Al—Mg—Si alloy may have a hardness of at least 88 on the Rockwell hardness scale.

Iron is the most common impurity found in aluminum. Iron has a high solubility in molten aluminum, and is therefore easily dissolved at all molten stages of production. The solubility of iron in the solid state is low and, depending on the cooling rate, it can precipitate by forming $FeAl_3$, and more complex AlFeMgSi, in the alloy to provide additional strength. Other impurities may be intentionally introduced into the alloy as desired without departing from the scope of the present disclosure.

In some exemplary applications, the one or more alloys of the present disclosure may be used for AM in automotive engineering. For example, the one or more alloys described herein may be additively manufactured for the production of nodes, joints, and/or other structures, which may be applied in vehicles (e.g., cars, trucks, etc.). For example, the one or more alloys described herein may be additively manufactured to produce all or a portion of a chassis, frame, body, etc. of a vehicle.

The characteristics of the one or more alloys described herein may contribute to the crashworthiness of structures produced from the one or more alloys described herein. Moreover, the one or more alloys of the present disclosure may be configured with the materials (e.g., elements) described herein so that products additively manufactured using at least a portion of the one or more alloys may reduce the weight of vehicles at a suitable insertion point (e.g., in comparison with existing approaches to vehicle manufacture).

The one or more alloys of the present disclosure may feature characteristics and/or properties that exceed the corresponding characteristics and/or properties of various existing alloys, e.g., in the context of AM applications. An example alloy of the present disclosure may be processed with the L-PBF method to print test bars. Tensile properties may be obtained from the example alloy.

AM raw materials can be manufactured by powder making processes as well as other methods such as Ingot Metallurgy (I/M) in which a solid ingot is manufactured by melting the metal along with added alloying elements and solidifying in a mold such as ingot. The molded solid or the ingot is then deformed by various wrought material production methods such as rolling, extrusion, drawing etc. The ingots, wires and rods are either melted and atomized to make powders or fed directly into the laser, electron, plasma beams, or electrical arc such as TIG, MIG, to melt the metal layer by layer manufacture AM products.

Powder characteristics may be important for successful fusion within an AM machine such as PBF and/or DED. Some aspects of alloy powders that may be advantageous for use with AM may include but are not limited to, good flow, close packing of particles and spherical particle shape. These aspects may lead to consistent and predictable layers.

The sections below describe various embodiments in which the alloys described herein may be implemented. One of ordinary skill in the art will readily understand how various structures described below may be formed in various ways from the alloys. For example, various structures may be 3D printed with the alloys, extruded with the alloys, forged with the alloys, and may or may not undergo various post-processing such as heat treatment, shot peening, machining, etc. Any structure described herein, as well as other structures, may be formed of one or more of the alloys described herein. For example, nodes, vehicle chassis parts, suspension structures, frames, load-bearing structures, non-load bearing structures, panels, tubes, etc. may be formed of one or more of the alloys of the present disclosure.

Figure 3:
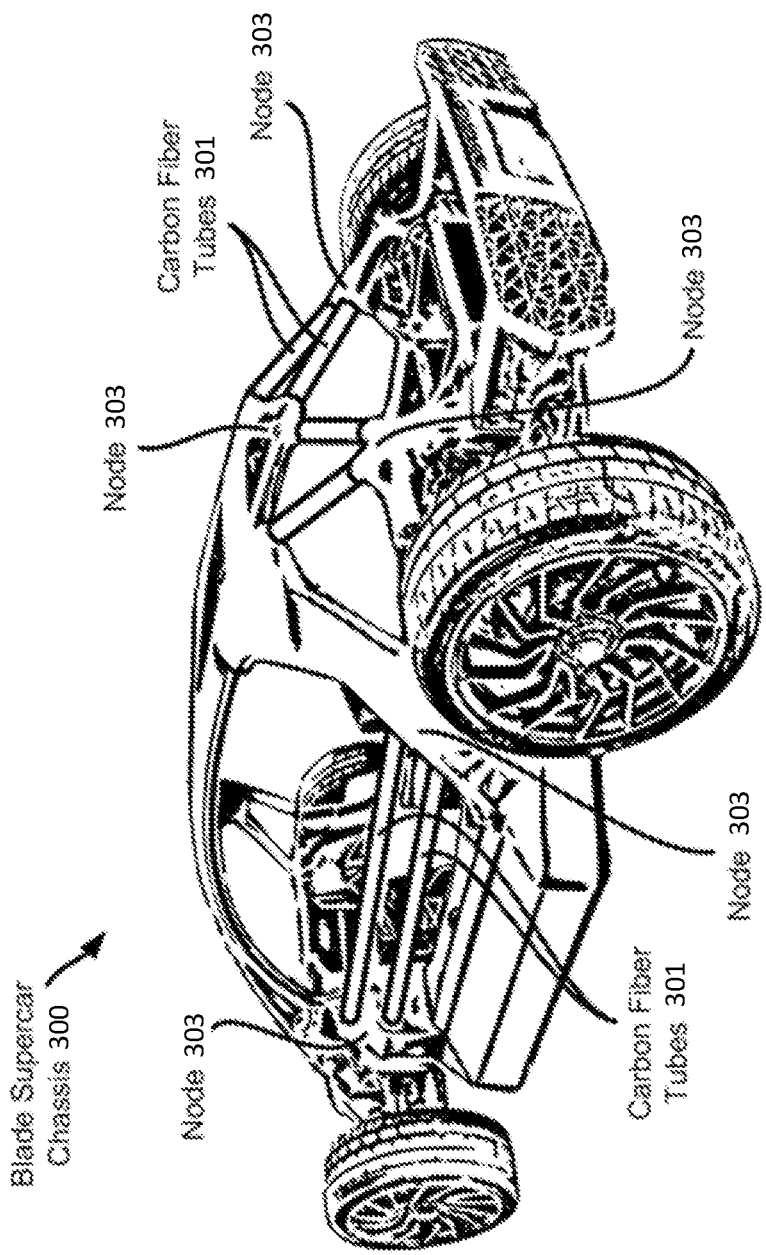
FIG. 3 illustrates a vehicle chassis in accordance with an aspect of the present disclosure.

FIG. 3 illustrates a vehicle chassis, such as a Blade supercar chassis, in which aspects of the disclosure may be implemented.

FIG. 3 illustrates an exemplary car chassis, i.e., Blade supercar chassis 300 built by Divergent Technologies, Inc., that includes nodes and tubes as part of the structure. Automobile chassis, such as Blade supercar chassis 300, are examples of structures in which aspects of the disclosure can be practiced. Although the examples described herein are directed primarily to vehicle structures, such as chassis, crush zones, etc., it should be understood that aspects of the disclosure can be applied to other structures that include node-tube connections.

Blade supercar chassis 300 includes carbon fiber tubes 301 connected by one or more nodes 303. Each node 303 can include, for example, a central body and one or more ports that extend from the central body. In various embodiments, a multi-port node may be provided to connect tubes, such as carbon fiber tubes 301, to form a two or three-dimensional structure. The structure may be a frame, for example. In one example, a structure having tubes with axes in substantially the same plane can be referred to as a planar frame, while a structure having tubes with axes in different planes may be referred to as a space frame. A space frame may define a volume. In some examples, a three-dimensional space frame structure may be a vehicle chassis.

The vehicle chassis may be have a length, width, and height that define a space, such as a passenger compartment of the vehicle.

A vehicle chassis may form the framework of a vehicle. A vehicle chassis may provide the structure for placement of body panels of a vehicle, such as door panels, roof panels, floor panels, or any other panels forming the vehicle enclosure.

Furthermore the chassis may be the structural support for the wheels, drive train, engine block, electrical components, heating and cooling systems, seats, storage space, etc. A vehicle may be a passenger vehicle, a cargo vehicle, etc. Examples of vehicles may include, but are not limited to sedans, trucks, buses, vans, minivans, station wagons, RVs, trailers, tractors, go-carts, automobiles, trains, or motorcycles, boats, spacecraft, or airplanes (e.g., winged aircraft, rotorcraft, gliders, lighter-than-air aerial vehicles). The vehicles may be land-based vehicles, aerial vehicles, water-based vehicles, or space-based vehicles. Any description herein of any type of vehicle or vehicle chassis may apply to any other type of vehicle or vehicle chassis.

The vehicle chassis may provide a form factor that matches the form factor of the type of vehicle. Depending on the type of vehicle, the vehicle chassis may have varying configurations. The vehicle chassis may have varying levels of complexity. In some instances, a three-dimensional space frame may be provided that may provide an outer framework for the vehicle. The outer framework may be configured to accept body panels to form a three-dimensional enclosure. In some cases, inner supports or components may be provided. The inner supports or components can be connected to the space frame through connection to the one or more joint members of the space frame. Different layouts of multi-port nodes and connecting tubes may be provided to accommodate different vehicle chassis configurations. In some cases, a set of nodes can be arranged to form a single unique chassis design. In some cases, at least a subset of the set of nodes can be used to form multiple chassis designs. In some cases at least a subset of nodes in a set of nodes can be assembled into a first chassis design and then disassembled and reused to form a second chassis design. The first chassis design and the second chassis design can be the same or they can be different.

In this example, carbon fiber tubes 301 are carbon fiber material. In various implementations, other composite materials may be used. In various configurations, alloys such as the alloys described herein can be used. Examples of composite materials include high modulus carbon fiber composite, high strength carbon fiber composite, plain weave carbon fiber composite, harness satin weave carbon composite, low modulus carbon fiber composite, low strength carbon fiber composite, etc. In some implementations, the tubes may be formed from other materials, such as plastics, polymers, metals, metal alloys, etc. The tubes may be formed from rigid materials. The tubes may be formed of one or more metal and/or non-metal materials.

The connecting tubes may have different cross-sectional shapes. For example, the connecting tubes may have a substantially circular shape, square shape, oval shape, hexagonal shape, or an irregular shape. The connecting tube cross-section could be a closed cross-section. The connecting tube cross-section could be an open cross-section, such as a C-channel, an I-beam, an angle, etc.

The tubes may be hollow tubes. A hollow portion may be provided along the entire length of the tube. For example, the connecting tubes may have an inner surface and an outer surface. An inner diameter for the tube may correspond to an inner surface of the connecting tube. An outer diameter of the tube may correspond to an outer diameter of the connecting tube. A connecting tube may have two ends. The two ends may be opposing one another. In some embodiments, the connecting tubes may have three, four, five, six or more ends.

Various aspects of node-to-tube connections presented in this disclosure may be suitable for use in a vehicle chassis frame such as Blade supercar chassis 300 shown in FIG. 3. The nodes in the Blade supercar chassis 300 may be designed to fit the tube angles dictated by the chassis design. The nodes may be fabricated to desired geometries to permit rapid and low cost assembly of the chassis. In some embodiments the nodes may be fabricated using 3-D printing techniques. 3-D printing the herein-described alloys may permit the nodes to be formed in a wide array of geometries that may accommodate different frame configurations. 3-D printing may permit the nodes to be formed based on a computer generated design file that includes dimensions of the nodes.

A node may be composed of a metallic material (e.g. an alloy described herein etc.), a composite material (e.g. carbon fiber, etc.), a polymeric material (e.g. plastic, etc.), a combination of these materials and/or other materials, etc. The node can be formed from a powder material. The nodes may be formed of one or more metal and/or non-metal materials. The 3-D printer can melt and/or sinter at least a portion of the powder material to form the node. The node may be formed of a substantially rigid material.

Nodes can be used, for example, as part of the chassis structures. A node is any 3-D printed part that is used to combine two or more parts together, such as tubes, extrusions, panels, or other nodes. The node may be used to provide support against different loads. A node may be found, for example, at the joint in a chassis framework. Further, in addition to connecting parts, nodes may be used for other purposes, including, for example, as crash structures. Using the principles herein, nodes can be manufactured using thin outer walls and selectively designed internal ribs for supporting the outer walls.

Figure 4:
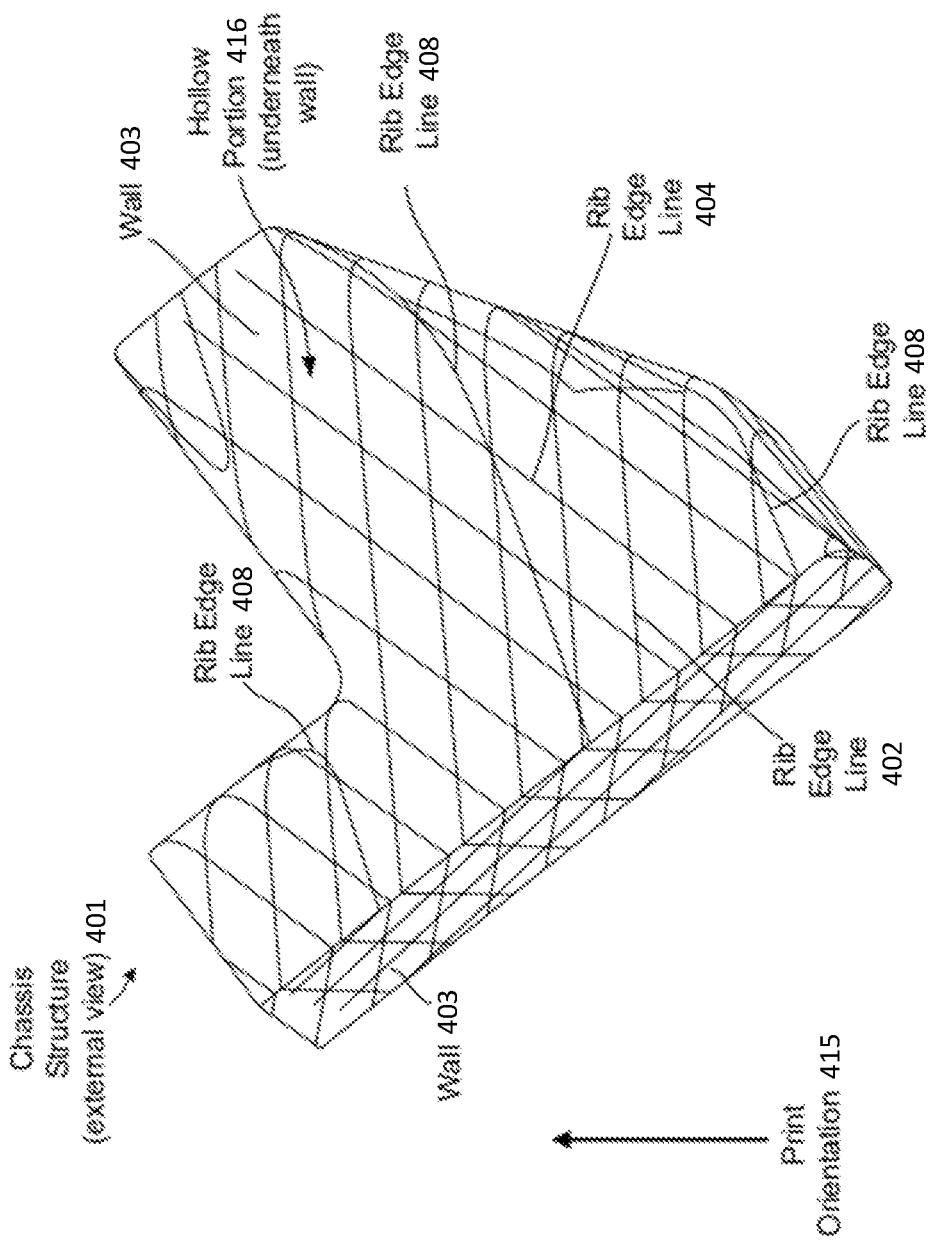
FIG. 4 illustrates a perspective view of a vehicle chassis structure in accordance with an aspect of the present disclosure.

FIG. 4 illustrates a perspective view of a vehicle chassis structure in accordance with an aspect of the present disclosure.

FIG. 4 illustrates an external perspective view of a vehicle chassis structure 401 in accordance with an embodiment. Chassis structure 401 is a 3-D printed hollow structure with internal ribs. Chassis structure 401 can be formed of an alloy described herein. In an embodiment, the chassis structure 401 is a vehicle node. Chassis structure 401 includes walls 403, which are outer walls defining the external surface of the chassis structure. In other words, walls 403 represent the outer skin of the chassis structure. As such, walls 403 extend around a perimeter of the chassis structure and bound a hollow portion 416 inside the hollow chassis structure 401.

Chassis structure 401 includes internal ribs that contact an inner surface of walls 403 at rib edge lines 402, 404, and 408. In other words, rib edge lines 402, 404 and 408 show the edges of the internal ribs where the internal ribs meet the inner surface of respective walls 403. The internal ribs can be attached to an inner surface of walls 403 during the 3-D printing process, for example. The internal ribs that correspond to rib edge lines like 402, 404 and 408 can extend the full length across hollow portion 416 of the chassis structure 401, that is, the internal ribs can extend from one wall to an opposing wall on the other side of the chassis structure, as shown in more detail in FIG. 5B-D. As an example, while the volume of hollow portion 416 may vary substantially depending on the nature of the chassis structure 401 and on the target specifications for dynamic stiffness, etc., in one exemplary embodiment, the hollow portion is approximately 1000 milliliters. In other embodiments this value could be larger or smaller.

As shown in greater detail below, the ribs can include multiple sets of ribs. Here, each of rib edge lines 402, 404 and 408 belongs to a different set of generally parallel ribs. That is, in this embodiment, each set of ribs includes multiple, parallel ribs, such that each rib in a set intersects with one or more ribs in the other sets. In this way, for example, the intersections of the ribs can provide support to help allow the individual ribs to be self-supporting, and in some embodiments to help the intersecting ribs act as more effective stiffening structures when handling external loads on the chassis structure when the chassis structure is in operation. In other embodiments, additional or different criteria may be used to assist the ribs to be self-supporting as well as to allow the ribs to optimally handle external loads and attenuate high frequency plate modes. For example, placing the intersecting sets of ribs at different angles relative to one another may be another factor helping the ribs to be self-supporting, and/or helping the ribs to act as more effective stiffening structures when handling external loads. Print orientation 415 is shown to illustrate how the chassis structure and rib edge lines in FIG. 4 are aligned relative to the print orientation, as described further below. In FIG. 4, print orientation 415 is pointed upwards and generally perpendicular to a plane of the upper surface of build plate 107.

Figure 5A:
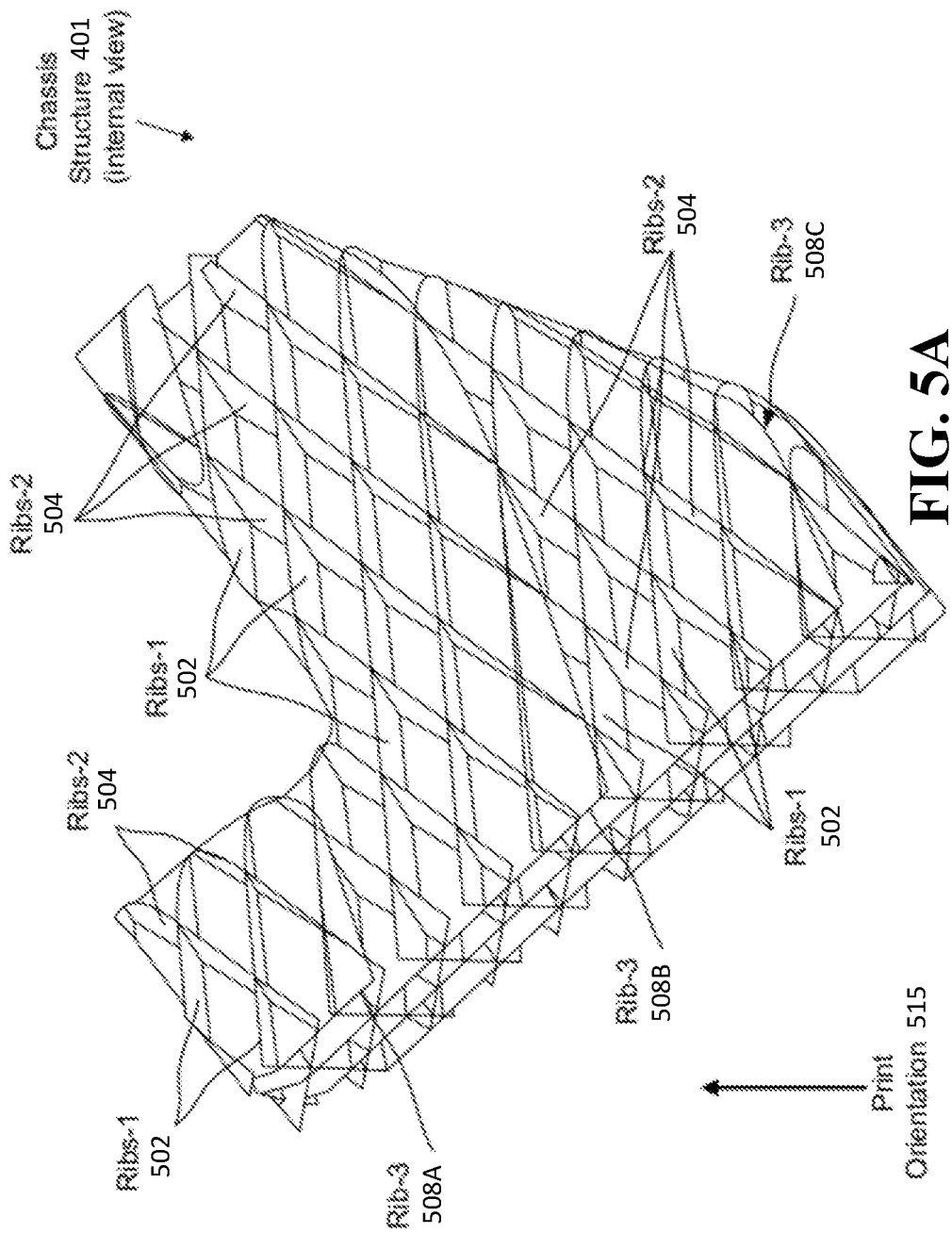
FIG. 5A illustrates a perspective view of the vehicle chassis structure with the outer walls removed in accordance with an aspect of the present disclosure.

FIG. 5A illustrates a perspective view of the vehicle chassis structure with the outer walls removed in accordance with an aspect of the present disclosure.

FIG. 5A illustrates an internal perspective view of the chassis structure 401 of FIG. 4 with the outer walls 403 removed to show details of the ribs within hollow portion 416. In an embodiment, the chassis structure 401 may constitute a node. Chassis structure 401 in FIG. 5A has been topologically optimized via one or more algorithms to produce a node with a reduced mass. FIG. 5A shows a more detailed view of the internal ribs of the chassis structure 401. As indicated in FIG. 4, there exist three different internal rib sets throughout the node. More specifically, the different sets of ribs in FIG. 5A include (i) a first set of parallel ribs (i.e., ribs-1 502) which is positioned in a first direction, (ii) a second set of parallel ribs (i.e., ribs-2 504) which is positioned in a second direction such that the two sets of ribs (i.e. ribs-1 502 and ribs-2 504) intersect each other at a number of different locations throughout the chassis structure 401, and (iii) a third set of ribs (three of which are referenced as rib-3 508A, rib-3 508B and rib-3 508C) which is positioned in a direction that spans across part or all of the first two sets of ribs and therefore intersects the first two sets of ribs (i.e., ribs-1 502 and ribs-2 504) at different locations throughout the chassis structure.

As is evident from FIG. 5A, each of ribs labeled rib-3 508A-C have different lengths, and therefore shorter ribs-3 508A-B do not intersect all of the ribs in the other two sets of ribs. In addition, to avoid unduly obscuring the concepts in FIG. 5A, not all ribs in all sets have been specifically identified by reference number. However, FIGS. 5B-D (below) show each individual set of ribs.

Figure 5B:
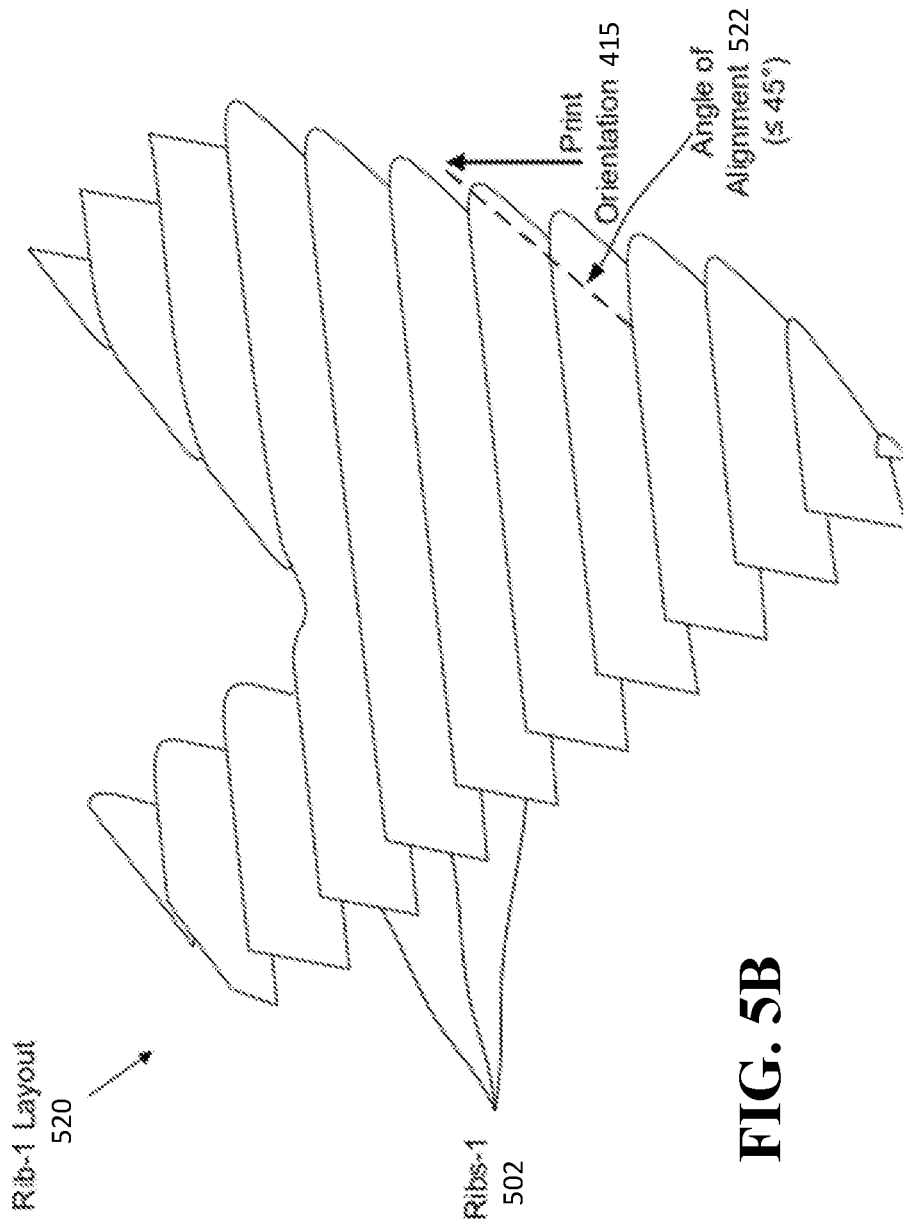
FIGS. 5B-D illustrate perspective views of the internal ribs of the vehicle chassis structure in accordance with an aspect of the present disclosure.
Figure 5C:
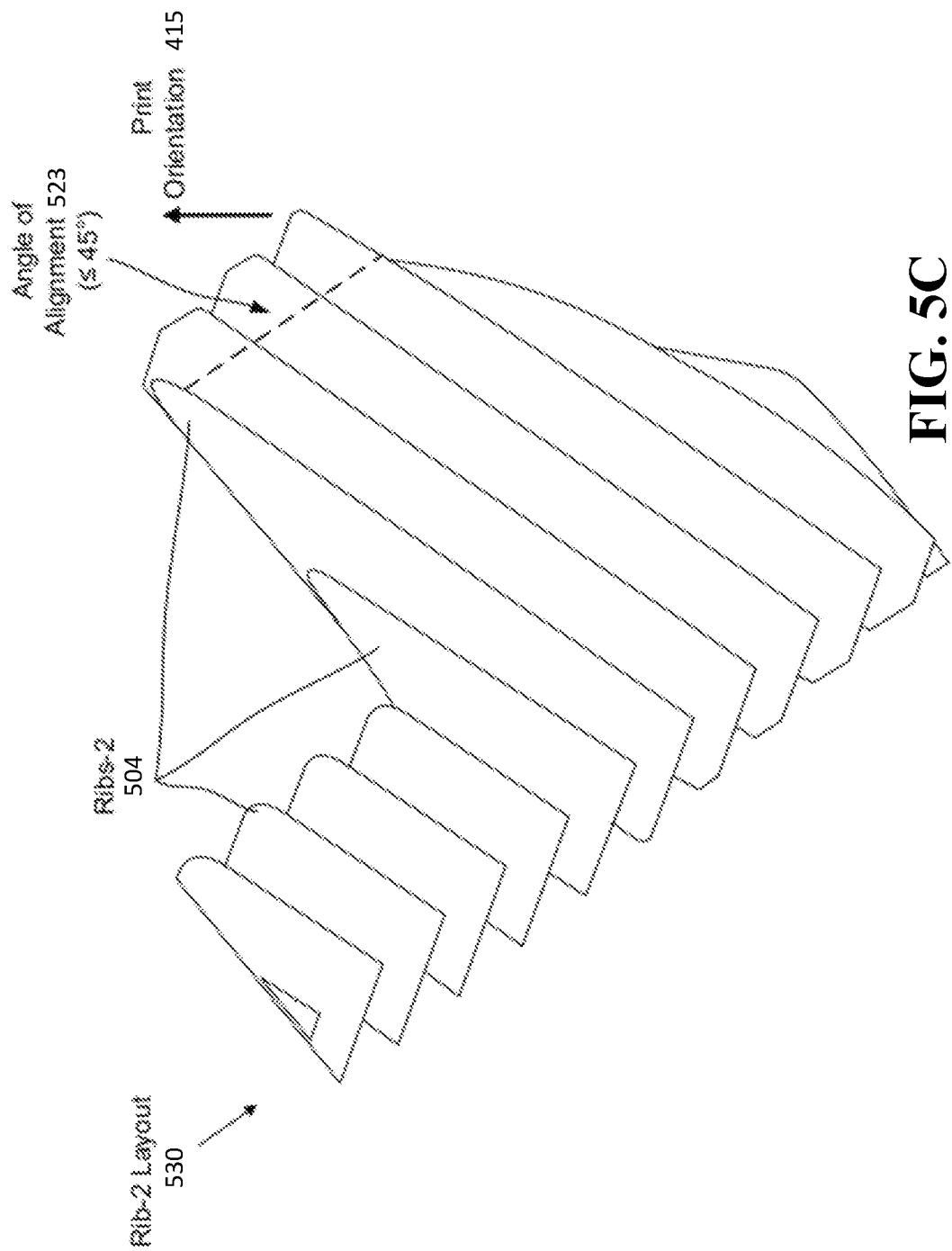
Figure 5D:
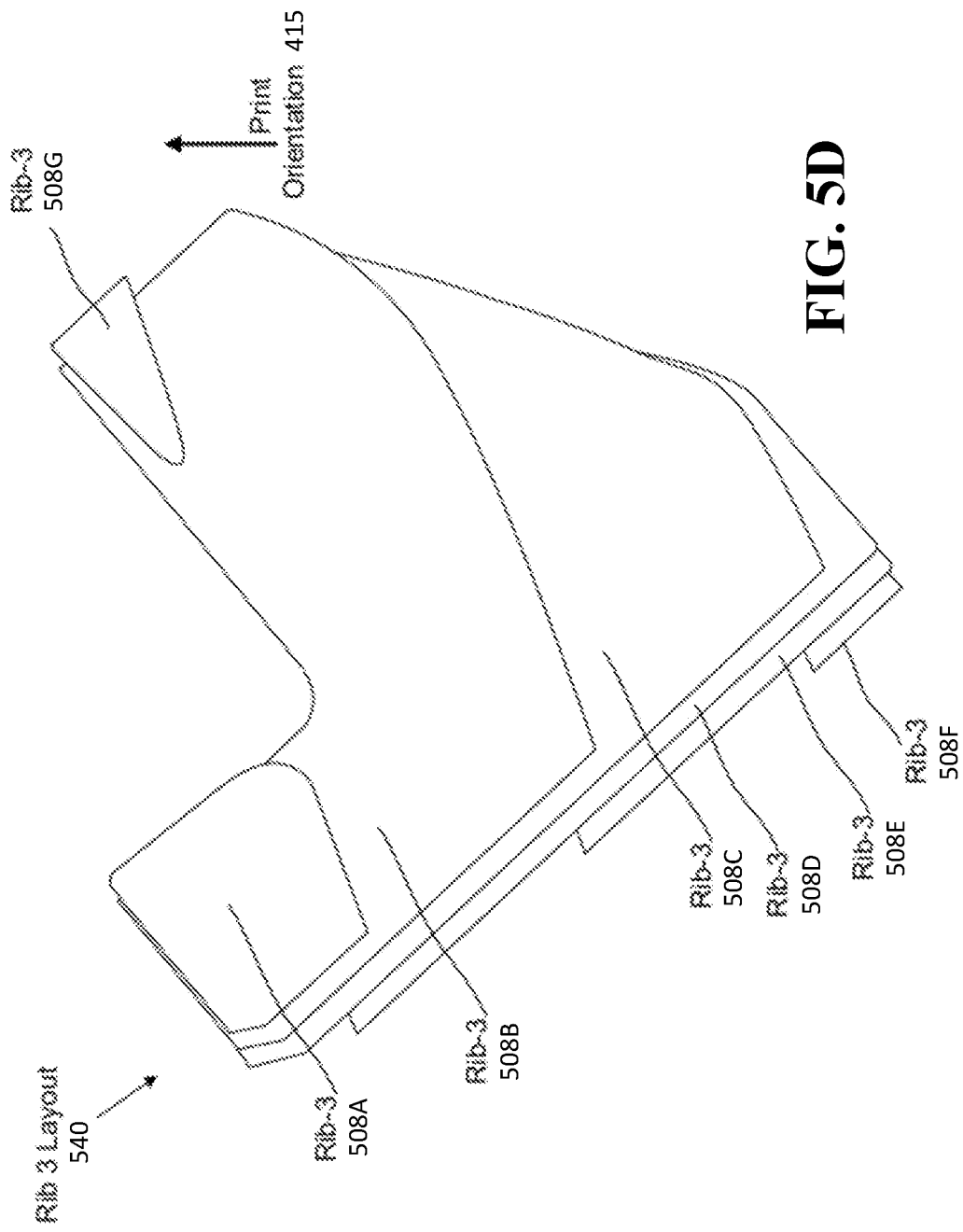

FIGS. 5B-D illustrate perspective views of the internal ribs of the vehicle chassis structure in accordance with an aspect of the present disclosure.

FIGS. 5B-D illustrate perspective views of the three sets of internal ribs of the vehicle chassis structure 401 of FIGS. 4 and 5A. For the purpose of clarity, FIGS. 5B-D show each set of ribs with all other structures removed so that the details of each individual set of ribs can be more easily seen.

FIG. 5B illustrates the rib-1 layout 520, which shows the first set of ribs identified in FIG. 5A as ribs-1 502. As is evident from the illustration, the ribs (ribs-1 502) are characterized by a plurality of components arranged in identically-oriented planes. The print orientation 415, that is, the direction in which layers or slices of print material are selectively added and scanned by the electron beam, is straight up and down. In various embodiments as shown in FIG. 5B, the angle of alignment 522 of each of ribs-1 502 is less than or equal to ($\leq$) 45 degrees (45°) relative to print orientation 515. In one embodiment, the angle of alignment 522 is equal to 45 degrees (45°). Accordingly, the first set of ribs (ribs-1 502) is self-supporting, and no support structures are required during 3-D printing.

FIG. 5C illustrates the rib-2 layout 530, which shows the second set of ribs identified in FIG. 5A as ribs-2 504. Like in FIG. 5B, the ribs in FIB. 5C can be characterized by a plurality of components in identically aligned planes. Here too, the angle of alignment 523 is less than or equal ($\leq$) 45 degrees (45°) relative to print orientation 415. Thus, the second set of ribs (ribs-2 504) are likewise self-supporting, and require no support structures during 3-D printing.

FIG. 5D illustrates the rib-3 layout 540, which shows the third set of ribs identified in FIG. 5A as including the three ribs labeled ribs-3 508A-C. FIG. 5D shows also the remaining ribs (i.e., ribs-3 508D-G) in the third set. As in the first two sets, each of the ribs (ribs-3 508A-G) in the third set is shaped differently, but the ribs are oriented in parallel planes. Here too, the angle of alignment is less than or equal ($\leq$) 45 degrees (45°) relative to print orientation 415. It should be noted that in the perspective of this figure, the angle of alignment is angled into the page, and therefore is not shown, in order to avoid confusion. However, one of ordinary skill in the art will readily understand the angle of alignment of ribs is less than or equal ($\leq$) 45 degrees (45°) relative to print orientation 415. Thus, the second set of ribs (ribs-3 508A-G) are likewise self-supporting, and require no support structures during 3-D printing.

Referring back to FIG. 5A, ribs-1 502 are shown as intersecting ribs-2 504, which in turn creates a plurality of 'diamond shaped' pockets in the chassis structure 401. Likewise, each rib-3 508 cuts at least partially through one or more ribs in the first two sets of ribs (i.e., ribs-1 502 and ribs-2 504) to create additional pockets in lower planes of the chassis structure 401.

Producing a plurality of ribs in the third set (i.e., each rib-3 508) can be used to further support the first and second sets of ribs (i.e. ribs-1 502 and ribs-2 504). This added support can enable chassis structure 401 to use only self-supporting ribs to act as stiffening structures that meet dynamic stiffness requirements while concurrently minimizing the mass of the chassis structure 401. Chassis structure 401 is for illustrative purposes only, and other chassis structures, such as other nodes, may use fewer or more ribs in each set of ribs, as necessary, to accomplish its target goals. In addition, while three sets of ribs are shown in FIG. 5A, in other embodiments a different number of sets of ribs is also possible. Referring still to FIG. 5A-D, it can be appreciated that eliminating the requirement of supports in the 3-D printing also minimizes post-processing time, at least because there are no support structures that require separation and removal. Further, the wall thickness can be dramatically reduced—on the order of 1 to 2 millimeters or less—when using 3-D printing as compared to the current casting or extrusion techniques commonly used to make these types of chassis structures.

One advantage of the chassis structure 401 is that each of the ribs in all three sets is self-supporting. Further, in various embodiments, each of the ribs can be used as stiffening structures for attenuating high plate nodes, without any rib in the chassis structure 401 being used solely for supporting a wall during 3-D printing. Further, because the ribs may be used also to support the walls 403 during 3-D printing concurrent with their use as stiffening structures when in operation, the use of the self-supporting ribs effectively eliminates the need for external support structures, e.g., to support the walls 403 during 3-D printing. Another advantage of the chassis structure 401 in FIG. 4 (and further disclosed in FIGS. 5A-D) is that the mass of the chassis structure 401 can be dramatically reduced due to the thinner walls that can be used (e.g., 1-2 millimeters (mm) or less). The number, thickness and orientation of the ribs may also be optimally selected to minimize overall mass of the chassis structure 401. For example, the ribs can in various embodiments be made with a thickness of about 1-4 millimeters (mm), or less.

Figure 6:
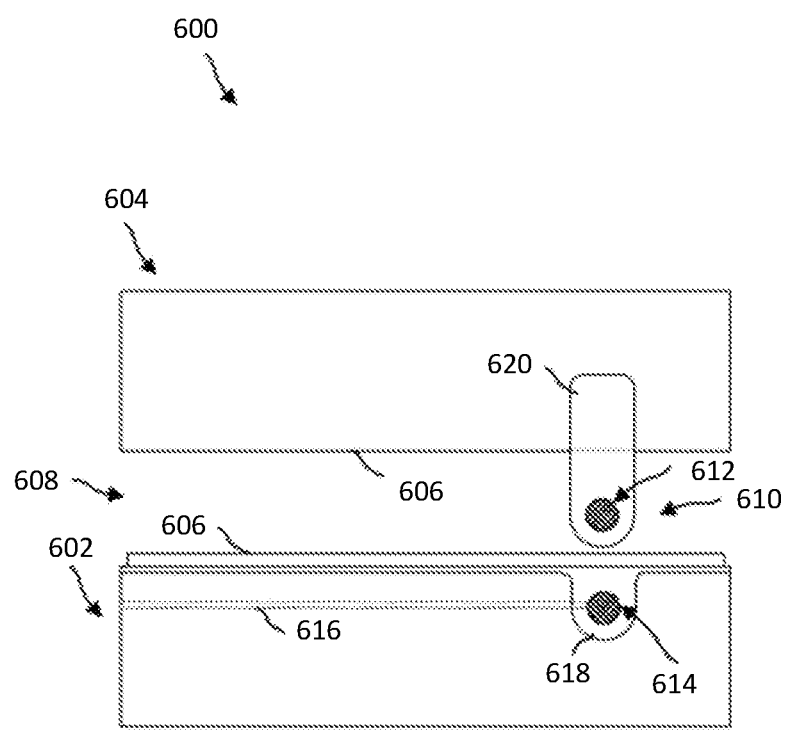
FIG. 6 is a diagram illustrating an example structure in accordance with an aspect of the present disclosure.

FIG. 6 is a diagram illustrating an example structure in accordance with an aspect of the present disclosure. FIG. 6 is a diagram illustrating an example structure 600. The example structure 600 illustrated in FIG. 6 includes a first additively manufactured (AM) part 602 configured to connect to a second part 604 via a primary connection 606 applied to an interface 608 between the first AM part 602 and the second part 604. The additively manufactured part can be formed of one or more of the alloys described herein.

Figure 7:
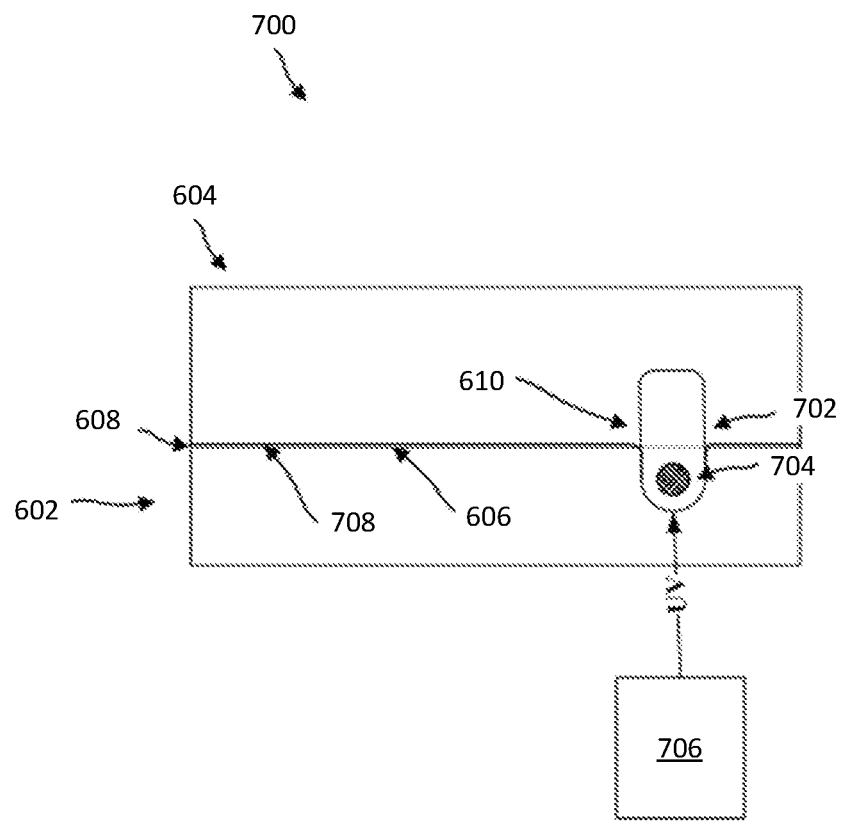
FIG. 7 is a diagram illustrating the example structure in an assembled state in accordance with an aspect of the present disclosure.

In an aspect, at least one retention element 610 including a secondary connection 702 (see FIG. 7). The secondary connection 702 including a first adhesive 704 (see FIG. 7) configured to secure the first AM part 702 and the second part 704. The secondary connection is located to provide a connection between the first AM part 702 and the second part 704.

FIG. 7 is a diagram illustrating the example structure in an assembled state in accordance with an aspect of the present disclosure.

FIG. 7 is a diagram illustrating the example structure 700 in an assembled state. The example structure 700 illustrated in FIG. 7 includes the first AM part 602 connected to the second part 604 via the primary connection 606 applied to the interface 608 between the first AM part 602 and the second part 604.

In an aspect, the at least one retention element 610 including a secondary connection 702. The secondary connection 702 including a first adhesive 704 configured to secure the first AM part 602 and the second part 604. The secondary connection may be located to provide a connection between the first AM part 602 and the second part 604.

The example structure 600 may include a first additively manufactured (AM) part 602 and at least one retention element 604. The first AM part 602 may be a node, a subcomponent of a node, or other type of component. The AM part 602 may be printed through any conventional means including, for example, via PBF. The PBF printing may be performed using any technology suitable for use in PBF printing. These technologies may include, for example, selective laser melting (SLM), selective laser sintering (SLS), selective heat sintering (SHS), electron beam melting (EBM), direct metal laser sintering (DMLS), and others. In other embodiments, the AM part 602 may be printing using a different 3-D print technology such as fused deposition modeling (FDM). FDM AM may be ideal for printing various plastics, thermoplastics, etc. In general, the AM part 602 may be additively manufactured using any known AM technique or techniques.

One advantage of the use of AM in combining parts is that, due to the design flexibility of AM, the AM part 602 may include various features 612, 614, 616 that may, in turn, be used in conjunction with the adhesive-based part retention. For example, AM may be used to generate features 612, 614 that are adhered together, features 616 that carry adhesive to a location or locations (e.g., primary connection 606 and/or retention element 610, feature 614) where the AM part 602 may be adhered to another part 604, or a combination of both of these (e.g., features 612, 614, 616). Furthermore, adhesive-based part retention may be combined with mechanical-based part retention. For example, primary adhesive-based part retention may be combined with mechanical-based part retention. Secondary adhesive-based part retention (e.g., holding parts together while a primary adhesive is applied, dries, and/or cures) may be combined with mechanical-based part retention. Some combination of primary adhesive-based part retention and secondary adhesive-based part retention may be combined with mechanical-based part retention. Mechanical-based part retention may include, for example, groove that retains a snap-ring, screw and shim, spring-loaded clips, clips, a snap-like part retention element, snap-like part retention feature slidably engaging with a receptacle on an another part, a Christmas tree fastener, magnets, a tongue and groove connection, or other mechanical-based connections.

In an example, the first AM part 602 may be configured to connect to a second part 604. The second part 604 may include, for example, an AM part, a tube, a panel, an extrusion, any other type of conventionally-manufactured part, or a COTS part. Thus, structures formed may be manufactured by bonding together, for example, two (or more) AM parts (e.g., where one AM part may be considered the first AM part), or an AM part (e.g., where the AM part may be considered the first AM part) and a tube, panel, extrusion, or any other type of conventionally-manufactured part, or a COTS part.

The connection between the first AM part 602 and the second part may be via a primary connection. For example, the primary connection may include a primary adhesive for bonding the structures together. The primary connection may be applied to an interface between the first AM part 602 and the second part 604. For example, the primary adhesive may be applied.

A part retention feature (e.g., part retention element 610) may, in some embodiments, be temporary and may be removed after the primary adhesive bond between the structures is formed. Adhesive(s) may also be used for the part retention features. For example, at least one retention element may be included. The at least one retention element may include a secondary connection 702. The secondary connection 702 may include an adhesive configured to secure the first AM part 602 and the second part 604. Furthermore, the secondary connection 702 may be located to provide a connection between the first AM part 602 and the second part 604.

In an aspect, the first adhesive includes a hot melt material applied between a first mechanical feature 614 associated with the first AM part 602 and a second mechanical feature 612 associated with the second part 604. The hot melt material may include any form of hot melt adhesive, hot melt glue, or another thermoplastic adhesive. Generally, however, the hot melt adhesive, hot melt glue, or another thermoplastic adhesive may be quick curing such that hot melt adhesive, hot melt glue, or another thermoplastic adhesive. Accordingly, the hot melt material may be a quick curing adhesive or a quick curing sealant.

In an aspect, hot melt material may be used. The hot melt material may be a quick curing adhesive or sealant that may be applied to the mechanical features on two components to be connected. The features may have an increased surface area. The increased surface area may enable sufficient bond strength to retain the two (or more) parts being connected. Once the hot melt retention fluid cures, adhesive may be injected between the nodes being connected. The cured hot melt feature would ensure that the two parts 602, 604 are retained during the adhesive injection process. The retention force (i.e., the force provided by the hot melt holding the two nodes together) would be higher than the adhesive injection force, thereby securely holding the parts 602, 604 in the proper orientation and with a desired separation distance to ensure repeatable bonds.

In an aspect, the first adhesive includes an ultraviolet (UV) cured adhesive applied between a first mechanical feature associated with the first AM part 602 and a second mechanical feature associated with the second part. UV cure systems 706 may be utilized as part retention features. In this embodiment, adhesives at the retention features would be UV cured such that they are held in place during the adhesive injection and curing process. The UV cure adhesives would be applied at strategic locations to provide sufficient retention force. The UV cure adhesive would be configured to cure prior to the adhesive injection and curing.

In an aspect, the primary connection 606 between the first AM part 602 and the second part 604 includes a second adhesive 708. For example, a secondary adhesive may be between the first AM part 602 and the second part 604 where the first AM part 602 and the second part 604 meet, e.g., as illustrated in FIG. 7.

In an aspect, the first adhesive 704 is faster curing than the second adhesive 708. For example, as discussed herein, hot melt material such as, hot melt adhesive, hot melt glue, or another thermoplastic adhesive that may be quick curing may be used as the first adhesive 704. The second adhesive 708 may cure more slowly.

In an aspect, the secondary connection 702 further includes a mechanical structure (e.g., making up retention element 610). For example, the secondary connection may include both an adhesive and mechanical-based part retention. Mechanical-based part retention may include, for example, groove that retains a snap-ring, screw and shim, spring-loaded clips, clips, a snap-like part retention element, snap-like part retention feature slidably engaging with a receptacle on another part, a Christmas tree fastener, magnets, a tongue and groove connection, or other mechanical-based connections that may be used in addition to the adhesive.

In an aspect, the mechanical structure may be integrated with at least one of the first AM part 602 and the second part 604. For example, mechanical structure 618 may be integrated with the first AM part 602. Mechanical structure 620 may be integrated with the second part 604.

In an aspect, the mechanical structure is co-printed with at least one of the first AM part 602 and the second part 604. For example, mechanical structure 618 may be co-printed with the first AM part 602. Mechanical structure 620 may be co-printed with the second part 604.

In an aspect, the mechanical structure is separate from the first AM part 602 and the second part 604. For example, mechanical structure 618 may be attached to the first AM part 602 after the first AM part 602 is manufactured. Mechanical structure 620 may be attached to the second part 604 after the second part 604 is manufactured.

Figure 8:
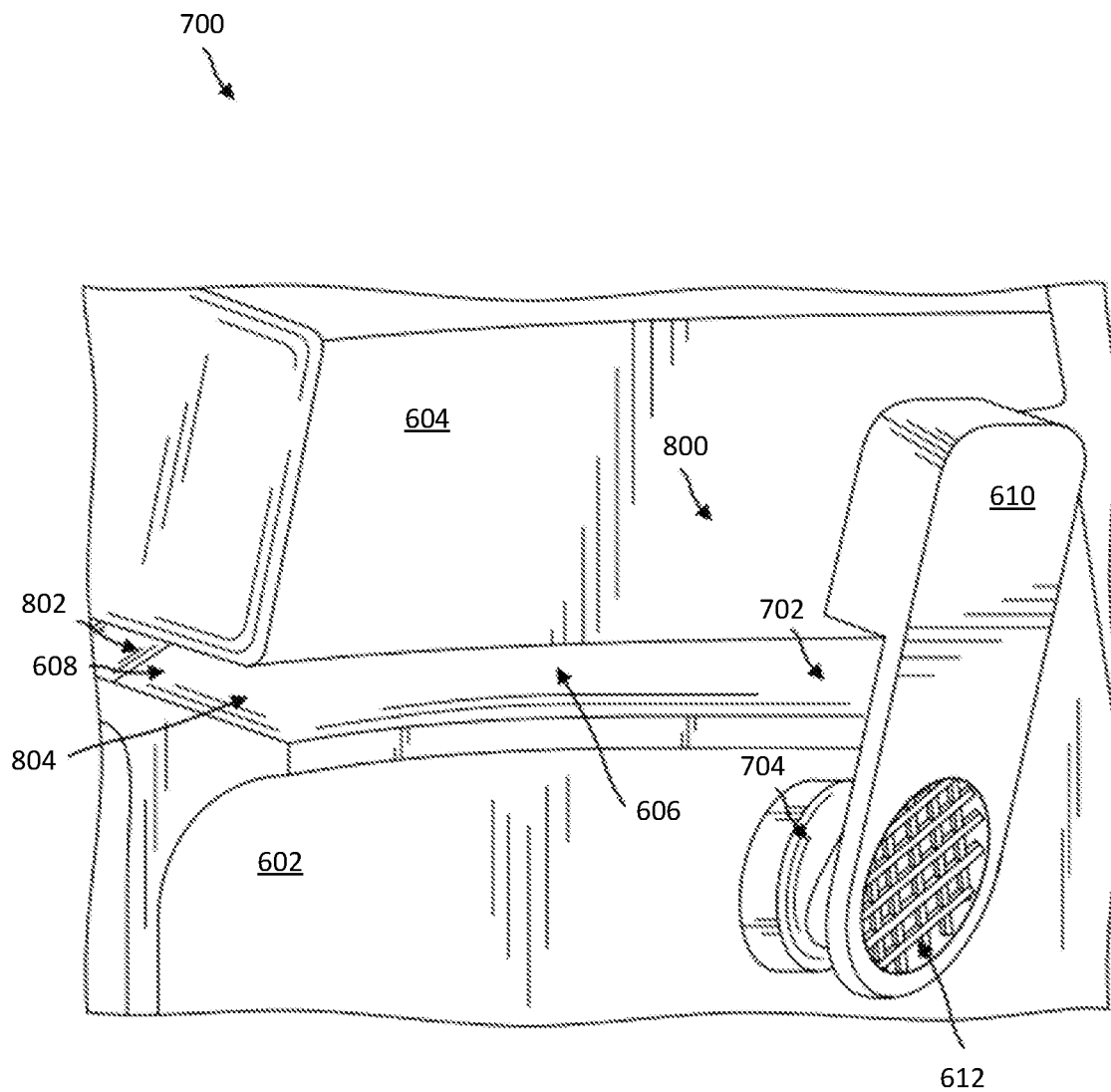
FIG. 8 is a diagram illustrating a portion of the example structure of FIG. 7 in accordance with an aspect of the present disclosure.

FIG. 8 is a diagram illustrating a portion of the example structure of FIG. 7 in accordance with an aspect of the present disclosure.

FIG. 8 is a diagram illustrating a portion 800 of the example structure 700 of FIG. 7. The example structure 800 includes the first AM part 602 connected to the second part 604 via the primary connection 606 applied to the interface 608 between the first AM part 602 and the second part 604.

In an aspect, the at least one retention element 610 including a secondary connection 702. The secondary connection 702 including a first adhesive 704 configured to secure the first AM part 602 and the second part 604. The secondary connection may be located to provide a connection between the first AM part 602 and the second part 604.

As illustrated in FIG. 8, the second part 604 may be a node with a groove 802. The first AM part 602 may be a node with a tongue 804. The tongue 804 of the first AM part 602 may insert into the groove 802 of the second part 604, e.g., when the first AM part 602 is assembled with the second part 604 to form a structure. The adhesive 704 may be a hot melt adhesive that may be applied near a hot melt retention feature, e.g., mechanical feature 612, that mates with another retention feature, e.g., retention element 610.

Figure 9:
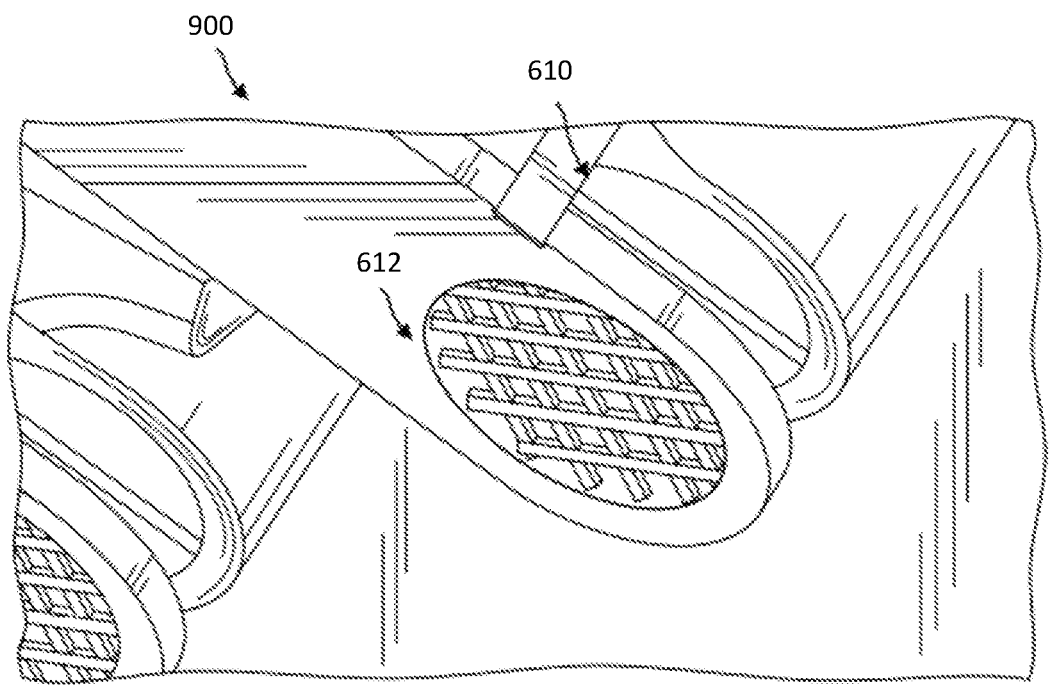
FIG. 9 is a diagram illustrating a portion of the example structure of FIG. 7 in accordance with an aspect of the present disclosure.

FIG. 9 is a diagram illustrating a portion of the example structure of FIG. 7 in accordance with an aspect of the present disclosure.

FIG. 9 is a diagram illustrating a portion 900 of the example structure 700 of FIG. 7. More specifically, FIG. 9 illustrates an example of the hot melt retention feature, e.g., mechanical feature 612, that mates with another retention feature, e.g., retention element 610. As illustrated in FIG. 9, the hot melt retention feature, e.g., mechanical feature 612 may be a single bar retention feature. Accordingly, mechanical feature 612 may be a single bar or shaft across an open circular area that forms a retention feature. Additionally, as illustrated in FIG. 9, a hot melt retention feature, e.g., retention element 610 may be a tennis racket or waffle maker retention feature. Accordingly, retention element 610 may be multiple bars or shafts across an open circular area that forms a retention feature generally similar in shape to a tennis racket or hot plate on a waffle maker. Glue or adhesive may be placed between the retention element 610 and the mechanical feature 612. The glue or adhesive may flow in between portions of the retention element 610 and the mechanical feature 612 and may bind to the portions of the retention element 610 and the mechanical feature 612. For example, the glue or adhesive may bind to the single bar retention feature and/or the tennis racket or waffle maker retention features.

Figure 10:
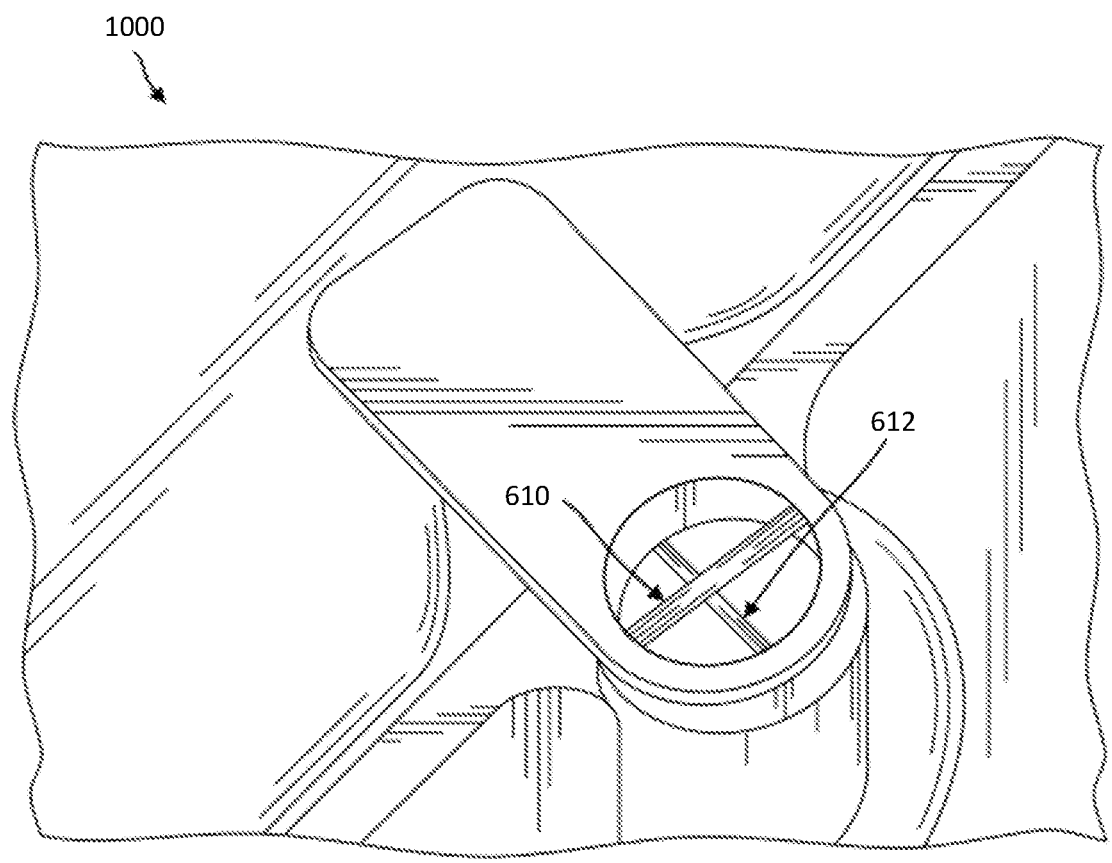
FIG. 10 is a diagram illustrating a portion of the example structure of FIG. 7 in accordance with an aspect of the present disclosure.

FIG. 10 is a diagram illustrating a portion of the example structure of FIG. 7 in accordance with an aspect of the present disclosure.

FIG. 10 is a diagram illustrating a portion 1000 of the example structure 700 of FIG. 7. More specifically, FIG. 10 illustrates two examples of the hot melt retention feature, e.g., retention element 610 and mechanical feature 612 that mate together. The retention element 610 and mechanical feature 612 are both single bars or shafts. The single bars or shafts are each formed across a respective circular opening, each circular opening (and the corresponding bar or shaft) forms a respective retention feature. Glue or adhesive may be placed between the retention element 610 and the mechanical feature 612. The glue or adhesive may flow in between portions of the retention element 610 and the mechanical feature 612 and may bind to the portions of the retention element 610 and the mechanical feature 612. For example, the glue or adhesive may bind to the single bar retention features.

In an aspect, a means for additively manufacturing a first AM part 602 may include a 3-D printer system (e.g., PBF system) or another additively manufacturing system. The means for additively manufacturing a first AM part may manufacture the first AM part 602 configured to connect to a second part 604 via a primary connection 606 applied to an interface 608 between the first AM part 602 and the second part 604.

In an aspect, a means for attaching the second part 604 to the first AM part 602 may include a mechanical device or devices (such as one or more manufacturing robot) for attaching the second part 604 to the first AM part 602. For example, the manufacturing robot(s) may locate the second part 604 proximal to the first AM part 602.

In an aspect, one or more manufacturing robot(s) may apply one or more adhesives to one or more retention elements. Accordingly, in an aspect, a means for applying the first adhesive may include one or more manufacturing robot(s). For example, a dedicated robot (or robots) may be used to apply adhesive(s). In another example, the one or more manufacturing robot used for attaching the second part 604 to the first AM part 602 may also be configured to apply adhesive(s). Accordingly, the means for applying the first adhesive may include aspects of the for attaching the second part 604 to the first AM part 602 that apply the adhesive(s).

Manufacturing robot(s) may attach the second part 604 to the first AM part 602 using at least one retention element 610 including a secondary connection 702. The secondary connection 702 may include a first adhesive configured to secure the first AM part 602 and the second part 604. The secondary connection 702 may be located to provide a connection between the first AM part 602 and the second part 604.

A means for applying the first adhesive may be configured to apply the first adhesive during one of application of the second adhesive, during curing of the second adhesive, prior to application of the second adhesive, and/or prior to curing of the second adhesive. In an aspect, the adhesive(s) may be applied to secure the first AM part and the second part during application of the second adhesive. In an aspect, the adhesive(s) may be applied to secure the first AM part and the second part during curing of the second adhesive.

Figure 11A:
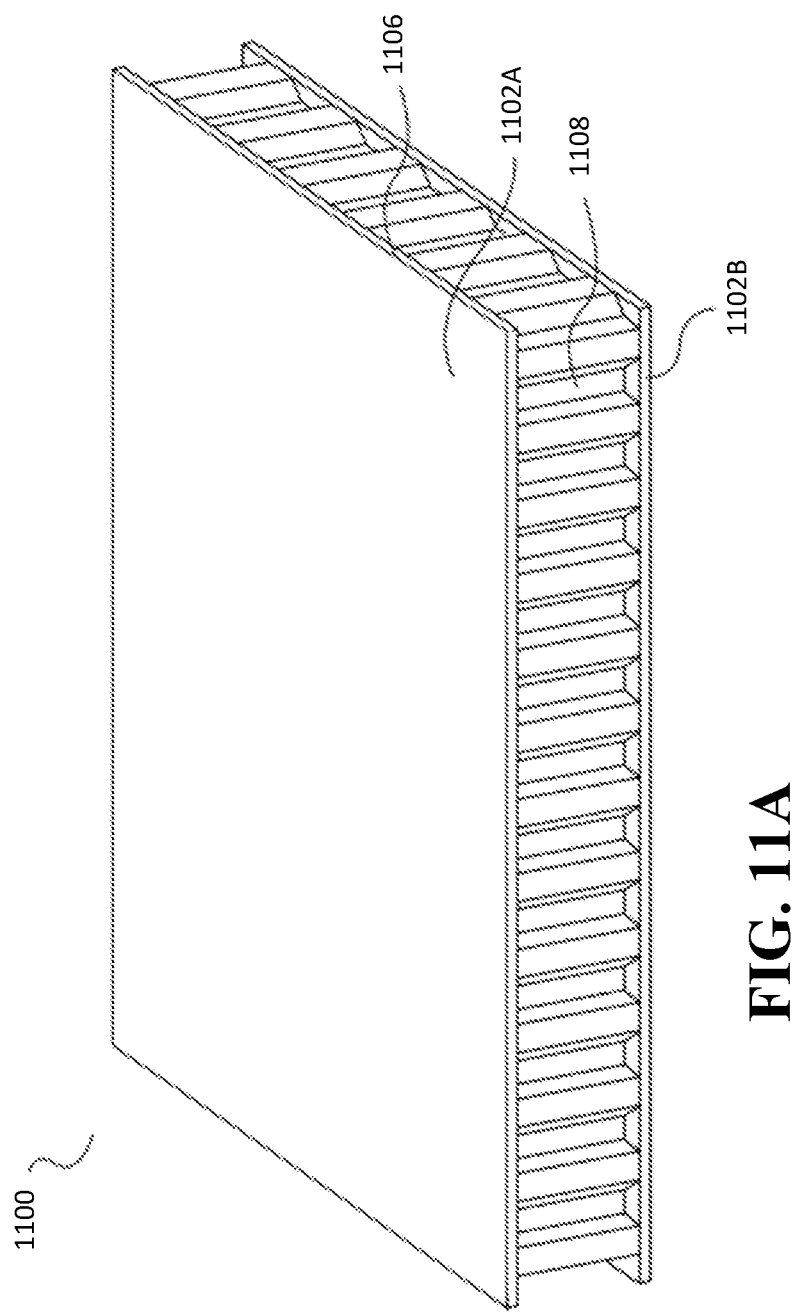
FIG. 11A illustrates a perspective view of an exemplary panel using a honeycomb lattice core in accordance with an aspect of the present disclosure.

FIG. 11A illustrates a perspective view of an exemplary panel using a honeycomb lattice core in accordance with an aspect of the present disclosure.

FIG. 11A illustrates a perspective view of an exemplary honeycomb panel 1100 with an additively manufactured core that can be formed of one or more alloys described herein. Generally, conventional honeycomb panels have wide application in the automobile and aircraft industries (among many others). The panels can be used for floors. The panels can also be formed for use as components in interior and exterior doors, the hood, trunk area, fuselage (of an aircraft), frame of a boat, ship or spacecraft, and generally any area of a transport structure where paneling is needed.

The panel 1100 is a generally flat panel including a top face sheet 1102a having a thickness 1106, a bottom face sheet 1102b, and a core 1108 disposed between the top and bottom face sheets 1102a-b. The additively manufactured core 1108 may include a matrix of evenly distributed hexagonal honeycomb formed of one or more of the alloys described herein, if desired. While a flat panel is shown, the panel may be curved or may include any appropriate geometrical shape. In an embodiment, the core 1108 is additively manufactured. The panels, core or both can also be formed using other non-AM methods. The core can be formed with curved surfaces and it may vary in cross-sectional thickness or other non-planar characteristics. Skins or face sheets 1102a-b can be formed on the curved surface. In some cases the skins can be formed using the core as a tool. In other embodiments, the skins can be additively manufactured, or separately manufactured using traditional methods. The skins can be formed of one or more alloys described herein.

Figure 11B:
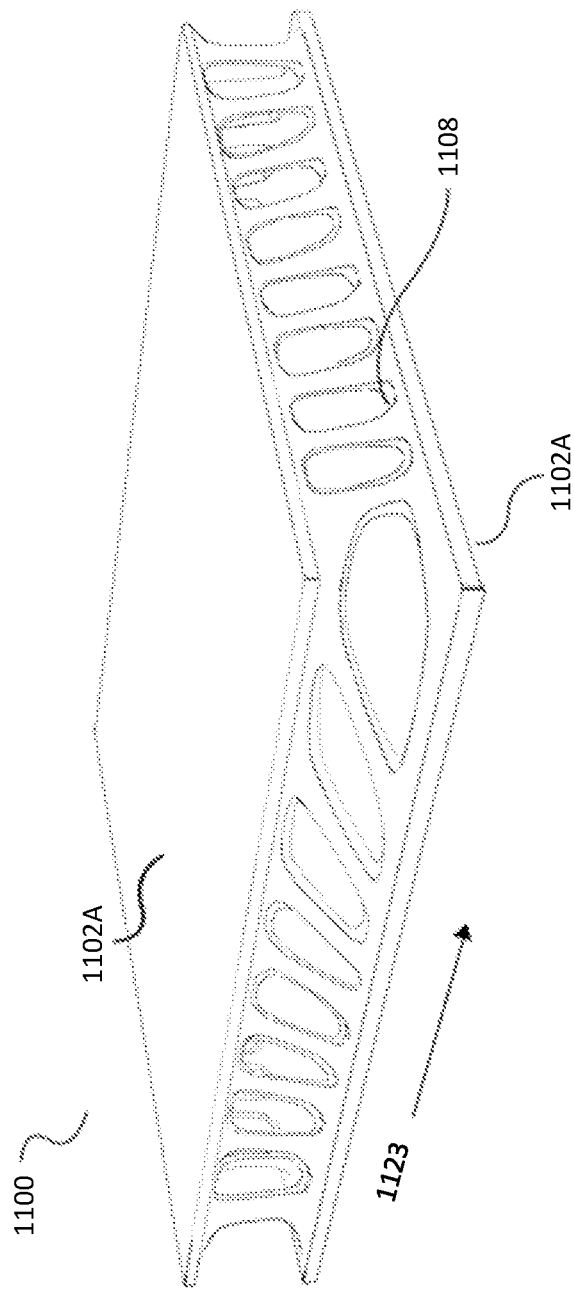
FIG. 11B illustrates a perspective view of another exemplary panel using a custom optimized core in accordance with an aspect of the present disclosure.

FIG. 11B illustrates a perspective view of another exemplary panel using a custom optimized core in accordance with an aspect of the present disclosure.

In an aspect of the disclosure, the additively manufactured core 1108 may include unique arrays of lattice structures and/or custom honeycomb structures. FIG. 11B illustrates a perspective view of another exemplary panel using a custom optimized core. Like in FIG. 11A, the panel section in FIG. 11B includes face sheets 1102a and 1102b formed above and beneath the AM core. The face sheets and AM core can be formed of one or more alloys described herein. In some embodiments, the top face sheet 1102a and the bottom face sheet 1102b may be co-printed. In other embodiments the face sheets 1102a-b may be formed using traditional methods. In either case, the face sheets 1102a-b may be adhered to the additively manufactured core 1108 using an adhesive. Alternatively, the face sheets 1102a and/or 1102b may be formed over the AM core 1108 using the AM core 1108 as a tool. The face sheets may be made of any material, such as, for instance, aluminum or a composite.

Referring still to FIG. 11B, the custom AM core 1108 shows a number of generally vertical core connections forming semi-elliptical empty regions e.g., beginning at the left side of the arrow 1123. Moving further along 1123 in the direction of the arrow, the holes and protrusions begin to become diagonal. These different shapes of the AM core may account for different types of forces expected in the panel section, e.g., more vertical forces relative to face sheets 1102a-b towards the left of 1123, and greater shear forces along the panel as the core connections begin to veer diagonally. Any number of custom or patterned core material may be used and optimized for the panel at issue.

The AM core material in general may take on any of a variety of conventional or organic shapes, or somewhere in between, depending on the most ideal structural optimization for the panel application at issue. Conventional core material may include, for example, foam cores, which may include open or closed cell, and which may provide generally homogenous support of the skins. Other conventional core material may provide more structured, non-homogenous support of the skins including textile cores for punctual support, cup-shaped cores for providing regional support to both skins, corrugated cores that provide unidirectional support and honeycomb cores, which provide bi-directional support. In addition to these and other conventional core patterns, any type of custom core pattern can be generated and used on its own, or combined with any one or more conventional patterns. The optimization of the panel can take into account a number of parameters and the structural patterns of support can differ as a function of position at any point on the panel. Thus, different load magnitudes and directions can be accommodated at each point on an operational panel in an optimal manner.

The face sheets 1102*a-b* may be additively manufactured, or in some embodiments, co-printed with the panel core. Alternatively, the face sheets 1102*a-b* may be manufactured using conventional methods. For example, the face sheets 1102*a-b* may be manufactured using a hand or automated composite layup, which includes laying dry fabric layers or prepreg plies onto a tool to form a laminate stack. The dry fiber laminate stack is infused with resin in a wet layup procedure, and the resulting materials are allowed to cure. Alternatively, a pre-preg laminate stack may be compacted after placement onto the tool and heated to allow curing. In an exemplary embodiment, the face sheets are produced using resin transfer molding (RTM). In RTM, a preform material may be placed into a mold, which is then closed. A specific resin mixture including a low viscosity resin for quick permeation and even distribution may be added to the mold via inlet ports. Vacuum may be used to facilitate the resin injection process. The part is then cured to produce one or both face sheets 1102*a-b*.

In other exemplary embodiments, the face sheets 1102*a-b* are produced using resin injection molding (RIM), vacuum assisted resin transfer molding (VARTM), resin film infusion (RFI), compression molding, injection molding, and the like.

Following assembly, the face sheets may be adhered to the additively manufactured core 1108 as described. In some alternative embodiments, the face sheets 1102*a-b* may be co-printed with the additively manufactured core 1108. In these embodiments, the face sheets 1102*a-b* may be adhered to the additively manufactured core 1108 via an adhesive after the AM process has concluded. Alternatively or in addition, the face sheets 1102*a-b* may be affixed to the additively manufactured core 1108 using another conventional method, such as via thermal fusion or the like. The face sheets and core may also be built as one continuous AM build. Alternatively, the panel components may be co-printed, with the joining of the components done by an alternative AM process, if assembled in a MAP or similar process. Thus, for example, the MAP can co-print the panel components and then join the components, e.g., by applying an adhesive. The joining of the components can also be performed using a separate procedure, e.g., if a MAP is not used.

While the face sheets 1102*a-b* of FIG. 11A-B are discussed as being affixed to additively manufactured core 1108 directly or via an adhesive layer, one or more additional plies or layers of material(s) may be deposited between the additively manufactured core 1108 (or adhesive layer) and the face sheets to optimize the core for the intended structural application without departing from the spirit and scope of the claims. Also, in some exemplary embodiments, the additively manufactured core is a lattice-type structure. In general, however, any suitable core geometry may be used, with some geometries being desirable over others depending on factors like the target design objectives of the panel and the overall assembly of the transport structural into which the panel may be assembled.

In an alternative embodiment, face sheets 1102*a-b* may be connected to respective sides of the additively manufactured core 1108 during the AM process, as opposed to after the AM process.

The core 1108 may use different inputs. For example, the core 1108 may be additively manufactured as a honeycomb structure or another structure such as an optimized structure based on multiple inputs across physics models. The AM process, being non-design specific, may use instructions provided to a 3-D printer containing an optimized design of the additively manufactured core 1108 to meet the objectives of an intended structural application. For example, depending on the application of the panel 1100, such as for use in the flooring or as part of an interior side panel, etc., the optimization would enable the specification physical parameters (e.g., tensile strength, rigidity, thickness, force vectors including shear forces and vertical forces etc., pressures and gradients thereof, energy absorption characteristics by crush direction, etc.) and other potential geometrical, thermal, and material-based properties relevant to manufacturing the panel 1100 for the intended structural application. In another exemplary embodiment, the panel 1100 may be a section of a fuselage or vehicle exterior, in which case various aerodynamic characteristics may be optimized for that intended application by varying the shape of the face sheets in three dimensions. As described below, customizing the additively manufactured core for an application may simply involve describing the geometry of the desired structure in a data model.

In general, the instructions to the 3-D printer may provide a modified honeycomb structure (or other custom structure, e.g., lattice structure) that changes the properties of the panel to make it more suitable for a given application. This optimization process may conventionally be complex and involve substantial experimentation and design effort. However, according to certain aspects of the present disclosure, this potentially arduous process can be replaced wholesale, or at least substantially accelerated, using CAD or other software suites to form the core. The resulting data and instructions can be included as part of a data model representing the core along with the other parts, if any, to be additively manufactured. The optimized data model with the corresponding instructions can then be provided to the 3-D printer, which then renders the physical structure.

The CAD instructions and/or the data model of the structure can also be varied to produce corresponding variations of the honeycomb structure. One advantage at this point is that no tooling or other hardware is needed through this period; the design process can advantageously be replaced with algorithms for optimizing the panel itself, instead of the conventional time-consuming process involved in identifying or constructing expensive tooling to produce the core. More generally, what is conventionally accomplished using complex physical tooling and labor-intensive manpower, and in some cases inefficient trial and error methods, can now be accomplished in software and easily and efficiently converted to a hardware structure at a lower price using less labor.

The extensive versatility of 3-D printing also means that the designer is not limited to conventional honeycomb structures. Rather, in other exemplary embodiments, the core 1108 can be additively manufactured using any type of structure optimized for the intended application, as will be described with examples below. After the desired additively manufactured core 1108 is additively manufactured, a panel 1100 may be formed by adhering plates 1102*a* and 1102*b* to opposing sides. In an exemplary alternative embodiment, the entire sandwich panel (additively manufactured core and face sheets) may be additively manufactured together, potentially with other co-printed structures. That is to say, in an exemplary embodiment, these structures can be additively manufactured together with the face sheets (like the panel 1100 of FIGS. 11A-B). In alternative exemplary embodiments, these structures can be manufactured as individual core structures. These core structures may thereafter be incorporated into traditional honeycomb sandwich panel construction.

In addition, the printed or formed face sheets can in some embodiments vary in thickness at different locations, similar to the variable thickness of the core. Thus, some face sheets can both vary in thickness in contour. This enables a curved panel or panel with substantially any contour to be produced using the principles described herein.

Conventionally-produced honeycomb panels may result in anisotropic properties. Anisotropic properties are directionally dependent in that they vary in different directions. Different types of anisotropic properties may be important to panel design considerations in transport structures. Exemplary anisotropic properties differ per the material at issue and may include, for example, tensile strength, heat conduction, shearing forces, and other material-dependent properties. While anisotropic properties may be present in certain useful and high-quality materials such as, for example, carbon fiber composites, these properties are often an undesirable artifact for the applications of a custom honeycomb panel to which this disclosure is directed.

Additively manufacturing cores for sandwich panels, instead of using conventional manufacturing processes to fabricate the cores, can result in structurally optimized cores. Unlike traditional honeycomb panels, panels with additively manufactured core structures advantageously can offer quasi-isotropic properties, while maintaining the same or similar weight characteristics as conventionally manufactured honeycomb cores. Quasi-isotropic properties are those properties that are not directionally dependent in-plane. For example, a panel may exhibit quasi-isotropic features when the tensile stiffness and strength of the panel remain generally the same regardless of the direction in which the panel is pulled or otherwise subject to a tensile force in-plane.

Figure 12A:
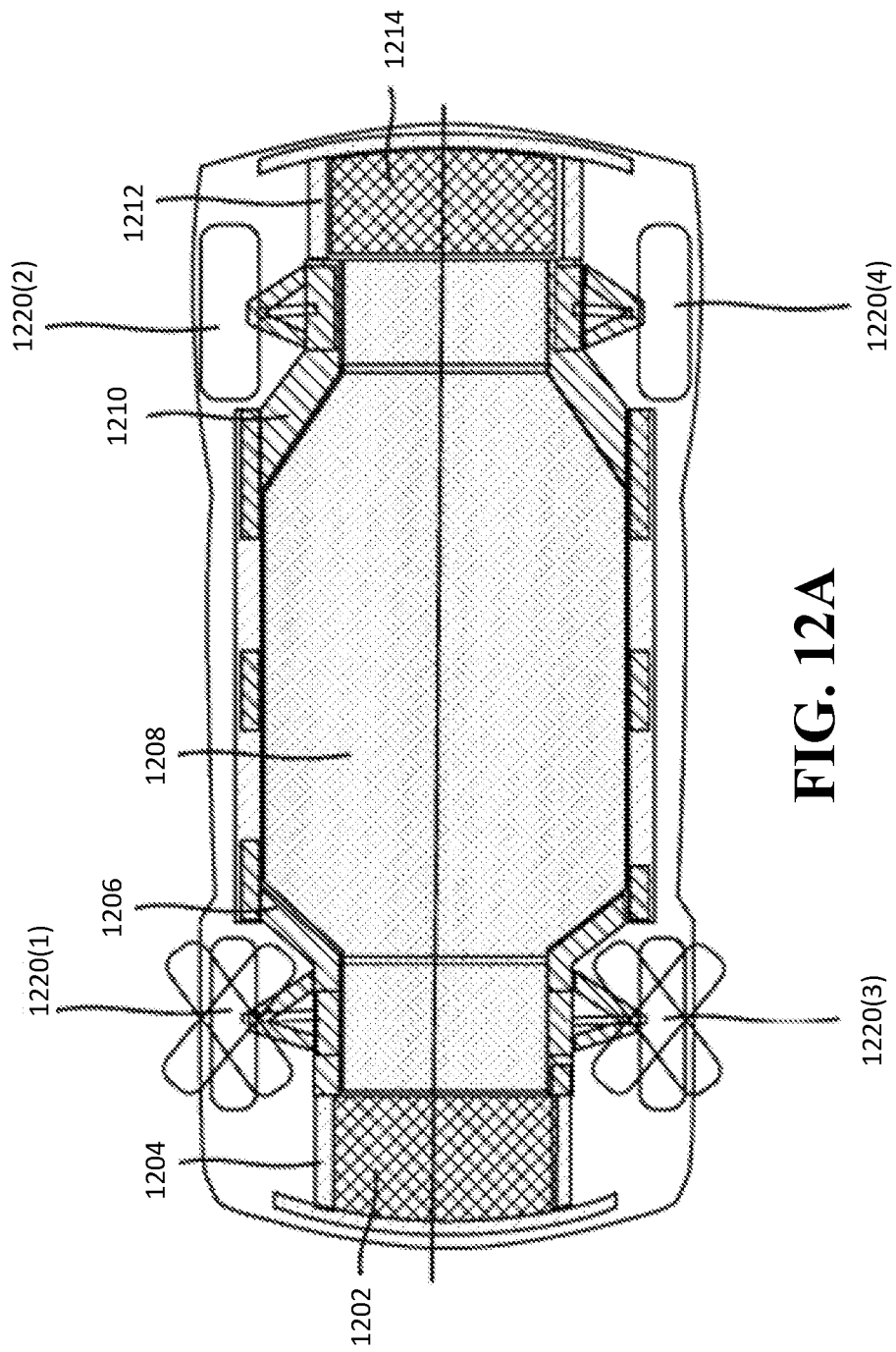
FIGS. 12A-B show an exemplary underbody configuration of a vehicle in accordance with an aspect of the present disclosure.
Figure 12B:
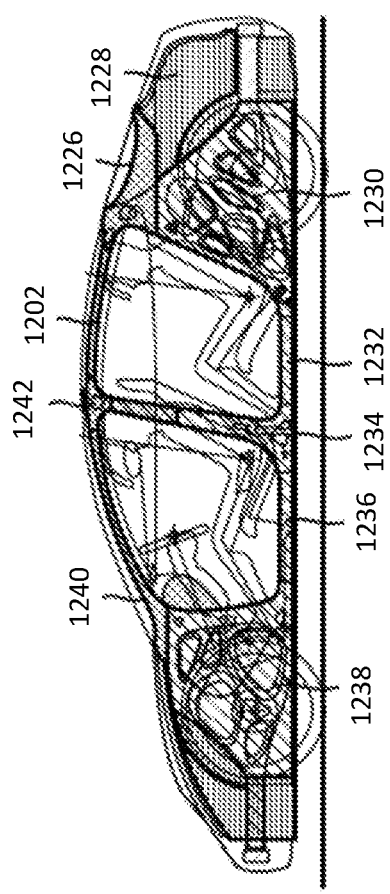

FIG. 12A shows an exemplary underbody configuration of a vehicle in accordance with an aspect of the present disclosure. FIG. 12B shows an exemplary side view of the vehicle of FIG. 12A with different aperture configurations in accordance with an aspect of the present disclosure.

The underbody configuration of FIG. 12A includes front crash structure 1204, front corner "steer" node 1206, rear corner "drive" node 1210, rear crash structure 1212, rear tub 1214, front tub 1202 and floor structure 1208. The opposite side of the underbody includes similar nodes, crash structures, etc., and are omitted from specific reference to avoid unduly obscuring the concepts of the disclosure. The wheels are represented by 1220(1)-(4). The battery pack and associated electronics may also be included in the underbody configuration. In an embodiment, the battery and/or electric motor may be compactly positioned in the underbody areas beneath and adjacent a wheel and the A and C pillars (see FIG. 12B, FIG. 18). This compact configuration may advantageously provide additional volume (see ref. no. 1810, FIG. 18 and associated text) or occupants and cargo in EV- (electronic) based embodiments. Unlike the internal combustion engine (ICE) involving the engine transmission, radiators, turbochargers, superchargers, and powertrain which can take up significant amounts of volume, the EV propulsion system can be implemented in a simpler manner and in some embodiments, EV propulsion need only include the electric motors, the battery pack, and the electrical interconnections and control circuitry, each of which can be arranged compactly in the front and rear quarter nodes 1236 and 1230 (FIG. 12B) on the respective sides of the vehicle and the adjacent the underbody region underneath.

Regardless of whether ICE, EV, or hybrid propulsion systems are used, however, the parts that make up these systems, such as the electric motors, battery pack and the associated circuitry distributed within the vehicle can, in an embodiment, all be acquired as COTS parts. Accordingly, the use of the conventional platform obviates the need for the manufacturer to invest Capital Expenditures (CapEx) in tooling and machining equipment to assemble these structures from the ground up. Certain parts in FIG. 12B, such as the extruded-A pillar upper 1240, is a curved custom extrusion that can either be acquired from a supplier pursuant to specifications provided by the manufacturer, can be 3-D printed, or can be acquired as a COTS part such as carbon fiber part. If necessary in certain embodiments, the manufacturer can modify the COTS part in-house.

The vast majority of components illustrated in FIGS. 12A and 12B are COTS parts, with the principal exceptions being the nodes. For example, depending on the type of vehicle and the configuration, region 1228 includes a 3-D printed front quarter node. The nodes can be visualized in part by referencing the 3-D metal texture 1302 described in FIG. 13, and referring back to 1228 and 1230 of FIG. 12B. The node may interface with an A Pillar lower (also in region 1238) which, in turn, transitions into the front crash structure 1204 (FIG. 12A) and also provides attachments for suspension, steering, electric motor, the dash, foot-well, upper structure, hinges, door check front storage compartment, sill extrusion, and door seal (collectively region 1238). Accordingly, the platform architecture militates in favor of the manufacturer acquiring these parts as COTS parts from a supplier (once they are suitably identified based on the design objectives) and 3-D printing the nodes to properly interface with the COTS parts.

A node (e.g., FIG. 12A 1206, 1210; FIG. 12B, 3-D Printed Front Quarter Node (1242), B Pillar Lower Node (Region 1234), 3-D Printed Rear Quarter Node (1230)) may be any 3-D printed part that includes one or more sockets, receptacles, recesses, cavities, or other interfaces for accepting one or more components such as tubes, extrusions and/or panels. The node may have internal features configured to accept a particular type of component and/or to route fluid or wiring between different interfaces. Alternatively or additionally, the node may be shaped to accept a particular type of component. A node in some embodiments of this disclosure may have internal locating features for positioning a component in the node's interface. However, as a person having ordinary skill in the art will appreciate upon review of this disclosure, a node may utilize any design or shape and may accept a variety of different components without departing from the scope of the disclosure.

In some embodiments, nodes may have additional features and structures to effect a particular function. For example, some nodes may include unique geometries or material compositions for handling different load bearing regions of the vehicle. These geometries may include lattices, honeycombs, and other types of patterned structures. Nodes may also include one or more channels for routing adhesive, sealant or negative pressure (vacuum) to and from one location to another. In other embodiments, multiple nodes may be co-printed and positioned adjacent one another in a desired portion of the vehicle.

Nodes may route electronic circuitry or lubricants from one structure (e.g., a tube) to another, (e.g., a gear case). The flexibility of nodes to accomplish these functions derives in large part from the non-design specific nature of the 3-D printer upon which the current platform is based. For example, using a computer-aided-design (CAD) program, a custom representation of 3-D node can be generated and designed to include unique shapes, interfaces, and other details. The CAD model can then be sliced to provide software-based layers of the original 3-D structure. The sliced model and printing instructions can then be provided to the 3-D printer. In a powder bed fusion (PBF) printer, for example, the slices are successively deposited as layers of powder on a substrate in a print chamber. One or more lasers or other energy sources may selectively fuse each layer or slice based on the custom instructions to render the designed node.

Nodes may be non-definition nodes or definition nodes. A definition node is described in more detail below. A non-definition node is any node that is not a definition node. For example, referring to the ref. no. 1242 in FIG. 12B, where this structure is a 3-D printed B Pillar to Rail and thereby connects the B Pillars to the upper rails and roof, this AM structure in one embodiment is a non-definition node that functions to interface various COTS interconnects.

Referring back to FIG. 12A, 1204 was previously noted as a front crash structure. Adjacent the front crash structure is front tub 1202. On the opposite side of the vehicle is rear tub 1214, which may for example be used for cargo. Rear crash structure 1212 is on each side of rear tub 1214 (which is like front crash structure 1204 in that the latter is disposed on each side of front tub 1202). Front corner "steer" node 1206 is just behind the front wheel. Floor structure 1208 occupies the majority of the underbody. Rear corner "drive" node 1210 occupies a periphery of the floor structure inside the front right wheel.

Figure 13:
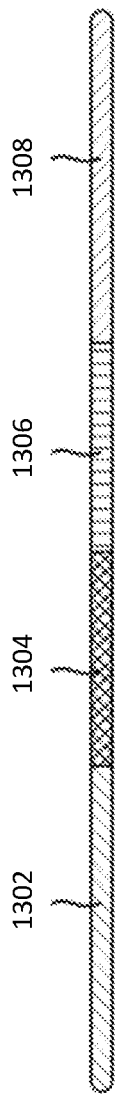
FIG. 13 shows a conceptual spectrum of various exemplary aperture material features in accordance with an aspect of the present disclosure.

FIG. 13 shows a conceptual spectrum of various exemplary aperture material features in accordance with an aspect of the present disclosure.

FIG. 13 includes matching textures for identifying the materials of the various structures of FIGS. 12A and 12B. For example, 1302 is 3-D metal printed, 1304 is high strength plastic, 1306 is low strength, low cost tooling material, and 1308 is COTS.

The complex structures illustrated in FIGS. 12-13 may be additively manufactured, to benefit from the non-design specific manufacturing capabilities offered by AM. Highly customized structures can be created using AM. As noted herein, AM can be used in addition to, rather than as an alternative to, certain conventional techniques such as the use of commercial off-the-shelf (COTS) elements. Accordingly, in an embodiment, the platform relies on a significant number of COTS parts to enable making a wide range of vehicles.

AM is a valuable resource and its use is prioritized; thus, utilizing COTS parts means that any priority strain on the 3-D printer(s) can be effectively managed. In some embodiments, mass and material consumption of the AM parts can be minimized by including COTS parts with the design. COTS elements may also be inexpensive and readily available. COTS elements have typically known geometries with easily accessible specifications. Thus, wherever feasible, COTS elements may be ideal for incorporation in the manufacturing platform along with AM structures.

Use of COTS elements also eliminates the capital expenditures that would otherwise be required for the machinery and manpower to produce and assemble these structures in-house. The platform is predicated in part on the capability of the manufacturer to viably and timely produce a variety of models. Thus, acquiring COTS parts reduces the capital expenses that would be incurred for building the same parts in-house, rendering the COTS option generally desirable. In an embodiment, certain COTS parts can be acquired and modified to provide a custom design.

Additively manufacturing certain sections of the vehicle in accordance with the platform may enable modular construction and assembly of vehicles. Modular vehicles may be assembled by joining multiple discrete systems or components together to form one vehicle. Unlike conventional vehicles, modular vehicles provide the freedom of customizability. Complex parts and consoles can be removed easily, both for functional and aesthetic purposes, and new parts and consoles can be added in a straightforward manner. Because AM technologies are not tooling intensive, AM can be used to facilitate the development of modular systems by efficiently fabricating a variety of customized designs that maintain pace with customer requirements and demand.

AM also provides modular processes with the capability to define and build complex and efficient interfacing features that define partitions between modules. These features can include indentations, tongue and groove profiles, adhesives, nuts/bolts, and the like. A further advantage of implementing modular designs for use in vehicles is ease of repair. Modular designs ensure easy access to virtually any component in the vehicle. In the event of a crash, the affected modular block(s) can be replaced. The block(s) can also be co-printed with other blocks or structures to save assembly time. The blocks can further incorporate in-situ scanning and observation to ensure accurate joining and repair of the modules.

Using a modular design approach, the AM vehicle may be assembled as a collection of 3-D printed and non-printed components, including COTS components, integrated together via well-defined interconnection means for attaching the components at desired transitions. Individual components may be added and removed without requiring changes to other components in the vehicle. The use of the definition nodes as described below, in cooperation with the remaining non-definition nodes, enables the modularity of vehicles constructed using the platform.

In addition, modular design and assembly approaches make it possible for flexible manufacturing cells to be configured for assembly. Advantages include reduced reliance on fixtures during assembly (eventually complete elimination), lower assembly cell footprint in comparison to traditional assembly lines, etc.

In an embodiment, having identified the desired vehicle profile and optionally mapped out the basic design requirements, the manufacturer may further break down the vehicle design into sections. One reason for breaking down the vehicle model into sections is to enable the manufacturer to delineate the COTS parts or functions from the non-COTS parts or functions. Another reason for the breakdown is to understand how, if at all, the parts in each section will interface or interconnect with one another. With this knowledge, the manufacturer can produce and assemble definition nodes as described in greater detail herein.

In an embodiment, a number of vehicle sections may be equivalent to the number of wheels, although this need not be the case and other considerations may dictate that a greater or fewer number of sections are more suitable. In the case of a four-wheel vehicle, the manufacturer may elect to break into four (4), six (6) sections, for example. Each section may comprise one or more additively manufactured parts that can be configured to interface with COTS parts including, for example, suspension, wheels, electric motors, crash beams, pillars, and the chassis members. Accordingly, in this phase of the process, the manufacturer may consider and identify the different COTS structures that will likely reside in a section, and how these structures will be interconnected with which parts. Using this preliminary information, the manufacturer can further identify what functional and geometrical structures may be needed to accommodate each one of those interconnections in the relevant section.

In addition, the manufacturer may also need to consider other factors including anticipated temperatures/pressures in various parts of a section, estimated structural integrities and load-bearing capabilities in light of anticipated loads, crash regulations, material properties, weak and strong points in the vehicle design, and other factors. With this information, the manufacturer can identify an optimal structure, or collection of substructures, that can accommodate all of the necessary interconnections in light of the identified load and other requirements, for a section. The information obtained from this analysis can be used in the assembly of AM nodes for that section.

While the platform includes incorporating ICE architectures, which can be produced to the manufacturer's benefit using the principles described herein, ICE architectures tend to consume a significant portion of the vehicle's volume. As a result, ICE propulsion systems have historically been a constraint to automotive manufacturing. By contrast, integrating electric vehicle (EV) propulsion systems with AM structures dramatically reduces the CapEx and complexity of manufacturing automobiles. Unlike the internal combustion engines and systems that occupy a substantial portion of the front of the vehicle (and therefore place practical limitations on how the vehicle's space can be used), the electric motors may be placed immediately adjacent the AM nodes (below) that define the perimeter of the vehicle.

Further, as noted herein, the battery pack may be placed in the vehicle underbody or floor. The hood area of the car can be effectively cleared for other uses as a result. Like ICE engines, transmissions, etc., EV propulsion systems (such as batteries, motors, wiring) can be procured as COTS members and can simply be integrated with the AM structures and other adjacent COTS members as necessary. The AM structures in these cases can be fabricated in a manner that easily accommodates these EV components. For example, to match the geometry and interface of a particular EV COTS part, such as a set of protrusions used to connect to the vehicle, a corresponding AM structure can be printed with apertures perfectly aligned to receive the protrusions such that the parts can be easily integrated together. Incorporating EV propulsion systems into the platform consequently has significant benefits. Therefore, for embodiments using EV propulsion systems, the platform accords significant flexibility to the manufacturer in vehicle design by providing more usable volume. Further, parts can be acquired and assembled quickly, and the availability of AM with the ubiquitous nature of COTS parts means that propulsion systems need no longer be a significant constraint to vehicle manufacturing.

Definition nodes are so-called because they define the vehicle to be made. In an embodiment, the locations of the definition nodes may be determined by the internal volume requirements of the vehicle. For example, the definition nodes may be more closely spaced in a small hatchback car (owing to its small size), in comparison to a large sedan or SUV. In an SUV, by contrast, the nodes are farther away, both for nodes along a side of the vehicle and nodes on opposing sides. The definition nodes may be placed along the perimeter of the vehicle to enable the manufacturer to control the vehicle's internal volume. The platform's use of definition nodes advantageously removes the requirement of expensive tooling of vehicle parts to determine internal volume and the CapEx incurred with this former endeavor.

Once the locations are identified as described herein, the definition nodes may be additively manufactured and, using the information and analyses herein, the AM nodes may be uniquely configured to interface with COTS suspension components, electric motors, crash beams, side crash beams, pillars, and other panels or elements that define the chassis and the interior package volumes. The underbody may also comprise COTS panel(s), which can be cut to the desired dimensions at the factory. The batteries to power the electric vehicle may be packaged and placed in a common underbody architecture, configured to interface with the definition nodes. The complex structures can be additively manufactured to benefit from the non-design specific manufacturing capabilities of AM. Mass and material consumption of the AM parts can be minimized by utilizing COTS elements. Additively manufacturing certain sections of the vehicle facilitates modular construction and assembly.

Figure 14:
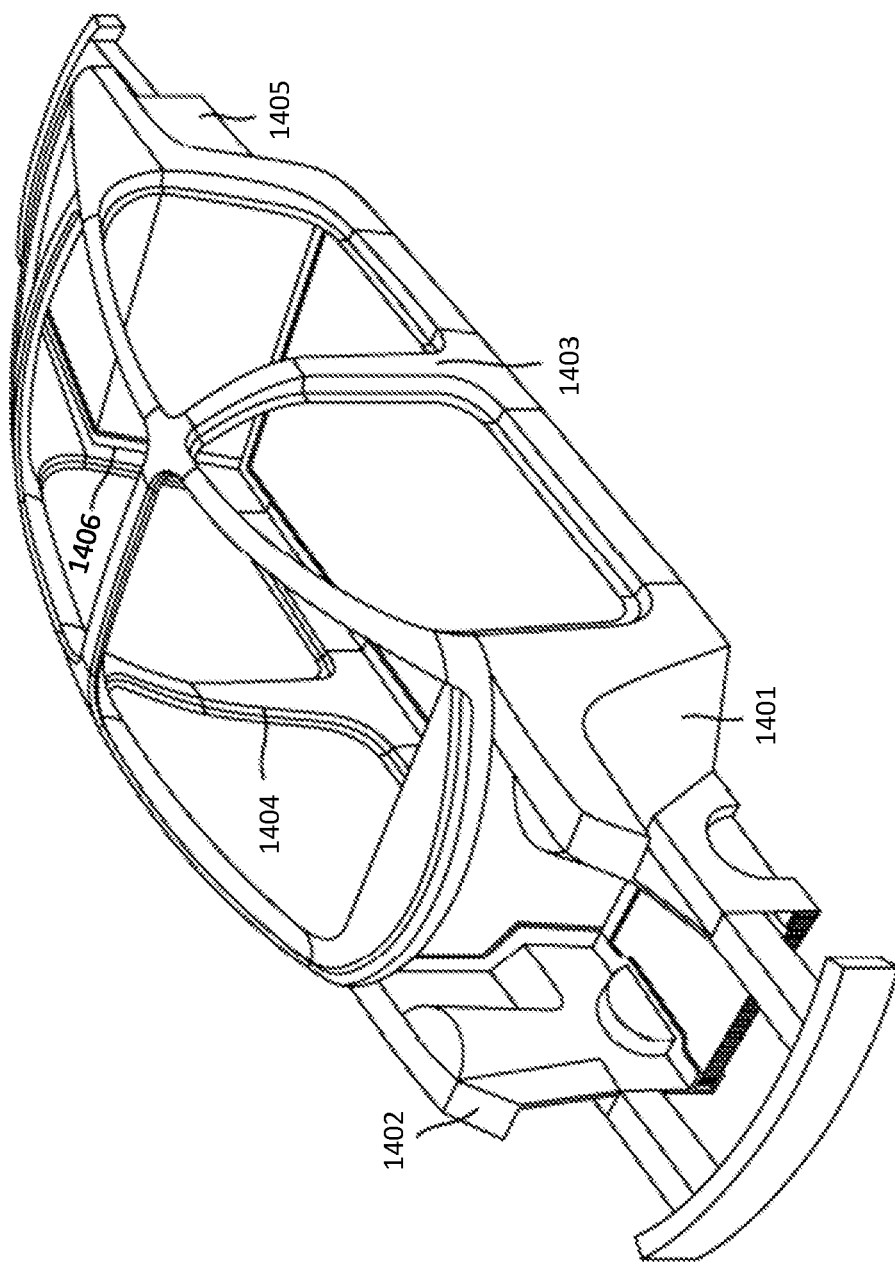
FIG. 14 shows an exemplary vehicle broken down into definition nodes in accordance with an aspect of the present disclosure

FIG. 14 shows an exemplary vehicle broken down into definition nodes in accordance with an aspect of the present disclosure.

FIG. 14 depicts an exemplary layout of a vehicle with six definition nodes identified (1401 through 1406) using the principles described herein. Using the concept of definition nodes, the vehicle may be broken down into sections. Thus, using FIG. 14 as an exemplary embodiment, a vehicle to be manufactured may be partitioned into six sections 1401-1406. In the case of EV propulsion, each section may comprise AM parts which may be configured to interface with suspension, wheels, electric motors, crash beams, pillars, and the chassis members. As discussed herein, integrating EV propulsion systems with AM structures dramatically reduces CapEx and the complexity of manufacturing vehicles. As noted, the electric motors may be placed immediately adjacent the AM nodes. EV propulsion systems (e.g., batteries, motors, wiring, and the like) can be procured as COTS members and integrated with AM structures and other COTS structures.

In the embodiment of FIG. 14, the four-wheeled vehicle is broken down into six definition nodes. This architecture is similar to the vehicle in the embodiment of FIGS. 12A and 12B, which also uses six definition nodes. For example, in the side view illustration of FIG. 12B, the B-pillar lower node 1234 is a definition node. Referring back to FIG. 12A, nodes 1 and 2 and 5 and 6 border a respective wheel well. Nodes 3 and 4 border the pillar area between front and rear doors on both sides.

Referring back to FIG. 14, the definition node locations can be determined by the internal volume requirements of the vehicle. In the six-node vehicle of FIG. 14, the spacing of the definition nodes would likely be somewhere in between a smaller hatchback car and a larger sports utility vehicle, for example.

Definition nodes 1401-1406, in practice, may incorporate a variety of functions, or distribute similar functions among different sections. In an exemplary embodiment, a definition node includes a plurality of additively manufactured substructures connected together. Each substructure may be dedicated to a specific interface or function. The definition nodes 1401 and 1402, for example, may route fluids and circuitry to and from other COTS or AM parts. The definition nodes may serve additional and different functions. For example, definition nodes may include lattice structures to maximize strength-to-weight ratios based, e.g., on the anticipated loads the six section vehicle is expected to sustain over a period of time. Definition nodes 1401-1406, or portions thereof, may also be geometrically shaped to provide further support to the paneling with which it interfaces and to withstand structural loads. A definition node in some embodiments may include two or more co-printed substructure nodes, each substructure node used to interface with the same or different elements depending on the desired configuration.

Any of the definition nodes 1401-1406 may be connected to the vehicle using different methods. In one embodiment, the 3-D printed nodes are attached to the underbody panel, or floor structure. The definition nodes (e.g., 1401, 1402, 1404, 1406) may also connect to the front and rear crash structures. The same four definition nodes may also be coupled to the suspension components, such as the control arms and struts. The definition nodes, as noted herein, also interface with many or most of the COTS parts that will reside in the particular section with which the definition node is associated.

As may be evident from the illustration of FIG. 14, once the definition nodes are located, the interior volume of the vehicle is known and the relative positions of additional structures are well-defined. All other panels and parts can then be positioned relative to the known definition nodes 1401-06. Precisely because most or all of these parts depend on the positioning of the definition nodes, this factor can be of particular importance in the initial construction phase of the vehicle. Accordingly, in an additional embodiment, the platform may employ a dedicated automated system to calibrate and fix the location of the definition nodes relative to each other. In certain embodiments, robots or other automated constructors may be used for this purpose. Once the definition nodes are fixed on the assembly fixture and their position is measured to within the predetermined degree of confidence, the remaining portions of the vehicle may be assembled as a collection of modular blocks. The assembly can be manual or alternatively it can be automated, in part or in whole.

While some embodiments of the platform may dictate that the design and positioning of the definition nodes be performed first, in other embodiments involving EV propulsion systems, the battery pack may be first assembled. In general, however, the design and preparation of the definition nodes is prioritized, because after these nodes are positioned and fixed, the majority of the remaining tasks tend to fall into place.

The panels and structures used to connect to the definition nodes generally need to be machined for precision. A significant advantage of the platform is that the machining tasks can be performed by the COTS supplier—not the vehicle manufacturer. Thus, the manufacturer may be spared from having to make significant capital expenses to fund the tooling required for these tasks.

In scenarios where hybrid/internal combustion engine (ICE) vehicles are to be manufactured, the internal volume requirements may factor in packaging volumes to accommodate the ICE, transmission, drive shaft, and other components that may be unique to, or more pronounced in, hybrid or ICE designs.

Figure 15A:
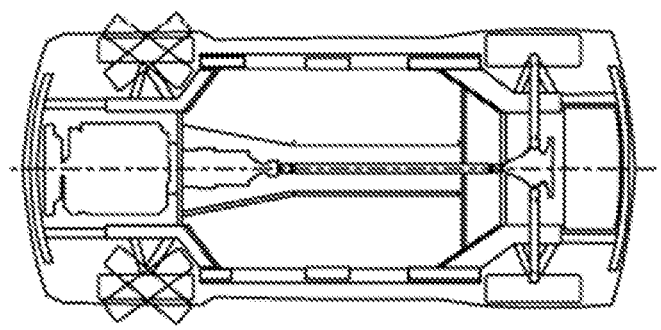
FIGS. 15A-C illustrate examples of different hybrid/ICE vehicles for which internal volume requirements may differ based on packaging volumes used to accommodate the particular vehicle in accordance with an aspect of the present disclosure.
Figure 15B:
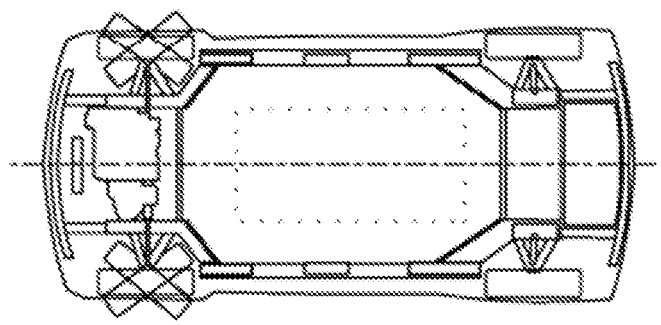
Figure 15C:
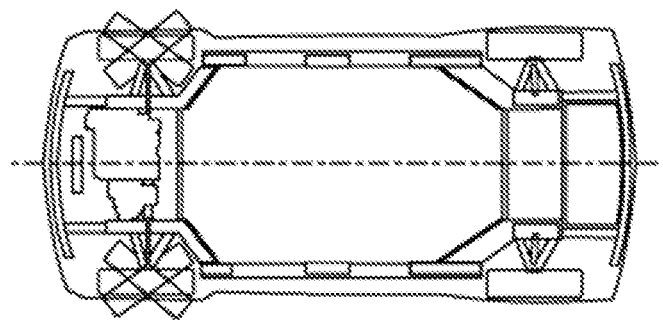

FIGS. 15A-C illustrate examples of different hybrid/ICE vehicles for which internal volume requirements may differ based on packaging volumes used to accommodate the particular vehicle in accordance with an aspect of the present disclosure.

FIGS. 15A-C illustrate three examples of different vehicles for which internal volume requirements may differ based on packaging volumes used to accommodate the particular vehicle. In particular, FIG. 15A represents an ICE-based vehicle having a longitudinal front engine and rear wheel drive. FIG. 15B represents a hybrid vehicle having a transverse engine and front wheel drive. FIG. 15C represents a hybrid front wheel drive vehicle with a transverse engine. In scenarios such as in FIGS. 15A-C where hybrid/ICE vehicles are to be manufactured, the internal volume requirements may factor in packaging volumes to accommodate the ICE, transmission, drive shaft, and other components.

The illustrative examples of FIGS. 15A-C show that many or most of the platform architecture's advantages also extend to the ICE and hybrid configurations. While additional volume is generally required for accommodating the engine, different configurations can save volume in other areas. For example, the drive shaft of FIG. 15A can be eliminated where front wheel drive is employed. The engine sizes between the front, hybrid and transverse engines may also vary. Application of the platform architecture to construct these vehicles using definition nodes and AM may be unique and adds many of the same benefits for creating a large portfolio of different vehicles.

The definition node(s) can include connection interfaces to connect to a plurality of parts. For example, the definition node itself may be broken down into multiple components and connected to each other. The definition nodes may be connected to the dash and floor panels utilizing node-to-panel connection features enabled by adhesives. The node may connect to the crash structures (front crush rail) using mechanical fasteners, which may include nuts, bolts, screws, clamps, or more sophisticated fastening mechanisms. The node may utilize adhesive connections, mechanical fasteners, or a combination of both to connect to extrusions. Additively manufacturing definition nodes can enable the platform to create optimized structures in either a single manufacturing operation not requiring any machining or requiring minimal machining operations upon completion of the printing.

Figure 16:
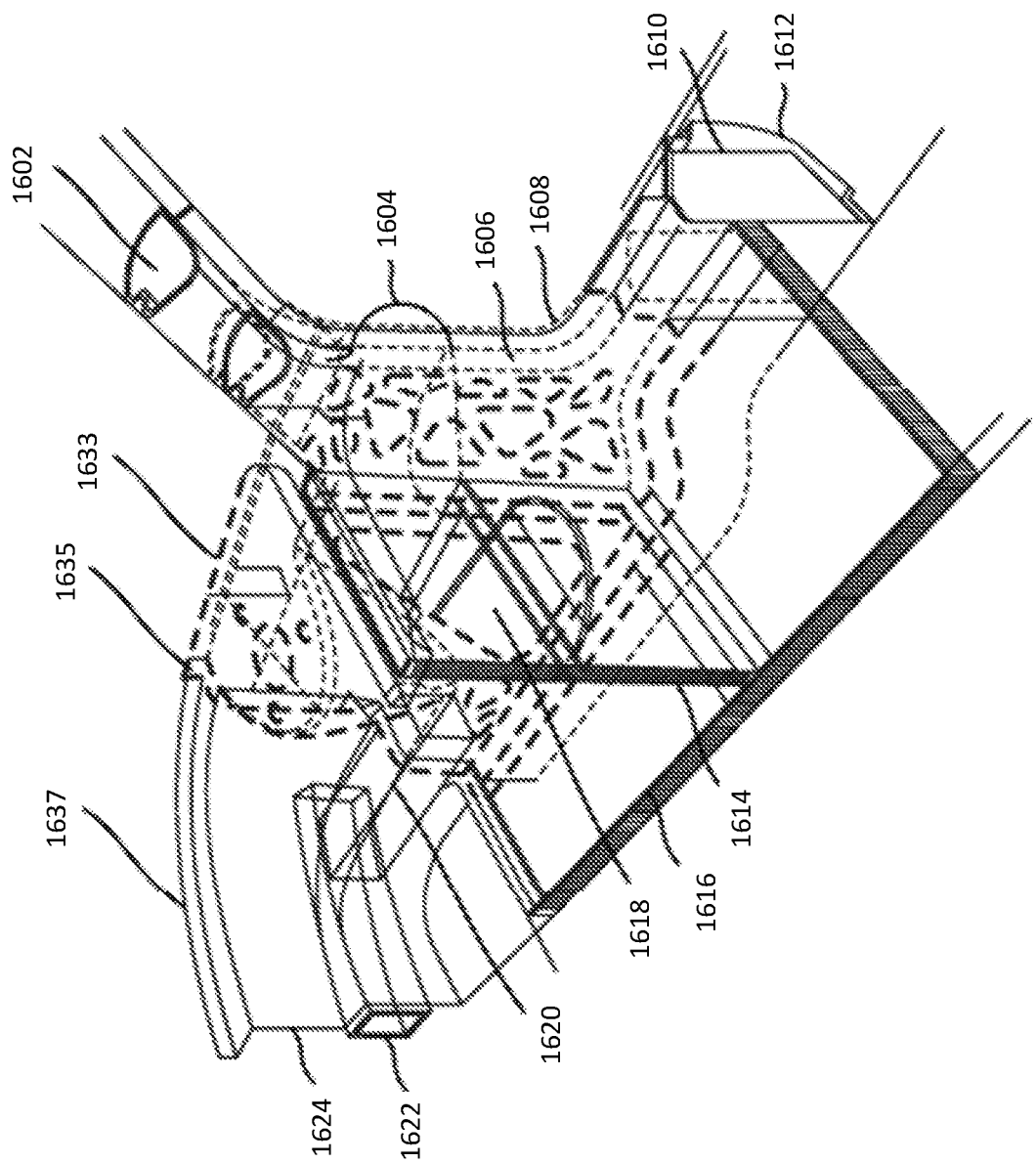
FIG. 16 shows a perspective cross-section view of a definition node (in dashes) coupled to adjacent components in a right passenger section of a vehicle in accordance with an aspect of the present disclosure.

FIG. 16 shows a perspective cross-section view of a definition node (in dashes) coupled to adjacent components in a right passenger section of a vehicle in accordance with an aspect of the present disclosure.

FIG. 16 shows a perspective cross-section view of a definition node (shown generally in dashes or circular dashes) coupled to adjacent components in a vehicle according to an embodiment. FIG. 16 shows, in particular, a right-front (passenger) cross-section of a vehicle, with the cargo area in front in lieu of a front internal combustion engine. As demonstrated herein, the platform provides the capability to identify and additively manufacture foundational blocks (definition nodes) 1633 of a vehicle. In FIG. 16, the Cowl/IP armature panel 1604, which includes the glove compartment, can be seen directly affixed to the definition node 1633. The A-Pillar Upper 1602 is made of formed extruded aluminum in this embodiment. The A-Pillar Upper 1602 defines the perimeter of the door portion, extends to the roof, and is coupled to the definition node 1633 closer to the vehicle edge. The floor panel cross-section 1616 may define the entire area or a substantial area of the floor and can be connected to the definition node 1633 in a straightforward manner, e.g., using a node-to-panel connection with an adhesive. The floor and dash panels in this embodiment are honeycomb sandwich panels that are common COTS parts.

Front crush rail 1622 is coupled to definition node 1633, as is front cargo tub 1624. In an embodiment, front crush rail 1620 is composed of extruded aluminum. Hood seal flange 1637 is a vertical flange that follows the top of the front cargo tub 1624. Strut tower 1635 is part of the definition node 1633 and interfaces with front cargo tub 1624 and hood seal flange 1637. Definition node 1633 further includes a node material reduction panel 1618, which may be a composite honeycomb sandwich panel. Dash panel 1614 is shown in cross-section and may also be a honeycomb sandwich panel.

Cowl/IP armature panel 1604 may interface with a vertical portion of the definition node 1633. Also shown is the front quarter node 1606, which in this embodiment is an integral part of, and co-printed with, definition node 1633. Adjacent front quarter node 1606 is door seal flange 1608. Toward the rear of the drawing is sill 1610, which may constitute extruded aluminum. Sill cladding 1612 is connected to sill 1610. Sill cladding can, in an embodiment, be constructed using low cost tooling.

The definition node 1633 of FIG. 16 is representative in nature and is not intended to limit the scope of the disclosure. For example, in other embodiments, many of these components connected to or otherwise associated with definition node 1633 can be acquired as COTS parts or alternatively, they can be 3-D printed. In many cases, the honeycomb sandwich panels can be cut and machined at the supplier's facilities per the manufacturer's specifications. In still other embodiments, different parts may be co-printed with definition node 1633. Also, machining and other conventional techniques may still play a role, albeit usually a more limited one, in constructing components such as the sill cladding 1612. In general, using the platform as disclosed herein, a large number of different configurations and embodiments may be contemplated that rely principally on 3-D printed definition nodes and COTS parts.

In short, once the nodes are manufactured, COTS panels, extrusions, tubes, and other parts can logically be connected to form interfaces with the nodes. Node-based modular construction methods provide the ability to realize multi-material connections, which are paramount in meeting strength-to-weight metrics for automobiles and other complex transport structures. Furthermore, galvanic isolation may be provided between galvanically incompatible materials being connected by utilizing nodes to include isolators to space and prevent physical contact between the dissimilar materials.

The platform enables a common architecture for manufacturing a plurality of vehicles. The platform may include additively manufactured definition nodes, which may be assembled with EV/hybrid powertrain components, tubes, extrusions, panels, roof structures, and other components. Furthermore, this platform enables maximization of the available internal volume for occupants and cargo. By utilizing definition nodes and controlling their location, a vast product portfolio enabled by a single platform is possible. The platform also enables the creation of smaller footprint factories to manufacture an entire portfolio of vehicles, as noted herein. Since this platform relies on the marriage between additive manufacturing and COTS elements, with potentially limited (if any) use of conventional manufacturing techniques, it can enable the creation of distributed production units all over a geographic area of interest configured to run in parallel, that are not susceptible to the production halts prevalent in traditional vehicle assembly lines.

Figure 17:
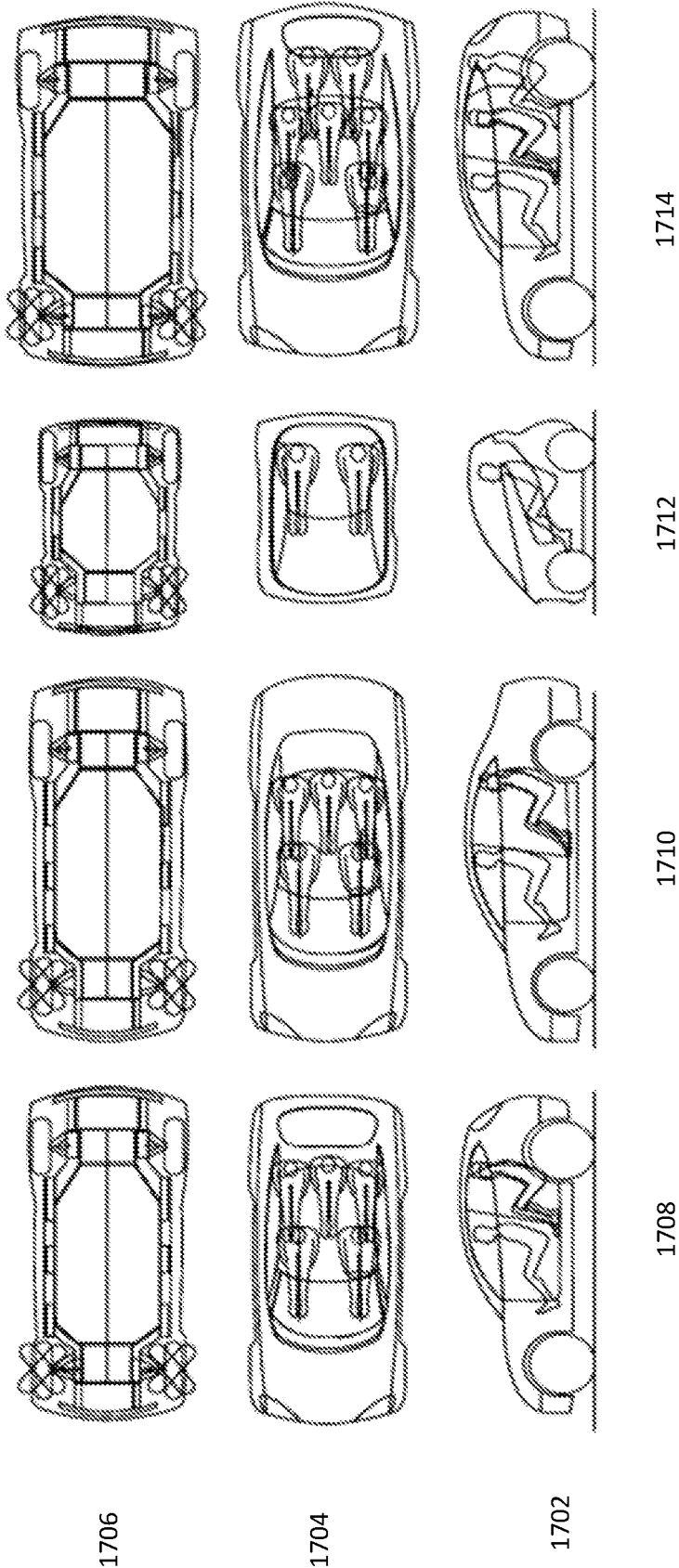
FIG. 17 shows four exemplary product portfolios in accordance with an aspect of the present disclosure.

FIG. 17 shows four exemplary product portfolios in accordance with an aspect of the present disclosure.

FIG. 17 shows different product portfolios that may be built using the platform herein-described, governed by factors like underbody construction and vehicle size. FIG. 17 illustrates, in particular, four different types of vehicles that are possible by selecting and positioning AM definition nodes. The vehicles in FIG. 17 are arranged as four columns and three rows. Each column represents three different views of a single vehicle. Column 1708 illustrates a mid-size sports utility vehicle (SUV). Column 1710 represents a large sedan. Column 1712 represents a small autonomous taxi. Column 1714 represents a large SUV. Row 1706 illustrates the underbody of each respective vehicle in a column. Similarly, row 1704 illustrates a top down view of each such vehicle. Row 1702 illustrates a side view of each vehicle.

It should be noted that the four vehicles shown are a small representation of the different possible vehicular configurations that can be implemented using the current platform. The manufacturer is no longer limited to producing a single model due to limitations inherent in the conventional assembly-line approach. In other embodiments, large vans and multi-person transports can be assembled using the platform as described herein. In still other embodiments, by positioning the definition nodes accordingly, vehicles can be made wide, narrow, long, short, high, low, or somewhere in between any or all of these parameters.

Figure 18:
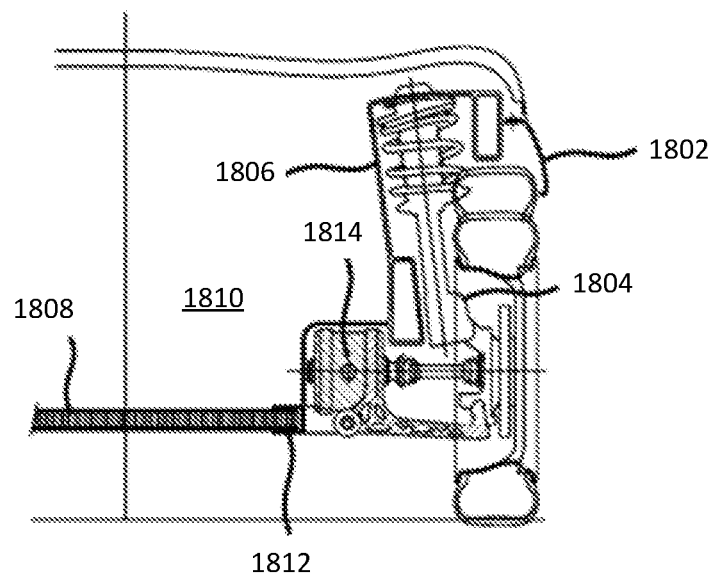
FIG. 18 shows an exemplary configuration of a definition node coupled to a wheel of a vehicle in accordance with an aspect of the present disclosure.

FIG. 18 shows an exemplary configuration of a definition node coupled to a wheel of a vehicle in accordance with an aspect of the present disclosure.

FIG. 18 is a representative example of a definition node coupled to a wheel in a steer/drive configuration. Space 1810 is the storage compartment, and represents saving of space for cargo by judiciously packaging the EV elements. Honeycomb sandwich panel 1808 is shown extending into a receiving member 1812. The body of the node 1806 is coupled on one side to front fender panel 1802. The lower portion of node 1806 is coupled in this embodiment to a McPherson Strut Suspension 1804 with integrated electric drive. The electric motor 1814 can be seen compactly packaged in the underbody and packaged adjacent node 1806. Other embodiments are equally possible depending on the type of vehicle, the mechanism of propulsion, etc.

Figure 19:
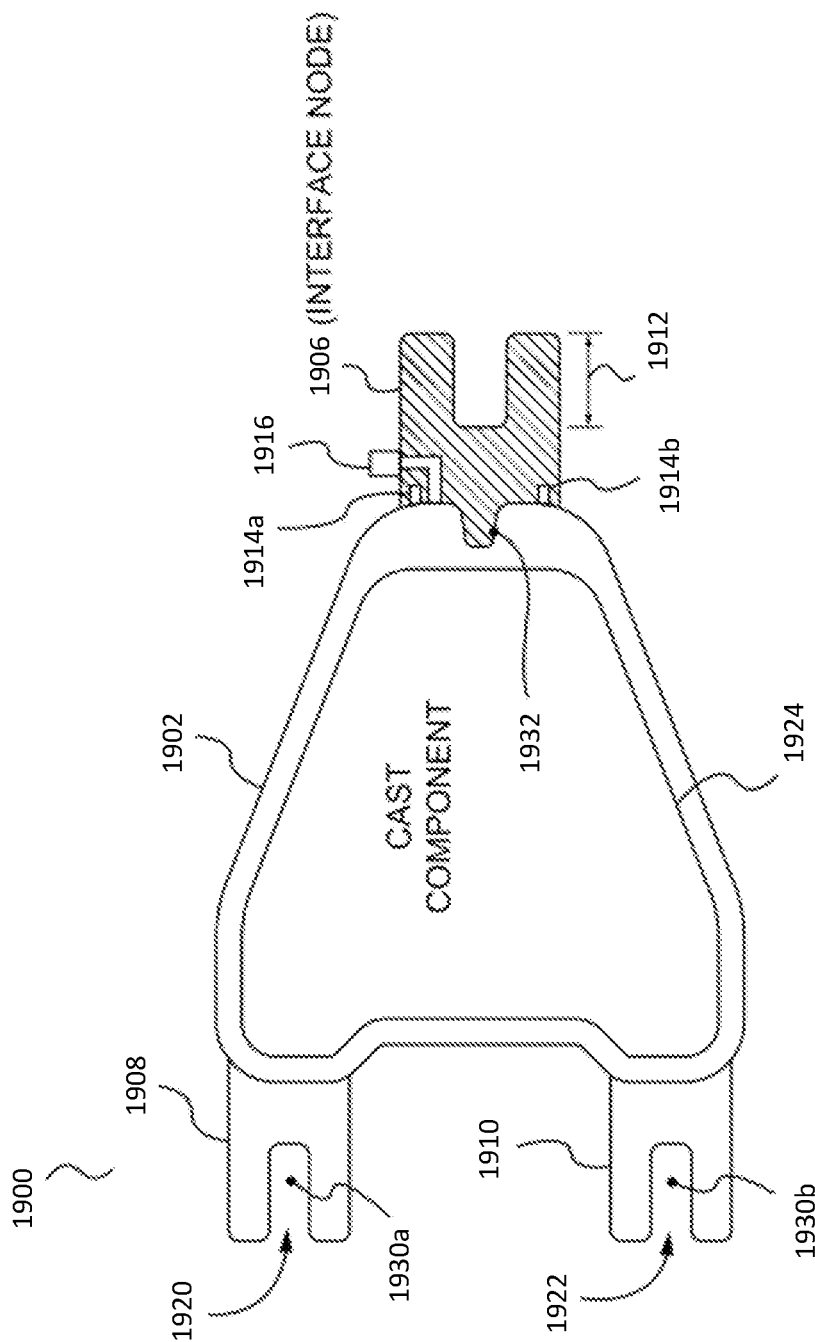
FIG. 19 is a side view of a structure including a conventionally manufactured component with connection features and an interface node with a complementary connection feature in accordance with an aspect of the present disclosure.

FIG. 19 is a side view of a structure including a conventionally manufactured component with connection features and an interface node with a complementary connection feature in accordance with an aspect of the present disclosure.

FIG. 19 is a side view of a structure 1900 including a conventionally manufactured component 1902 with connection features and an AM Interface Node 1906 with a complementary connection feature. Component 1902 is illustrated as a cast component, but in general component 1902 may be machined or manufactured using another conventional technology amenable for relatively high throughput production. In other embodiments, component 1902 may be manufactured using a generally higher throughput AM technique such as DED. In an exemplary embodiment, cast component 1902 includes a voluminous chunk of cast aluminum or plastic, although other materials are also possible. Cast component 1902 may be useful to provide a structure that incorporates a body of dense material, such as an impact structure in a vehicle. However, component 1902 is not so limited, and other geometric configurations are possible. By way of example, cast component 1902 may be made hollow and consequently may serve as a cover for another part, or a case for a more sophisticated structure (e.g., a gear case).

At the border region 1924 of cast component 1902 are connection features 1908 and 1910. In an exemplary embodiment, connection features 1908 and 1910 are part of cast component 1902 and are cast or machined together with the rest of the component 1902. In other embodiments, connection features 1908 and 1910 may be parts of other components, including, for example, Interface Nodes. In this former embodiment wherein the features 1908 and 1910 are included within the component 1902, connection features 1908 and 1910 may be made of the same material (e.g., aluminum, plastic, etc.) and in this event they are subject to the same thermal constraints as that material. This fact may be taken into consideration in determining whether connection features 1908 and 1910 can be used in an environment containing significant amounts of thermal energy. In general, whether or not the connection features 1908, 1910 are part of the cast component 1902, they may be connected to other components, including standard AM joints, other AM Interface Nodes, etc. Connection features 1908 and 1910 are negative features because they include respective grooves 1930*a* and 1930*b*. Thus, connection features 1908 and 1910 in this embodiment are configured to engage with complementary features that use positive connection features. These prospective engagements with connection features 1908 and 1910 are shown by respective arrows 1920 and 1922.

FIG. 19 also includes groove section 1932 adjacent border region 1924 of cast component 1902. Thus, inset into cast component 1902 is a negative connection feature for providing a connection to an AM Interface Node 1906. Interface Node 1906 is shown connected to cast component 1902 using a positive complementary connection feature, i.e., the tongue that protrudes into groove 1932. Generally, in this embodiment, node 1906 may be composed of titanium (Ti) or iron (Fe), or some metal or alloy having different properties than the aluminum or plastic of cast component 1902. In various embodiments, node 1906 (and any nodes or cast parts described herein) can be formed of any of the alloys described herein. The use of another chemical element such as titanium or iron may allow Interface Node 1906 to have specifically defined thermal characteristics for use in particular applications. For example, the melting point of node 1906 may be much higher, because the melting point of either titanium or iron is substantially higher than that of aluminum. This enables Interface Node 1906 to maintain its structural integrity even if connected to regions of the transport structure or other machine with a high temperature. Furthermore, using a suitable AM technique, the thermal properties of node 1906 can be carefully controlled. It is noteworthy that in many embodiments, FIG. 19 is not drawn to scale and cast component 1902 may be significantly larger and more voluminous relative to node 1906 than shown in the figure. (In other embodiments, the difference may be less significant or they may be comparable in size). Accordingly, rather than building an entire voluminous component 1902 that includes these thermal requirements, the thermal characteristics are instead incorporated into a relatively small Interface Node 1906. A substantial amount of powder may be saved in the process. In addition, titanium, which is expensive, need not be used unnecessarily in volume.

Interface Node 1906 may be connected to cast component 1902 via the tongue connection at groove 1932 (as noted) together with the surface regions of component 1902 adjacent groove 1932 that contacts Interface Node 1906. The negative connection feature including groove 1932 may be engaged with the complementary, positive connection feature of Interface Node 1906 via an appropriate adhesive. In this exemplary embodiment, precision fluid ports with fluid channels 1916 (only one shown) may be built into Interface Node 1906 to supply an adhesive and on an opposing side, to provide negative pressure in order to promote distribution and spread the adhesive. Interface Node 1906 may also provide sealant grooves 1914*a* and 1914*b* or similar structures to provide a sealant to facilitate proper distribution of the adhesive. In addition, spacers or other structures (not shown) may be incorporated into the connection feature on the Interface Node 1906 to prevent galvanic corrosion when certain dissimilar materials are involved. In another embodiment, channel 1916 may instead be part of a network of cooling channels in Interface Node 1906 for delivering fluid to and from the cast component 1902 to carry thermal energy away. Additionally, Interface Node 1906 may itself be composed of a material configured to dissipate thermal heat from cast component 1902. In this case, Interface Node 1906 may be made of a material with a significantly high melting point to accommodate the direct connection to cast component 1902.

In this example, Interface Node 1906 removes complexities from the cast component 1902. Interface Node 1906 incorporates the complex thermal features that otherwise would be necessary for integration into at least a region of cast component 1902. This saves manufacturers from having to make changes to the cast or to add the necessary complexity to whatever conventional technique is used, tasks which would otherwise increase lead times and lower throughput. Interface Node 1906 also incorporates the complex fluid ports 1916 and other potential structures in order to ensure a secure a proper seal to cast component 1902, thereby reducing or eliminating the need for cast component 1902 to embody these features.

Interface Node 1906 also includes on the other end an additional negative connection feature 1912, which may constitute any node-based connection. For example, connection feature 1912 may be configured to connect the node 1906 to any suitable structure. For example, node 1906 may be connected to connecting tubes, panels, and other structures. In addition, the structure comprised of node 1906 and component 1902 may be one of two or more, or a network of, similar structures which may all be connected together through connection features similar to connection feature 1912.

The Interface Node 1906 illustrated in FIG. 19 may in other embodiments incorporate a multi-material complexity in that it may have been 3-D printed with different types of materials and potentially in different proportions to serve a specific purpose. In the embodiment shown, node 1906 may incorporate a thermal complexity as in the case described herein, where a higher melting point may be desirable to maintain the structural integrity of node 1906 and protect that of component 1902 from a heat source. However, it will be appreciated that in other embodiments, Interface Node 1906 may incorporate other functions, structures, and features, as well as additional connection features (that may otherwise have had to be included in component 1902) to enable node 1906 to connect to a number of other standard interconnects. In this respect, Interface Node may incorporate a larger number of complexities in a manufactured component, rendering them unnecessary to place in the latter. This capability exploits the advantages of AM in a way that obviates a potentially significant amount of complex machining that may otherwise have to be performed in constructing these conventionally manufactured or higher throughput manufactured components. Further, in an exemplary embodiment, because use of the 3-D printer is not necessary for the conventionally manufactured components that incorporate the large volumes, but use of AM is only needed for the node itself, time and material may be saved in the AM process. A higher manufacturing throughput may consequently be obtained.

In addition, the connection feature 1912 on the Interface Node and the connection feature defined by groove 1932 on the cast component need not be a tongue and groove structure, and other connection features may be equally suitable. For example, the connection feature 1912 may in an alternative embodiment include a pair of tube-like protrusions having an inner and an outer diameter, the smaller protrusion inside the larger protrusion, for enabling a connection to carbon fiber connecting tubes, thereby coupling the connecting tubes to the cast component 1902 via Interface Node 1906. More generally, on the end of the Interface Node where connection feature 1912 currently resides, features may be incorporated to enable connection to any other component, including for example, extrusions, other nodes, other castings, etc. In an embodiment, a plurality of node-casting interfaces as described herein may be used to form a chassis for a transport structure. In this embodiment, the type of component 1902 may vary from region to region of the vehicle, and may not be used wherever not needed. In other embodiments, a single Interface Node may include a plurality of interfaces 1912 for multiple connections.

Figure 20:
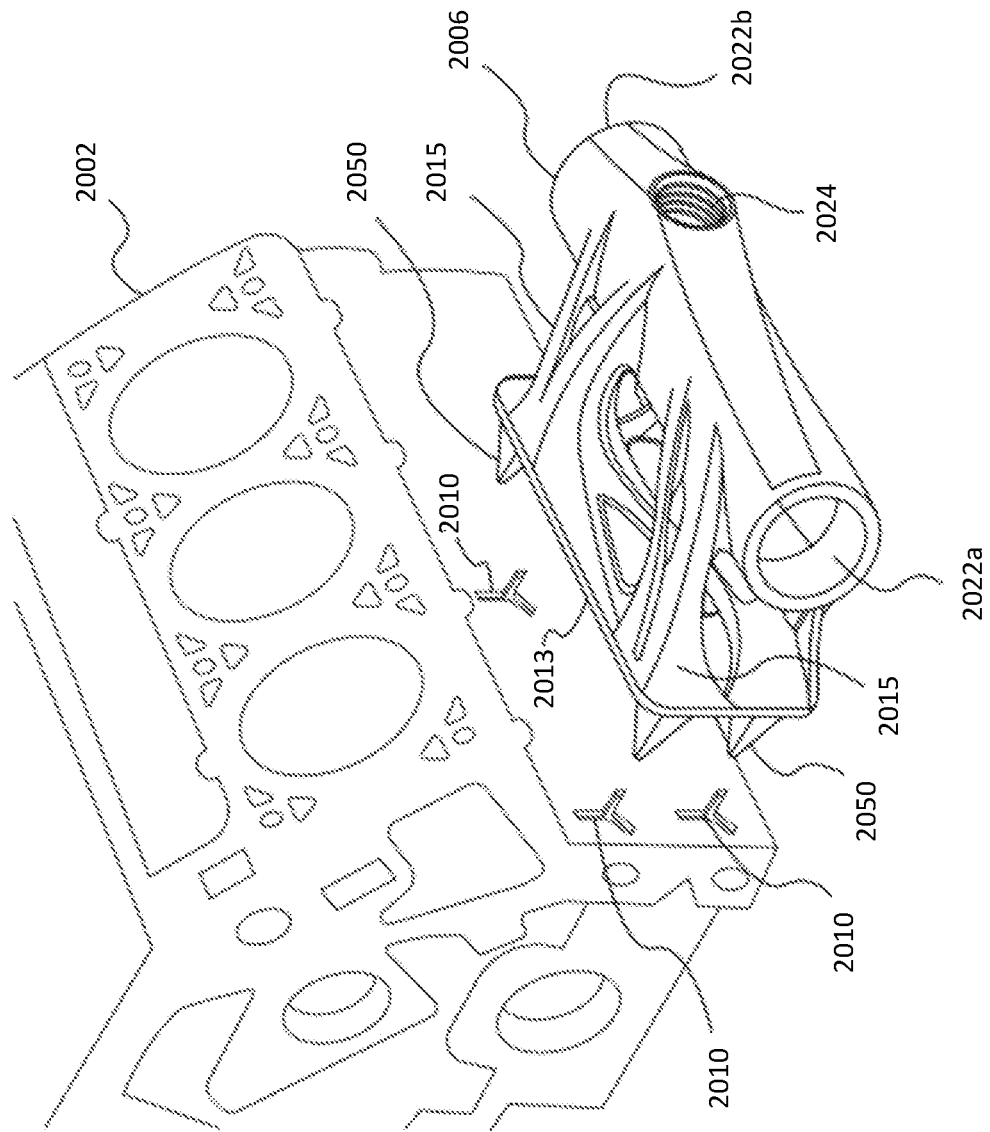
FIG. 20 is a perspective view of an interface node for coupling to an engine block using male connection features on the interface node in accordance with an aspect of the present disclosure.

FIG. 20 is a perspective view of an interface node for coupling to an engine block using male connection features on the interface node in accordance with an aspect of the present disclosure.

FIG. 20 is a perspective view of an Interface Node 2006 for coupling to an engine block 2002 using male connection features 2050 on the Interface Node 2006. In this exemplary embodiment, the Interface Node 2006 includes four male connection features 2050 (three are viewable) in the form of sharp protruding members that may be respectively coupled to corresponding female connection features 2010 on engine block 2002. Engine block 2002, in an embodiment, may be constructed using a cast mold and includes the shell to house the engine of the transport structure. In this embodiment, engine block 2002 may generally be constructed using any non-3D printed method. Engine block 2002 may in certain cases be manufactured in sections that are welded or otherwise connected together.

In turn, Interface Node 2006 may be printed using one of the higher throughput PBF techniques, or generally any appropriate high precision AM technique whether or not identified in this disclosure. In this example, the size of the interface 2013 is the same size that would normally be used for a transport structure with comparable engine and transmission parts, for example. That is, the interface 2013 would not be reduced in size, unlike potentially other portions of Interface Node away from interface 2013. Interface Node 2006 also includes interfaces 2022a-b and high-precision threaded interface 2024, which may be connection features for connecting to other Interface Nodes, Linking Nodes, which in turn, may connect to other components (e.g., drivetrain, transmission, etc.). In appropriate embodiments, Linking Nodes may be used.

In an embodiment, the Interface Node 2006 includes a network of reinforcing structures 2015 used to securely affix the interface 2013 to the remaining connection features 2022a-b, 2024. The network of reinforcing structures 2015 and connection features 2022a-b and 2024 may in some embodiments be substantially reduced in size to accommodate a high volume production with respect to the manufacture of Interface Nodes 2006. The geometry of the network of reinforcing structures 2015 would be determined by topology optimization, and these geometries would leverage the capabilities of additive manufacturing to fabricate complex structures which would otherwise be difficult or impossible to fabricate using conventional manufacturing processes. In this example, other Interface Nodes or structures that may connect to Interface Node 2006 via one or more of the connection features 2022a-b and 2024 may also be reduced accordingly. In an embodiment, reductions may be made in any area of the Interface Node outside of the interface that do not physically affect the function of the components in a negative way.

In some configurations, it may be desirable to provide isolation between the conventionally manufactured component and the Interface Node in the event that the materials are dissimilar. Isolation may assist in preventing galvanic corrosion that may otherwise occur due to the difference in the electrode potentials of the materials used for each structure. Accordingly, an exemplary embodiment may include a structure for achieving the desired spacing.

Figure 21A:
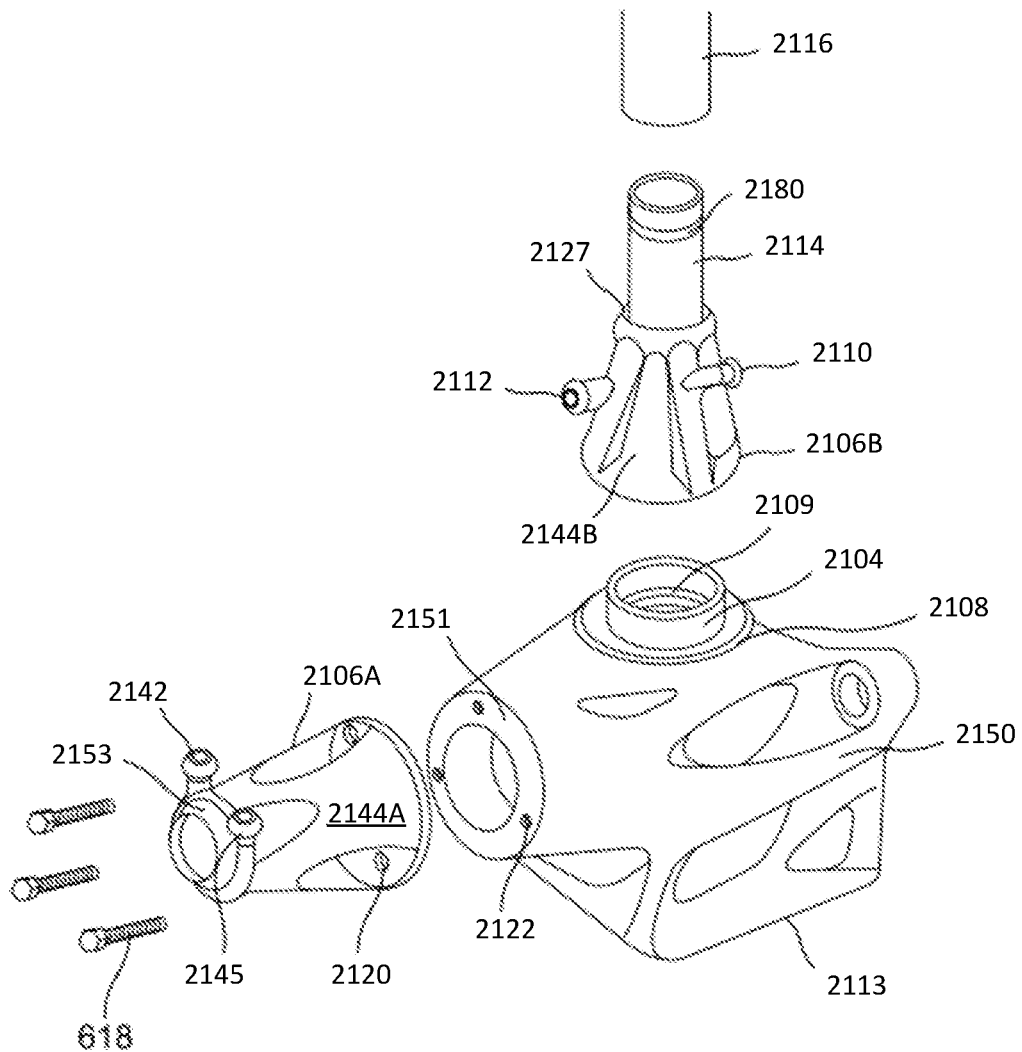
FIG. 21A is a perspective view of a linking node configured to be coupled to two interface nodes, the interface nodes being assembled for coupling to respective spanning components as a foundation for forming a structure such as a chassis in accordance with an aspect of the present disclosure.

FIG. 21A is a perspective view of a linking node configured to be coupled to two interface nodes, the interface nodes being assembled for coupling to respective spanning components as a foundation for forming a structure such as a chassis in accordance with an aspect of the present disclosure.

FIG. 21A is a perspective view of a Linking Node 2113 arranged for connecting to two Interface Nodes 2106A and 2106B, the Interface Nodes 2106A-B being further arranged for coupling to respective spanning components 2116 (only one shown in FIG. 21A) as a foundation for forming a larger integrated structure such as a chassis. As shown below, in this embodiment, Interface Node 2106A has connection features, including three apertures 2120 and bolts 2118, and a suitably sized and shaped flat surface at its base that is substantially parallel to flat surface 2151 of Linking Node 2113. The bolts 2118 and apertures 2120 of Interface Node A are configured to bolt with corresponding apertures 2122 embedded into a surface 2151 of Linking Node 2113. Accordingly, Interface Node 2106A in this embodiment is securely bolted to Linking Node 2113. At the opposite side of Interface Node 2106A distal from the aperture 2120 portion, connection features including adhesive inlet port 2142 and a vacuum port 2144 are disposed along with an additional circular-shaped connection feature 2153 designed to interface and couple with a spanning component (not shown) such as a carbon fiber reinforced polymer (CFRP) connecting tube.

In contrast to bolting, Interface Node 2106B is configured to be bonded with Linking Node 2113 via a double-shear (node-node) connection. More specifically, Interface Node includes at its base an area (FIG. 21B) into which a protrusion from Linking Node 2113 can be inserted. Linking Node 2113 includes a protrusion in the form of a flange 2104. Flange 2104 may be combined with O-rings 2108 and 2109 (or other sealants) to enable a strong connection to the more sophisticated connection features of Interface Node 2106B (see FIG. 21B). At the other end of Interface Node 2106B distal from the interface with Linking Node 2113, Interface Node 2106B further includes an internal portion 2127 which may include a base for a circular protrusion 2114 extending out of Interface Node 2106B. The internal portion 2127 and circular protrusion, in concert with adhesive inlet port 2112 and vacuum port 2110, enable Interface Node 2106B to form a solid adhesive bond with spanning component 2116 (see also FIG. 21B).

Interface Nodes 2106A-B respectively include contours 2144A-B that are well streamlined to receive and support spanning components such as tube 2116, while demarcating a physical size for the Interface Nodes 2106A-B that is not larger than necessary. Thus, these Interface Nodes 2106A-B are designed to be compact and feature rich, and only of a size that is necessary to accommodate the functions performed by their high precision features, as further shown in FIG. 21B (discussed below). In an embodiment, spanning component 2116 is a carbon fiber reinforced polymer (CFRP) connecting tube configured to form a link with Interface Node 2106B using a sealant and an adhesive. Generally, adhesive inlet and vacuum ports 2112, 2110 enable the flow of adhesive within Interface Node 2106B to (i) secure spanning component 2116 to the Interface Node 2106B and (ii) secure Interface Node 2106B to Linking Node 2113. Thus, ports 2112 and 2110 constitute connection features for both interfaces at opposing ends of Interface Node 2106B. Being connected to Linking Node 2113 albeit using different methods, Interface Nodes 2106A-B in turn are connected to each other via the Linking Node 2113 and also to any other components that may be connected to any of the structures.

Linking Node 2113 may include elongated sections 2150 of a reinforcing metal material, and other shapes that may be designed to enable a strong bond and a proper load transfer across the body of connected elements. Linking Node 2113 may be produced by a fast, albeit generally lower precision, AM process such as DED. As a result, different metals, such as any of the alloys described herein, may be used in the manufacturing process such that Linking Node 2113 can inherently include load-bearing strength and also, due to its material strength, may be a reliable connector of the Interface Nodes 2160A-B.

Figure 21B:
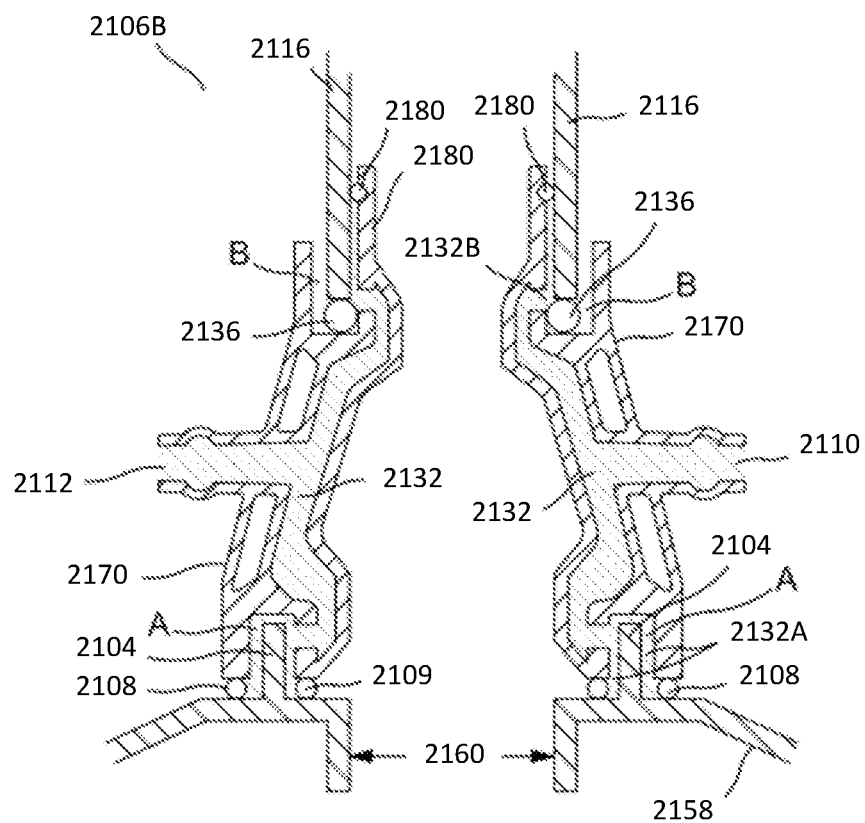
FIG. 21B is a front, cross-sectional view of the upper interface node of FIG. 21A showing the respective connections to the spanning component and the linking node in accordance with an aspect of the present disclosure.

FIG. 21B is a front, cross-sectional view of the upper interface node of FIG. 21A showing the respective connections to the spanning component and the linking node in accordance with an aspect of the present disclosure.

FIG. 21B is a front, cross-sectional view of the upper Interface Node 2106B of FIG. 21A showing the respective connections to the spanning component and the Linking Node. Initially FIG. 21B, being a cross-sectional view in which the interior of the Interface Node is shown, it becomes evident that the sophisticated, high precision features, including the connection features, have become compactified into Interface Node 2106B, rather than the substantially lower precision feature (e.g. The flange 2104) of Linking Node 2113.

Referring to FIG. 21B starting at the bottom of the Figure, a cross-sectional view of the surface of 2158 is illustrated. An inner diameter 2160 is provided. This inner diameter 2160 may be used in other embodiments for routing of wiring or other material from connecting tube 2116 through Interface Node 2106B and into Linking Node 2113. Referring back to the present embodiment, the sides of circular flange/tongue 2104 are also viewable protruding up into the connected upper node 2106B. The flange/tongue 2104 may be machined after the Linking Node is manufactured through a separate post-processing operation. Notably, the connection features of Linking Node 2113 are simple, as again, the higher precision features may be found in the Interface Node 2106B. Additionally, the two circular O-rings (shown as circles in this cross-sectional view) can be seen between the flange protrusions. An inner protrusion 2114 of the node 2106B can also be seen in cross-sectional view; the inner protrusion 2114 is in actuality partially cylindrical in nature, with variations. The outer structure 2170 generally surrounds the node 2106B and its geometrical complexities arise in part from the function of reinforcing and supporting the inlet and vacuum ports 2112 and 2110, and providing a strong, load bearing surface.

As noted, the adhesive inlet port 2110 and vacuum port 2112 are easily seen in this view. An important aspect of this view is the texture 2132 defining the filling between inner protrusion 2114 and the interior of 2170 adhesive that was circularly distributed throughout the interior by the action of the adhesive inlet and the vacuum. The adhesive 2132 is shown flowing to the bottom of the surface. For example, 2132a defines regions where the adhesive has saturated both sides of the circular flange and is sealed from further migration by O-rings 2108 and 2109. In this way, the adhesive forms a strong bond between the flange 2104 of the Interface Node 2106B and an interior portion A of node 2106B configured to fit, with room to spare for adhesive, around the flange 2104.

At the top of FIG. 21A, the spanning component 2116 is viewable, which in this embodiment is a carbon tube. The carbon tube inserts over the inner protrusion 2114 onto circular sealant or O-ring 2136 at the base of an inset B of the node 2106B into which the carbon tube 2116 is inserted. An additional sealant or O-ring 2180 may be disposed around an upper portion of the inner protrusion. O-rings 2136 and 2180 act to prevent the migration of the fluid adhesive out of inset B and therefore out of node 2106B, or into the interior of carbon tube 2116. However, the interior region between tube 2116 and inner protrusion 2114 has large surface areas filled with adhesive. Upon curing, the result is a strong bond between inner protrusion 2114 and tube 2116.

As shown in the embodiment of FIGS. 21A and 21B, the connection features of the upper and lower interfaces of the Interface Node 2106B, such as the insets A and B, complex reinforced adhesive inlet and vacuum ports 2112 and 2110, and the complex, surface-area increasing shape of the interior walls of Interface Node 2106B, the inner protrusion and sealants, demonstrate both the sophisticated and streamlined functional nature of the Interface Node and the geometrical complexity idealized for, among other things, the correct flow of adhesive, are substantially distinguishable from the more straightforward functions and features of the Linking Node 2113. These features advantageously allow the Interface Nodes to realize multi-material architectures. Further, the Interface Node 2106B in this embodiment is far more compact than the Linking Node while maintaining the necessary sizes at the interfaces. Accordingly, Interface Node 2106B and similar node 2106A are likely ideal candidates for design independent production using a high precision powder bed fusion technique. Linking Node 2113, which includes some lower precision features and functions, may be machined or cast, or alternatively may be produced using a high speed, lower precision AM technique such as DED.

While two Interface Nodes are shown for the purposes of this example, more than two nodes or other ports may be used in other embodiments.

Figure 21C:
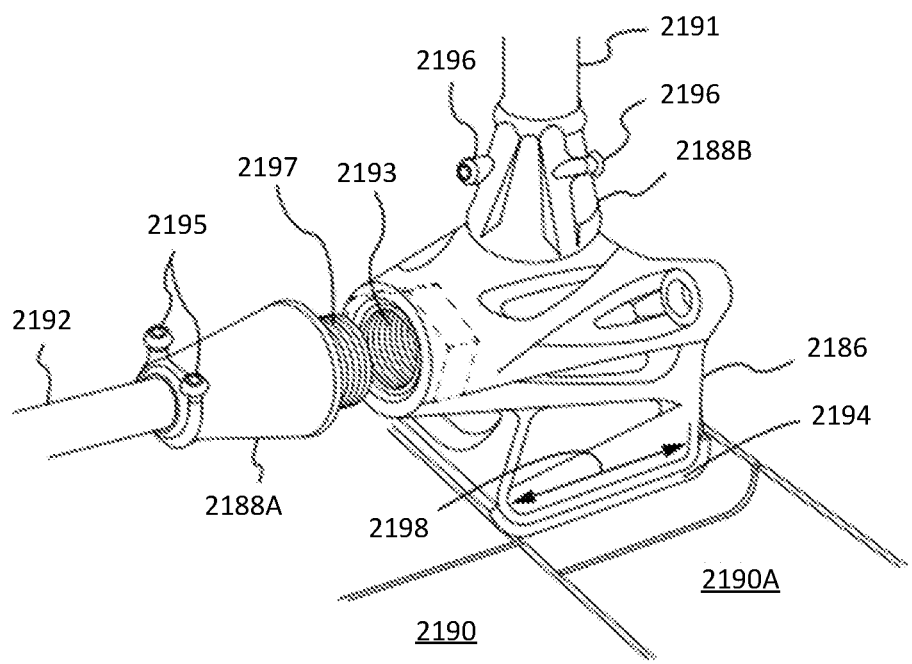
FIG. 21C is a perspective view of a linking node coupled to carbon fiber tubes via interface nodes and coupled to a high-throughput manufactured component using an isolation feature in accordance with an aspect of the present disclosure.

FIG. 21C is a perspective view of a linking node coupled to carbon fiber tubes via interface nodes and coupled to a high-throughput manufactured component using an isolation feature in accordance with an aspect of the present disclosure.

FIG. 21C is a perspective view of a Linking Node coupled to carbon fiber tubes via Interface Nodes and coupled to a high-throughput manufactured component using an isolation feature. In this exemplary embodiment, Linking Node 2186 has three connections. Two are to Interface Nodes 2188A-B, and the remaining one is to cast component 2190. Carbon fiber tube 2192 is a spanning component that may couple at one end to another structure, such as another Interface Node (not shown). Tube 2192 is connected to an AM Interface Node 2188A via an adhesive-bond connection facilitated by adhesive inlet and vacuum ports 2195 in a manner discussed with respect to FIG. 21B.

Interface Node 2188A further includes 3-D printed connection features 2197 which in this exemplary embodiment includes a cylindrical protrusion with high precision threads for connecting to Linking Node 2186. Because Linking Nodes may include lower precision features but are typically enable of including high precision features such as fine threads for mating with connection feature 2197, a "captive nut" 2193 is shown embedded in the Linking Node 2186. The nut 2193 may be a 3-D printed or a standard off the shelf part. In an embodiment, the Linking Node 2186 is 3-D printed with the captive nut 2193 placed inside. Proper supports are printed around the captive nut 2193 while the linking nut 2186 is printing. The connection features 2197 of Interface Node 2188A can thereupon be inserted into the captive nut 2193 and thus the Interface Node 2188A can be tightly bonded together with Linking Node 2186. In another embodiment, captive nut may be co-printed with the Linking Node for a suitable printer.

FIG. 21C further shows Interface Node 2188B which is similar to the Interface Node 2108B in the prior illustrations. Using adhesive inlet and vacuum ports, Interface Node 2188B can be bonded via a strong cured adhesive bond with carbon fiber tube 2191 on the upper side, and with the provided connection features (obscured from view) of the Linking Node 2186 on the lower side. In an embodiment, the connection is a double-shear adhesive connection with the sophisticated connection features embedded in the Interface Node 2188B, as shown in previous embodiments. In other embodiments, the connection may be a bolted connection. Numerous other types of features may be contemplated to accomplish bonding between the Interface and Linking Nodes. In one embodiment, the respective Interface and Linking Nodes may include connection features that can be welded together. In the embodiment shown, carbon fiber tubes 2191 and 2192 are oriented a substantially orthogonal direction relative to each other.

Additionally, FIG. 21C shows that Linking Node 2186 is bonded to a cast component 2190, which in an embodiment may be an interior or exterior panel. Component 2190 may be large, and may also include basic structural functions and features. For instance, component 2190 includes an inset portion 2190A which may include a connection feature for component 2190. Linking Node 2186 may be bonded to component 2190. Alternatively, Linking Node 2186 may be welded or bolted to component 2190. In other embodiments, Linking Node 2186 may be coupled to additional Interface Nodes that are used to create the connection to component 2190. In this illustration, the geometry of Linking Node 2186 is such that its lower portion 2198 spans substantially across an area defined by inset 2190A. In an embodiment, an isolation member 2194 is arranged between the interface defined by Linking Node 2186 and cast component 2190. The purpose of the isolation member 2194 is to avoid direct contact and prevent galvanic corrosion of the materials in the event Linking Node 2186 and cast component 2190 are composed of dissimilar metals. An adhesive may be applied between sections of isolation member 2194, or in other embodiments, on its respective surfaces to enable a strong bond between Linking Node 2186 and cast component 2102. In other embodiments, the bond may be realized instead by using one of a variety of connection features. In still other embodiments, one or more of the Interface Nodes may be coupled directly to the cast component.

In another embodiment, prior to the application and curing of the adhesive, the isolation feature 2195 may be inserted between the node Linking Node 2186 and the component 2190 to provide a space between the Linking Node 2186 and cast component 2190 such that physical contact between the two parts is avoided, thereby avoiding subsequent problems with galvanic corrosion if the metals are dissimilar. In addition, in some embodiments, sealants and other features such as standoffs for fixturing may be incorporated into Linking Node 2186 and/or component 2190 for use in the spacing and isolating procedures. All of these steps may advantageously aid in the prevention of galvanic corrosion where different materials having different respective electrode potentials are used in the substructure (node and component) of the structure.

In some embodiments, an Interface Node may be 3-D printed using an asymmetrical shape rendered by the 3-D printer to accommodate a specific space inside a transport structure or other mechanical device.

In an embodiment as noted herein, the techniques in FIG. 21A-C may involve the use of material in the chassis of a vehicle. DED-produced Linking Nodes may be implemented in any location where the topology optimization process determines that a material for linking components is desired in a section of the vehicle. The program's determination and the ensuing manufacturing process can be broken down using a variety of parts as described herein. Namely, the larger, low complexity structures can be manufactured using a faster AM method such as DED or a non-3D printed method, while the more complex structures may be manufactured at a reduced size using a high precision AM process. Together with the necessary connection features, this latter procedure can produce Interface Nodes. As described herein in the figures and embodiments herein, producing the compact Interface Nodes, streamlined in an embodiment without extraneous bulky material, may allow for efficient material consumption while fabricating the high precision Interface Nodes, which may in turn lead to shorter print times. To the extent high strength, lightweight structures are needed in the area of the design, multi-material architectures may also be used. For example, Linking Nodes using different metals may be printed using DED. By selectively using Linking Nodes with Interface Nodes, these multi-material connections can be realized and implemented in the vehicle. As discussed herein in FIGS. 21A-C, the Interface Nodes, which may be connected to Linking Nodes, may also be connected to spanning components like carbon-fiber tubes to form a lightweight chassis, with the desired mechanical performance (stiffness, torsional rigidity, crash optimization, etc.). Load paths and their characteristics can also be tailored by using this approach.

These procedures are in contrast to conventional reliance solely on traditional manufacturing techniques which are more often than not characterized by significant tooling and machining costs, and needless additional lead time. Moreover, the use of conventional procedures would in many cases render it impossible to fabricate a chassis which most closely matches the ideal structure for optimal load path distribution. Conversely, the Interface and Linking Nodes benefit from the non-design specific feature of additive manufacturing by enabling the precise realization of the load paths and related chassis features.

As another exemplary application, transport structures utilize crash components manufactured using traditional processes (stamping, extrusions, etc.). In lieu of these conventional procedures, the Interface Node-based infrastructure can be used to implement complex connection-based geometries that correspond to an optimal load path. Rather than investing significant time and money in machining these components to correspond to the desired optimized topology, the components can instead be procured using relatively simple geometries through any high-volume conventional means or high volume printing means. The components can thereupon be connected via Interface Nodes for implementing the most suitable and optimal load path to address crash performance.

The principles and techniques herein further provide a manufacturer with capability to produce simple parts using conventional processes and nodes incorporating part complexity using AM processes. In the example of cast parts as described herein, casting is a tooling intensive manufacturing process. Additionally, as described herein, it is difficult to fabricate cast parts with complex features such as mechanical reinforcements, cooling channels and the like. Using AM Interface Nodes, complex features can be developed on or within the node instead, which enables the designer to preserve relative simplicity of the conventionally manufactured feature.

In another embodiment, AM Interface Nodes can be used to augment mechanical reinforcement in regions bearing high loads. Accordingly, if the cast part and Interface Node are designated to be placed in a region which may be subject to significant gravitational loading and other forces, the Interface Nodes may be rendered to provide additional support to counteract this loading in addition to the cast part.

Figure 22A:
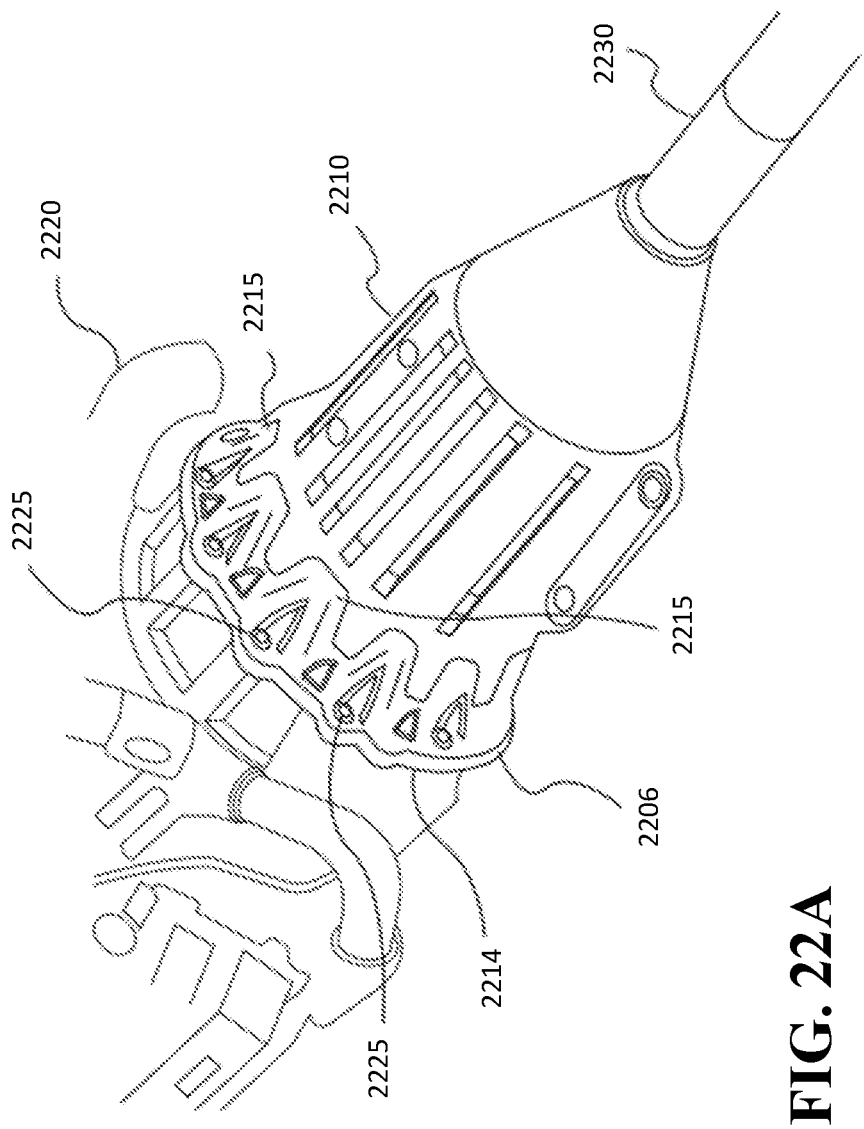
FIG. 22A is a perspective view of a cast bell housing coupled to an interface node configured to dissipate thermal energy from the engine block in accordance with an aspect of the present disclosure.

FIG. 22A is a perspective view of a cast bell housing coupled to an interface node configured to dissipate thermal energy from the engine block in accordance with an aspect of the present disclosure.

FIG. 22A is a perspective view of a cast bell housing 2210 coupled to an Interface Node 2206 in the context of an output drive shaft. Interface Node 2206, which surrounds a periphery of the interface of housing 2210, may be configured to dissipate thermal energy from the engine block 2220. In FIG. 22A, a large section of the bell housing 2210 may be manufactured using conventional processes such as casting. In an embodiment, the material comprising cast housing 2210 is aluminum, although other materials are possible.

In the example of FIG. 22A cast bell housing 2210 functions as a component in that it is a housing (that is, a gear box case), but it also includes load carrying capability in linking to and transmitting a load to another component at the other end of shaft 2230. As a result, cast bell housing 2210 can be considered to be both a component and a Linking Node.

The AM Interface Node 2206 may connect over an open end of the bell housing 2210. The Interface Node 2206 surrounds the end of the bell housing 2210 and covers the end portion with fingerlike members 2215. The Interface Node 2206 includes a standard size interface 2214 for connecting to engine block 2220 a plurality of threaded bolts 2225, at least in part, for connection features to the bell housing 2210 and engine block 2220. In this embodiment, the bolts extend into visible channels that surround the engine block 2220 interface. In other embodiments, the Interface Node 2206 may be coupled to component 2220 via, for example, a tongue and groove connection, bonding, welding, or other suitable connection feature.

Interface Node 2206 may also be fabricated with features designed to dissipate the heat. For example, Interface Node 2206 may be constructed with complex networks of cooling channels. In this embodiment, the fingerlike members 2215 that extend from and surround the perimeter of the end of bell housing 2210 may assist in transferring heat from node body 2206 accumulated as a result of the connection to a heat source (engine block 2220) and to dissipate the heat. The temperature gradient may be made more manageable due to the members 2215 as the increased surface area provides improved heat transfer characteristics in comparison to flush contact by the node 2206 with the heat source without members 2215.

In other implementations, Interface Node 2206 may incorporate other sophisticated features to support processes such as welding, mechanical fastening, adhesive bonding, and the like, to secure a connection both to the Interface Node 2206 and to an engine block 2220 interface or other channel to which it will be affixed.

Figure 22B:
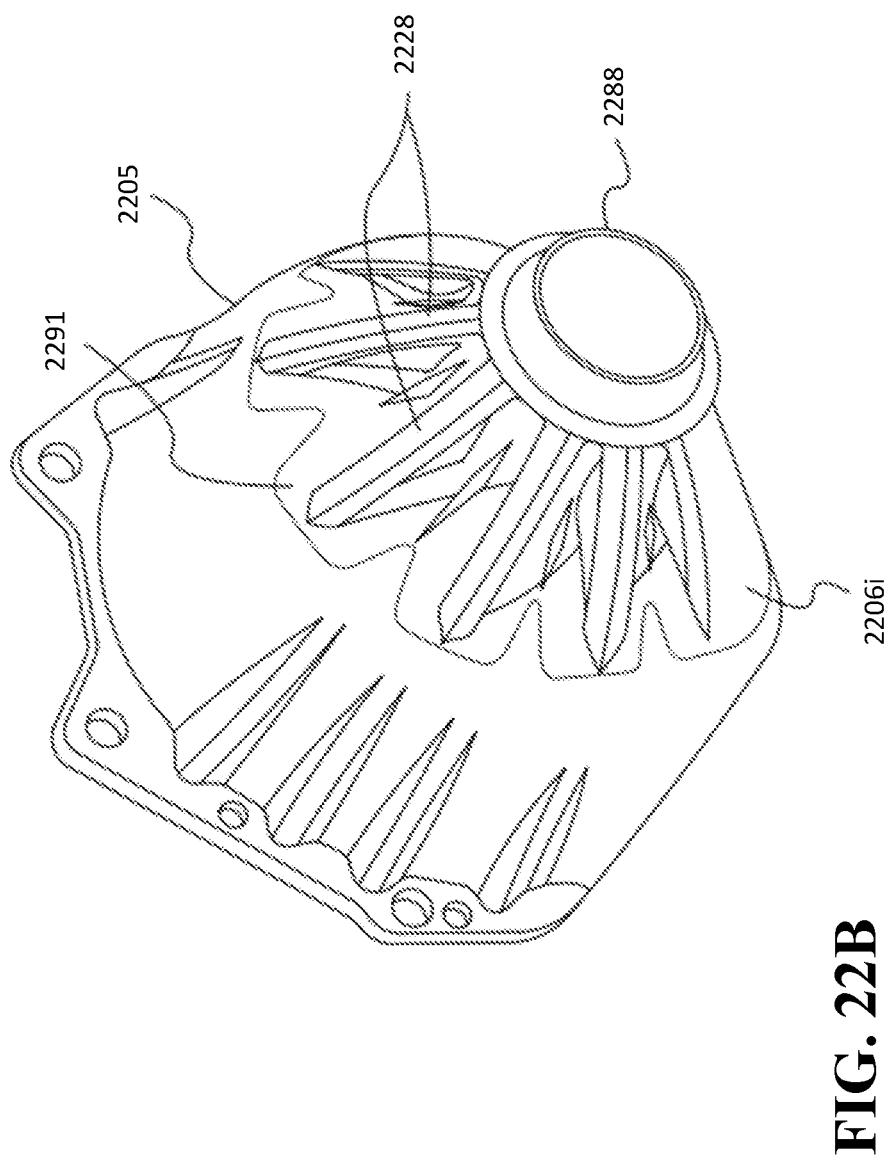
FIG. 22B is a perspective view of an interface node coupled to an end of a cast transmission case in accordance with an aspect of the present disclosure.

FIG. 22B is a perspective view of an interface node coupled to an end of a cast transmission case in accordance with an aspect of the present disclosure.

FIG. 22B is a perspective view of an Interface Node 2206*i* coupled to an end of a cast transmission case 2205. Interface Node 2206*i* includes a plurality of reinforcing structures 2228 extending peripherally around the end of the transmission case, a connection feature 2288 such as a flange or an internally threaded member for enabling connection via a rod to a drive shaft of other component. The reinforcing structures of Interface Node 2206*i* may assist in providing a strong connection between the transmission case 2205 and the connection feature 2288. The Interface Node 2206*i* further includes fingerlike portions 2291. Portions 2291 may be used to provide additional surface area for securing the connection of Interface Node to transmission case 2205. Alternatively, the Interface Node 2206*i* may be connected to the cast transmission case 2205 by means of an adhesive, using adhesive and vacuum ports and channels (not shown) built into the Interface Node. Fingerlike members 2291, as noted, may operate to provide a stronger bond to the transmission case 2205 and to dissipate thermal energy. In other embodiments, Interface Node 2206*i* may include additional features. In an embodiment, the reinforcing structure 2228 has been substantially reduced in size while the interface with the transmission case 2205 remains substantially the same size.

In an exemplary embodiment, complex or high precision features that are traditionally used on or associated with the component may be instead incorporated into the Interface Nodes. These high precision features may include geometrical and structural complexities such as various connection features for coupling the components with the Interface Nodes.

More generally, these high precision features may include, by way of example, intricate shapes, substructures, or patterns disposed on or integrated within a part, multiple regions of curvature or other complex shapes designed to perform one or more functions, singly or in concert with other elements. Examples include structures traditionally used with machines, motors, or other mechanized equipment and mechanized assemblies; specialized parts such as features in custom panels; materials or combinations of materials organized into specific shapes to perform predetermined functions; repetitive patterns such as networks of links, rods, rails, fingers, or other intentionally designed arrays of substructures; small or microscopic structures and features integrated onto or within the part; and finely tuned materials organized in a coherent or meaningful way to perform a designated function. Geometrically complex features may also include structural updates, upgrades, enhancements, or features that require changes from part to part and include, for example, features or substructures whose design or shape changes from part to part. Such features or structures may present throughput difficulties in a casting or molding application because, for example, different sets of tooling shells may be required to provide the needed changes on each part. Structurally high precision features may also include electronic circuits and elements such as inductors, coils, and capacitors. Such features may also encompass integrated circuits, processors, electronic devices, physical input features (such as one or more switches), user interfaces, displays, and the like.

These high precision features may further include mounted fixtures, specialized flanges, vertically and horizontally threaded mounting plates, floating nuts, clamps, screws, and other fixtures that include extra detail or especially fine geometries that may be distributed across the structure and that by design may require careful positioning. While components and Linking Nodes may include flanges, plates, screws and other features, generally the Interface Node provides such structures with greater sophistication, smaller sizes, specialized or custom substructures, and unique, design dependent features. In addition, the Interface Node may provide the structures in a compact way with tight 3-D spatial margins, such as the Interface Node in FIGS. 21A-B.

High precision features may also include substructures whose geometries accommodate or enable intended rotating or translating motion either integrated within the structure or provided externally, or both. Common features may be high precision, as is generally evident to one of ordinary skill in the art, in situations where they require precision placement or where they are integrated into a more complex array of additional types of structures. For example, high precision features may demand strict tolerance requirements, such as involving parts that must be oriented relative to one another with precisely defined angles or distances. Parts may also need to be positioned relative to one another at precise ranges or distances in order to function properly. These parts may need to be manufactured using separate machining techniques or precision AM technologies.

Commonly, features may be high precision in cases where a part containing the feature cannot practically be manufactured with an acceptably high throughput (relative to the application) using the same manufacturing process used to produce the remainder of the part. For example, while a vehicle gear case may be fabricated using a traditional casting technique, internal channels for providing adhesive or negative pressure to specifically defined regions of the cast part may have to be separately constructed using another method in order to achieve the desired throughput for the finished gear case.

Examples of high-precision features may also include structures having specific material requirements. For example, certain regions of the structure may be composed of a specific type of material or combination of different materials. Different regions of the structure may require use of different materials depending on the geometry of the structure, the load characteristics of the structure and adjacent structures, and other considerations pertinent to the application for which the structure is being used.

High precision features involving material properties that may compromise throughput may include one or more of rigidity, elasticity, ductility, malleability, hardness, thermal tolerance, resistance to corrosion or contaminants, mass, physical stability, or chemical reactivity or resistance thereto. The level of precision of various features may also include the extent and manner in which the features require specific thermal characteristics, including different melting points, thermal control over phase changes, desired heat capacities, etc.

Figure 23:
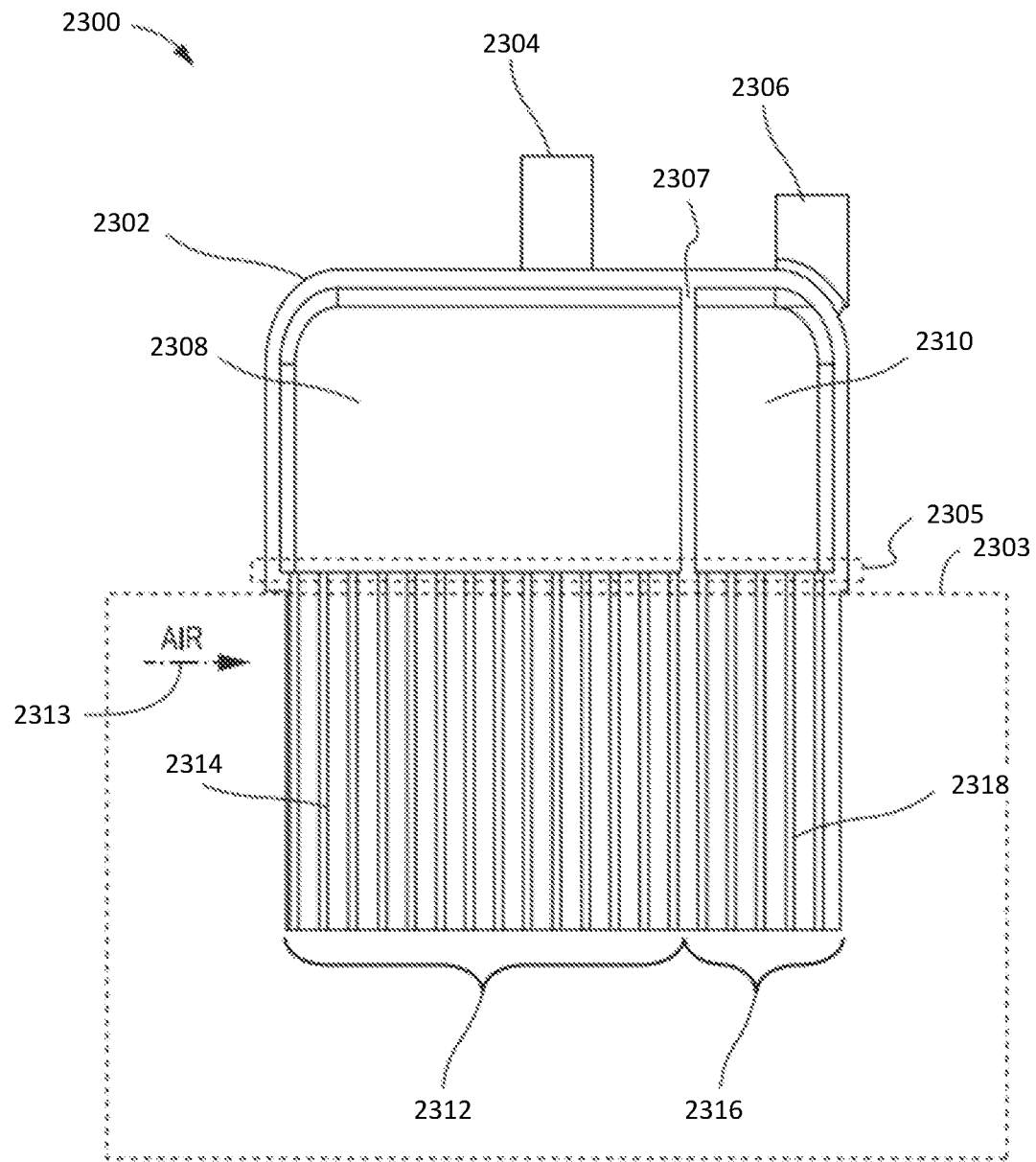
FIG. 23 illustrates a side view of an additively manufactured microtube heat exchanger in accordance with an aspect of the present disclosure.

FIG. 23 illustrates a side view of an additively manufactured microtube heat exchanger in accordance with an aspect of the present disclosure.

FIG. 23 illustrates a side view of an additively manufactured (AM) microtube heat exchanger 2300. In various embodiments, the heat exchanger 2300, and any heat exchanger or microtube array described herein, can be formed of one or more of the alloys described herein. The AM microtube heat exchanger 2300 includes a header 2302 and a microtube array 2303 integrated at an interface 2305. The header 2302 has a header section 2308 and a header section 2310. The header section 2308 has an inlet/outlet port 2304, and the header section 2308 has an inlet/outlet port 2306. A dividing wall or divider 2307 can separate the header section 2308 from the header section 2310 to separate a fluid of the header section 2308 from a fluid of the header section 2310.

Unlike conventional processes which use sheet metal construction metallic braze tubes to sheet and affix headers, additively manufacturing the header 2302 with the divider 2307 allows for fluid-tight division between the header sections 2308 and 2310. Advantageously, this can allow dissimilar fluids to flow in the header sections 2308 and 2310. Structures allowing fluids to be closely brought together in the same structure can have reduced mass, and hence realize improved heat transfer effectiveness Eff.

The microtube array 2303 has a plurality of microtubes separated into a first microtube array 2312 and a second microtube array 2316. Microtubes from the first microtube array 2312 can carry a first liquid or fluid, and microtubes from the second microtube array 2316 can carry a second liquid or fluid. For instance, microtubes including microtube 2314 can carry a liquid such as oil, and microtubes including microtube 2318 can carry a liquid such as a water-based coolant, although numerous other fluids are possible depending on the application.

As described herein, an AM microtube heat exchanger can be used to manufacture the header 2302 so that it is integrated with the microtube array 2303. This can be accomplished without traditional brazing techniques, and the header 2302 can be configured as a fluid distribution manifold for fluids.

The AM microtube heat exchanger can cool the fluids flowing within the microtubes of microtube array 2302 by exchanging heat to air flowing perpendicular, or substantially perpendicular, to the microtubes. For instance, as shown in FIG. 23, air flow can be forced to flow via the inlet/outlet ports 2306 and 2308 in the direction indicated by air flow vector 2313. Alternatively, the direction of air flow can be opposite that of the air flow vector 2313. In this way the hot and cold fluids are separated (not mixed) in a cross-flow configuration.

Although the AM microtube heat exchanger 2300 shows a header having two header sections 2308, 2310 and first and second microtube arrays 2312, 2316, other configurations are possible. For instance, an AM microtube heat exchanger can be manufactured with a header having greater or fewer than two header sections; and more or fewer microtube arrays can be separated for carrying different types of liquids. Also, by using a 3D manufacturing process, the header 2302 can have internal chambers (not shown) with any desirable high performance shape. For instance, the header 2302 can be formed in the shape of a triangle or to have triangular features.

The header 2302 can be additively manufactured from a base plate (not shown) at the interface 2305. In this way the header 2302 can be additively manufactured with the microtube array 2303 to be continuous.

Figure 24:
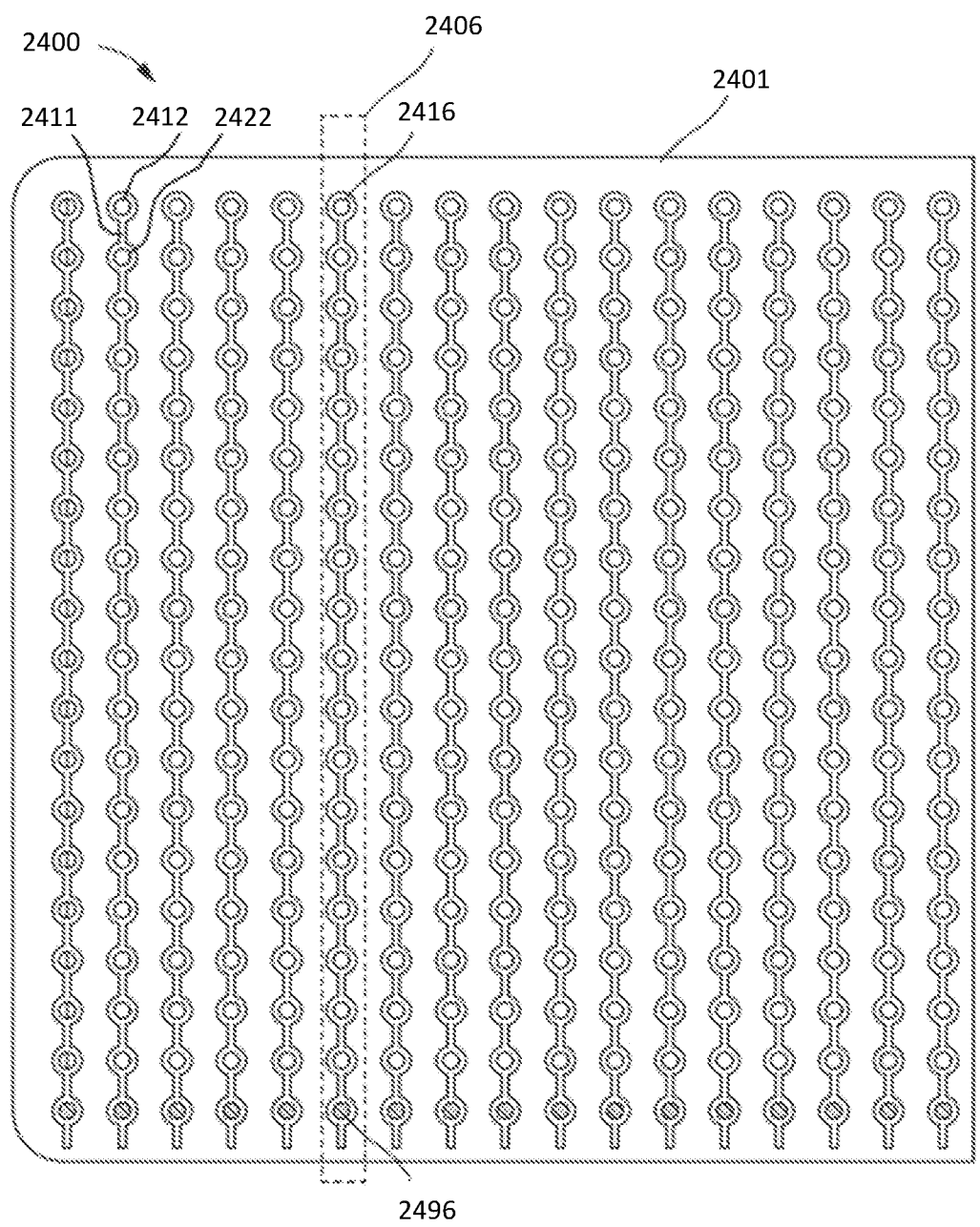
FIG. 24 illustrates a cross-sectional view of a microtube array in accordance with an aspect of the present disclosure.

FIG. 24 illustrates a cross-sectional view of a microtube array in accordance with an aspect of the present disclosure.

FIG. 24 illustrates a cross-sectional view of a microtube array 2400 according to an embodiment. Microtubes can be arranged in rows and columns including column 2406. As shown in FIG. 24, a microtube cross section 2416 is located in the first row and sixth column and a microtube cross section 2496 is located in the ninth row and sixth column. Additionally, fins can be formed between microtubes. For instance, as illustrated in FIG. 24, a fin 2411 is formed between microtube cross sections 2412 and 2422. In an exemplary embodiment, the fins 2411 may extend from the base plate up to a surface of the microtubes 2416. The fins 2411 may be used to transfer thermal energy more efficiently through the microtube array. The fins 2411 may also be used to provide structural support for the microtubes 2416 during the AM process. In certain embodiments, the fins 2411 may be disposed diagonally between microtubes 2416 in addition to or in lieu of the straight line configuration shown in column 6. This alternative embodiment provides additional support for the microtube array in more complex 3-D printing arrangements, including where the heat exchanger is oriented at an angle relative to the build plate while being printed.

Microtubes can be arranged as a planar web connecting a separation distance between tubes arranged parallel to the flow path of liquids flowing inside. This can advantageously allow support material to connect to a row, referred to as a datum row, to provide support during the additive manufacturing process.

In some embodiments microtubes can be manufactured so that the microtube or tube axis is substantially parallel to the force due to gravity; in other embodiments microtubes can be manufactured so that a microtube or tube axis is substantially normal to the force due to gravity. When manufactured with a tube axis normal to the gravitational force, microtubes can be arranged so that they are secured or tied back to a datum (single supporting) row. When manufactured with a tube axis parallel to the gravitational force, microtubes can be free-standing.

In other embodiments rows and columns can be positioned using simple linear vectors allowing for a simplified analysis and design procedure. Configurations of rows and columns that provide an integral support structure can also be lighter than those that need additional material when constructed largely normal to the gravity vector. Also, hollow beam elements can be fluid passages, and appropriately designed unit cells can propagate and transport fluid across spans. Advantageously, additively manufacturing a header, such as the header 2302 of FIG. 23, can allow for the header to be a continuous part of the microtube array 2400. This can allow for improved fluid flow and improved sealing with the microtubes. For instance, unlike traditional brazing techniques to join headers with microtubes, an AM header-to-microtube seal can be uniform with less leakage. An AM process can be accomplished with a single-step process such as selective laser melting. This in turn can lead to lower tube blockage, lower tube fouling, and overall improved heat exchanger performance.

Figure 25:
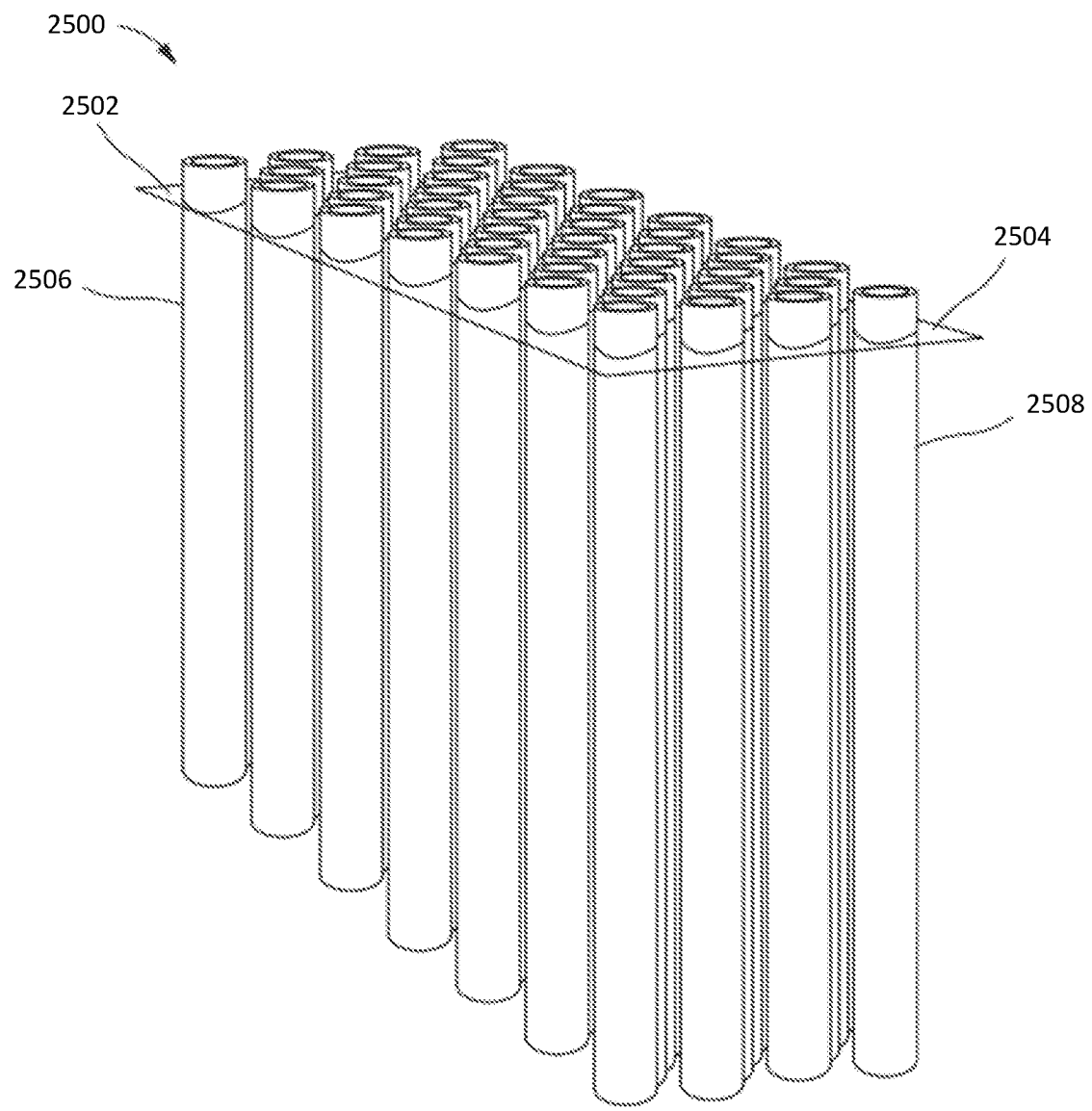
FIG. 25 illustrates a side perspective view of a microtube array in accordance with an aspect of the present disclosure.

FIG. 25 illustrates a side perspective view of a microtube array in accordance with an aspect of the present disclosure.

FIG. 25 illustrates a side perspective view of a microtube array 2500. The microtube array 2500 can include microtubes forming microtube arrays similar to the microtube array 2303 of FIG. 23 and/or the microtube array 2401 of FIG. 24. The microtube array 2500 can be secured with a base plate 2502, and can have a plurality of rows and columns of microtubes including microtubes 2506 and 2508.

Advantageously, 3D printing allows for superior compact manufacturing of microtube arrays by creating an integrated seal. The integrated seal allows for the creation of an AM microtube array 2500 having less mass than one created by traditional brazing techniques. This in turn can allow for improved heat exchanger effectiveness Eff and improved surface transfer area.

FIG. 26A illustrates a side perspective view of a microtube in accordance with an aspect of the present disclosure.

FIG. 26A illustrates a side perspective view of a microtube 2600a. The side perspective view shows the design parameter length L for modeling purposes. By modeling the microtube 2600a, a microtube array can be analyzed prior to 3D printing.

FIG. 26B illustrates a cross-section view of the microtube in accordance with an aspect of the present disclosure.

FIG. 26B illustrates a cross-section view of a microtube 2600b. The microtube 2600b shows a diameter d1 and a diameter d2 of an annulus formed due to the thickness of the microtube. As shown in FIG. 26B, the diameter d2 of the annulus is larger than the diameter d1. Both the diameter d1 and the diameter d2 can be designed and additively manufactured to allow for improved heat exchanger effectiveness Eff. For instance, in some embodiments diameter d1 can be less than or equal to 1 mm, diameter d2 can be less than or equal to 1 mm, and/or both diameters d1 and d2 can be less than or equal to 1 mm in microtube 2600b. In some embodiments a tube length L to diameter (d1 or d2) ratio can be between three-hundred to one to one-thousand to one.

Figure 27:
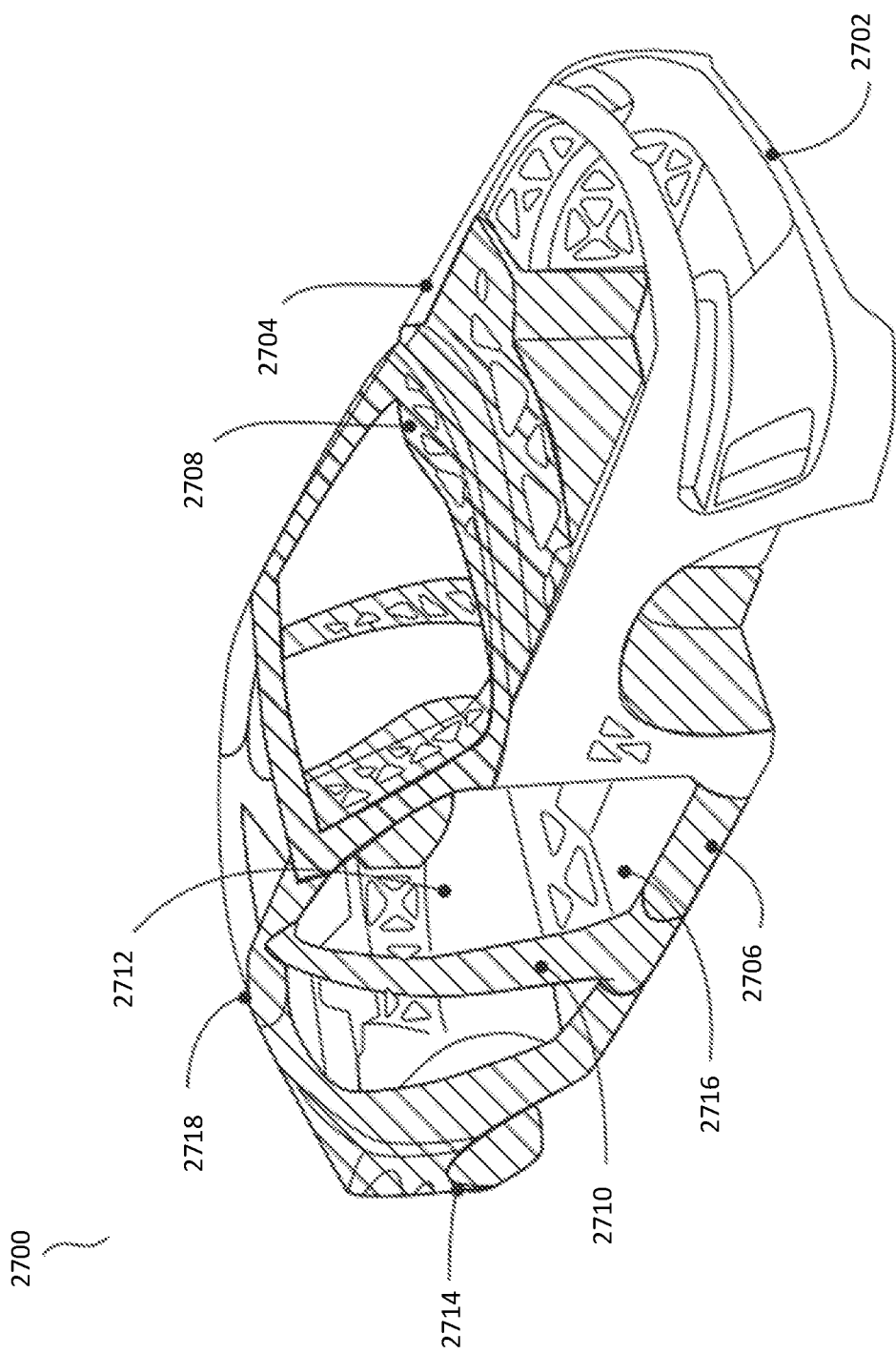
FIG. 27 illustrates a perspective view of a vehicle additively manufactured (AM) in accordance with an aspect of the present disclosure.

FIG. 27 illustrates a perspective view of a vehicle additively manufactured (AM) in accordance with an aspect of the present disclosure. FIG. 27 depicts an exoskeleton-based frame structure for a vehicle model 2700, in which one exemplary embodiment of a broad AM strategy may be presented. The exoskeleton frame is discussed in greater detail with respect to FIGS. 27 and 28. The exoskeleton frame, and other structures described herein, can be formed of one or more of the alloys described herein. FIG. 27 illustrates that in one exemplary AM embodiment, simple "box" sections of the vehicle may be replaced with extrusions, while large shear panels may be replaced with honeycomb panels. Thus, in the example of FIG. 27, a front clip module 2702 may be identified that incorporates a cooling module, bumper beam, hood latching, lamps, and other components associated with these functions in the general area of the vehicle front. A model of the front clip module 2702 may be designed and stored in a database and its relationship with other modules subsequently examined. An impact structure 2704 may include a one piece wheelhouse, fenders and proximate crash structures. When recording the impact structure 2704 as part of the model, the designer can continue to specify modular relationships for later integration of the vehicular model 2700.

Extrusions 2706 may be used to span areas on the vehicle incorporating simple, straight, constant sections of material. In an embodiment, the extrusions 2706 are 3-D printed. More generally, any of the parts or components that are non-printed may, in other embodiments, be 3-D printed. In addition, dash & windshield frame module 2708 is disclosed. A modular dash & windshield frame module 2708 may ideally identify a single piece dash and windshield aperture for providing optimal structural performance, dimensional accuracy and design flexibility. Thus, in this example, module 2708 may be treated and installed as a single, complex module incorporating the identified dash and frame.

B-Pillar module 2710 may include, for example, a single piece printed box section incorporating a large section of hardware characteristic of that portion of vehicle 2700. For example, B-Pillar module 2710 may include hinges, striker, seat belt mounts, and other equipment associated with the side portion of the frame and the front passenger seat. Rear Floor module 2712 may incorporate printed 'X' members and rear suspension mounts. Similarly, C-Pillar & Rear Quarter module 2714 may embody features similar to B-Pillar module 2706 but for the rear right portion of vehicle 2700 adjacent the wheelhouse. Back light aperture 2718 may frame the back-light and complete the roof structure. For hatchbacks and vans, this feature may become the tailgate aperture, which may incorporate hinges and strikers. It will be appreciated that vehicle 2700 may be partitioned in different ways depending on the ease of integration, dependence of module features on other features, the characteristics and build plate size of the 3-D printer involved in the AM process, and preferences of the programmer.

Because Main Floor module 2716 in this example represents a large planar array area, module 2716 may include, for example, composite honeycomb shear panels which in many embodiments are used for such large planar areas. It should also be noted that, depending on the size of the 3-D printer and corresponding build plate, the exoskeleton-based frame in one exemplary embodiment may be printed in a single rendering. Alternatively, like the other components, the frame may be printed as a series of modules, particularly if the size of the build plate and AM geometry is smaller than the array defined by module 2716.

Exoskeleton vehicles are those whose exterior surfaces provide the needed structure. The exoskeleton is designed to sustain the majority of operational and structural loads on the vehicle and to protect the passengers during a response to an impact event. Like a conventional frame, an exoskeleton frame may include cavities for accommodating an external interface (namely, cavities and other sections for fitting windows and other systems including headlights, HVAC systems, and the like). As described further below, the exoskeleton frame may include custom honeycomb panels or similar reinforcing structures for providing support in the event of an impact. In these embodiments, the vehicle frame rails can be eliminated.

The use of exoskeleton frames also provides the capability to modify the materials in specific areas of the frame to provide further support. For example, to protect occupants in the event of a frontal impact, internal support material within the frame can be made softer to absorb energy. Plastic materials that are 3-D printed using FDM may be used for this purpose.

To meet pedestrian impact requirements and to protect a pedestrian in an impact event, the exoskeleton frame can be composed of structures made to be thinner, weaker, or out of different materials (e.g., plastic) in the relevant regions of the vehicle. For example, the hood, or portions thereof, can be structurally designed to be thinner or weaker, and can be made of plastic parts to enable it to deform upon impact. In regions away from the pedestrian protection zone, these characteristics may be unnecessary and the frame can consequently be made stronger.

In an embodiment, a section of the panel can be made to deform or crush in a vertical direction or other direction maximizing pedestrian protection, wherein that same section can be made much stronger in a longitudinal direction. Composites having directional strength properties, such as carbon fiber, may be suitable for this purpose.

FIG. 28 illustrates a side view of a vehicle additively manufactured with an exoskeleton frame and having a transparent and cutaway portions for revealing internal structure in accordance with an aspect of the present disclosure.

FIG. 28 illustrates a side view of a vehicle 2800 additively manufactured with an exoskeleton frame and having transparent and cutaway portions for revealing frame structure. Using AM, the vehicle can be designed like the fuselage of an aircraft. That is, the exoskeleton frame 2814 can be constructed with a smooth exterior to account for superior dynamic performance on the A-side. By contrast, the structure and ribs of the exoskeleton frame would be arranged on an interior B-side. FIG. 28 also shows that the front and rear interior space 2806, 2808 of the vehicle can be may be made along the line 2804 using the exoskeleton frame. This additional length 2804 is due to the strength of the exoskeleton frame and its ability to handle operational loads and random forces.

Additionally, while printing exoskeleton based transports, free spaces can be printed that include matrix arrays filled with lattices. This configuration provides both structural support and weight savings.

FIG. 29 illustrates a side-sectional view of a contoured sandwich panel from the exoskeleton frame of the vehicle of FIG. 28 in an aspect of the present disclosure.

FIG. 29 illustrates a side-sectional view of a contoured sandwich panel 2902 from the exoskeleton frame 2802 of the vehicle of FIG. 28. It should be noted that the cutaway section 2810 of the exoskeleton vehicle has a skin with similar properties. More specifically, cutaway section 2810 can be seen to include an inner and outer skin as well as a lattice structure interspersed therebetween.

Referring back to FIG. 29, sandwich panel 2902 includes an outer skin of the vehicle composed of cross-sectional layer 2906 and an inner skin composed of material 2908. These two layers may include a honeycomb/lattice structure 2904 between them that in one embodiment covers the entire area of the transport. Generally, the distributed strength of sandwich panel 2902 obviates the need in various embodiments for frame rails on the vehicle such as front and rear bumpers.

Further, another advantage as indicated herein of this strong skin disposed about the periphery of the transport is that the wheelbase distance 2804 (FIG. 28) can be generally made longer. Generally, in these exemplary embodiments, the skin (i.e., the exoskeleton) bears all the load by virtue of the ability to use the custom-formed honeycomb panel. As a result, in some embodiments, frame rails may be altogether eliminated.

In one exemplary embodiment of FIG. 28, exoskeleton vehicles may have one or more coatings sprayed over the surface to protect and impart a degree of smoothness to the surface. In an embodiment, FDM, or another AM technique, can be used for this purpose. This procedure may be in lieu of attaching outer panels around the surface of the exoskeleton frame and enables significant weight savings. In regions of the vehicle where surface roughness is a requirement, such as in heat transfer applications in which an increased surface area may be used to dissipate heat, these features can simply be represented in the input model for the module and AM can easily integrate such features into the exoskeleton to impart the desired roughness to the surface. Stated differently, the use of AM according to this embodiment obviates the need to perform a post-processing step to impart surface roughness to the exoskeleton frame.

With reference again to FIG. 29, monocoque carbon fiber frames are sometimes used in which dual sheets of carbon are arranged with a honeycomb of paper in between. This skin configuration, however, is expensive as well as labor intensive. In particular, the skin is produced not by AM but rather it is laid up with a tool and vacuum bagged. This configuration, moreover, is inferior in terms of energy absorption capability when compared to metal. For these reasons, in an exemplary embodiment, the skin 2902 of the exoskeleton frame is a 3-D printed metal, and in view of its excellent predisposition to absorbing energy, the metal skin 2902 is configured to absorb a significant majority of the energy from accidents or rough riding scenarios, if not the entire load. The skin 2902 in alternative embodiments may be composed of plastic materials, composite materials, or a combination of different materials. For example, in embodiments involving lower total operational loads and/or collisional risks, carbon fiber or other composites may be substituted in place of the aluminum loads.

As discussed herein, the exoskeleton frame may be designed to deform or give way when impacted. For example, in an impact on the hood from above, the internal lattice structure may be configured to collapse. Conversely, when struck in a longitudinal direction in a forward vehicle impact, the frame may be designed to absorb the energy and maintain its structural integrity.

It should also be noted that, while the honeycomb or lattice structure sandwiched between the two layers provides additional reinforcing support without imposing dramatic increases in mass, in some embodiments the honeycomb structure may be omitted in certain regions. That is, honeycomb/lattice supporting structure can in some cases be omitted from certain regions of the vehicle in specific embodiments.

The benefits of using AM in the context of the examples herein include the absence of any need for custom tooling or a factory footprint. AM makes it possible to print multiple types of vehicles or transports using a single 3-D printer. Ideally, the particular 3-D printer chosen would only need a sufficient printing resolution to enable printing of Class-A surfaces directly without the need for post-printing operations. AM technologies with high resolutions make it possible to print parts with extremely complex geometries, yet with smooth surfaces on the Class-A side.

Subject to the possible exceptions herein, in the vehicle embodiments directed to the exoskeleton structure, the main structure of the vehicle is additively manufactured in the form of honeycomb panels over substantially the entire surface of the transport. These panels in turn handle the road loads associated with driving as well as the impact loads from a collision.

In another exemplary embodiment, the walls of the transport are carefully and methodically arranged to incorporate more efficient structure (e.g., structures having lighter weight and using fewer materials) where it is needed and conversely, to incorporate strength in other areas where strength is paramount.

Figure 30:
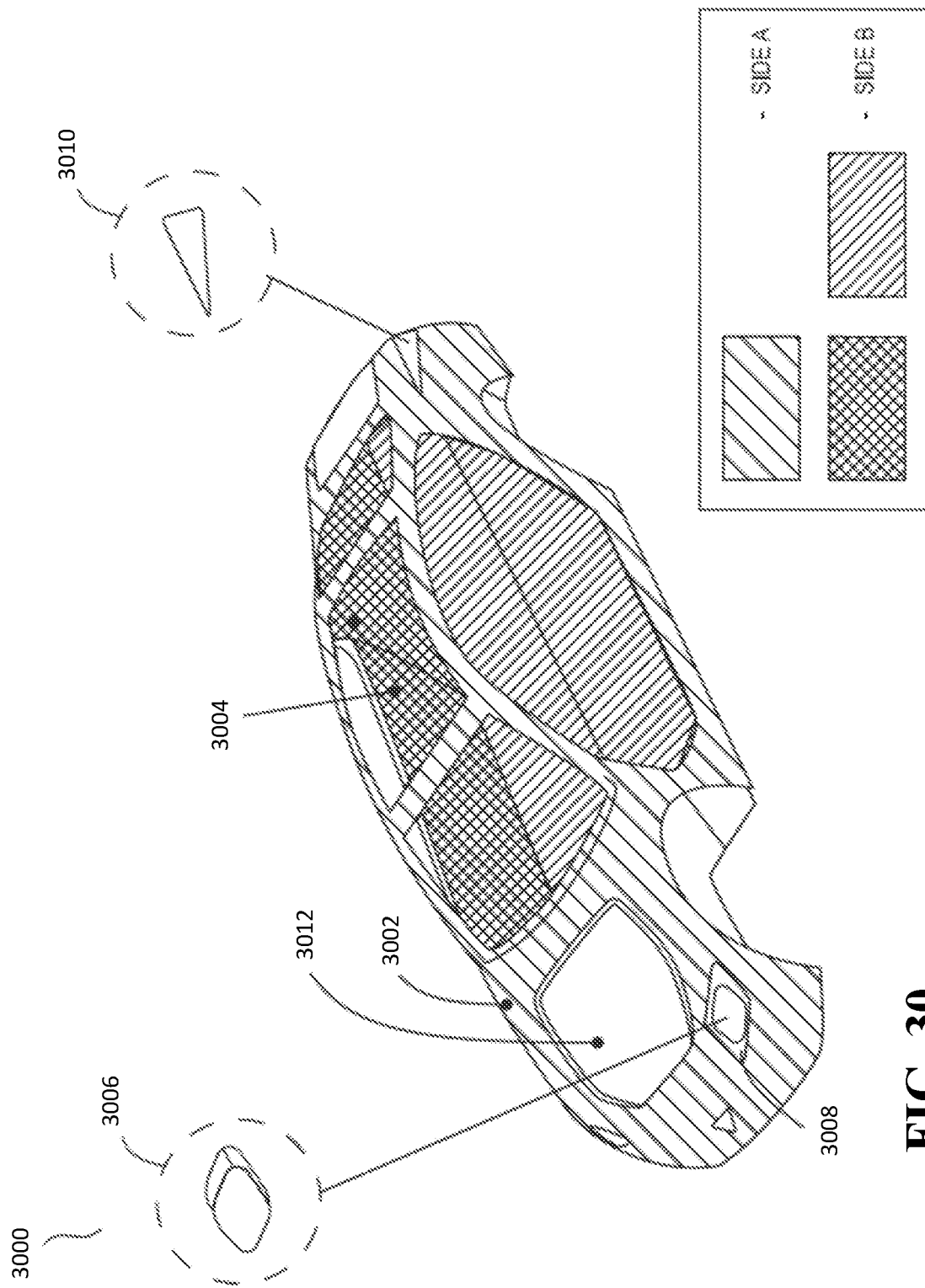
FIG. 30 illustrates a perspective view of an AM frame having cavities for mounting components having an external interface in an aspect of the present disclosure.

FIG. 30 illustrates a perspective view of an AM frame having cavities for mounting components having an external interface in an aspect of the present disclosure.

FIGS. 30-32 illustrate various embodiments of an exoskeleton based vehicle. Referring to FIG. 30, the exoskeleton frame 3000 includes an aircraft style exterior shell 3002. Because the frame 3000 is equipped to be modular with a plurality of autonomous regions, it tends to avoid being crushed and avoids all out crashes where a significant portion of the frame 3000 would be destroyed. In addition, while the external Class-A side exhibits smoothness, structure can reside on the B surface. The entire vehicle, including frame 3000, can be 3-D printed with apertures to receive headlights 3006, tail-lights 3010, and HVAC systems. Brackets can also be inserted into aperture 3008 for connecting to the headlights 3006 housed in aperture 3008. A hood can be housed in aperture 3012. The lights and other vehicle systems can themselves be 3-D printed, and would be configured to fit into these openings to ensure excellent aerodynamic characteristics with aesthetic appeal. Using the modular layout technique, various vehicular systems could simply be integrated at specific connection points. In other exemplary embodiments, electric circuits can also be printed into the exoskeleton frame 3000, thereby resulting in the vehicle base being in a solid state and eliminating the need for complex and cumbersome wiring/harness mounting strategies associated with conventional manufacturing.

FIG. 31 illustrates another perspective view of an AM frame in accordance with an aspect of the present disclosure.

The frame 3100 of FIG. 31 shows a similar embodiment, showing that the structure 3104 can include ribs and lattice structures on the B surface (inside the vehicle), while the A surface (outside the vehicle) remains smooth.

FIG. 32 illustrates a side view of an AM vehicle having a structural outer sandwich skin, enabling improved aerodynamics by eliminating the need for external frame rails in accordance with an aspect of the present disclosure.

FIG. 32 shows an integrated vehicular structure made possible through vehicle frame 3200. As can be seen, the integrated structure allows for a maximum opening for the positioning of vehicle occupants. The stronger skin due to a frame reinforced with ribs and lattice structures can, for example, allow for a longer distance 3202 from the front wheels to the back wheels to provide additional room for the occupants.

In another aspect of the disclosure, the AM model of the exoskeleton frame includes a plurality of cavities and apertures for housing components that require a vehicular external interface. These components may be a subset of the overall group of components that are an integral part of the transport and assembled and integrated into the transport. These components may also be configured to be modular as discussed herein, such that damage to one of the components does not reflect a need to repair or replace unrelated component. In one embodiment of exoskeleton-based transports, the rear surface of the vehicle and greenhouse may be exposed. One advantage of using AM to manufacturer such structures is to leverage the flexibility of design and geometry afforded by AM. Panels may thereupon be installed, as part of the AM process or otherwise. Glass may be installed in the greenhouse cavities.

Interior door panels and similar structures in this embodiment would be configured to fit the cavities or sections of the exoskeleton that were 3-D printed. Such cavities can have strategic locations for easy access. Instrument panels, HVAC units, lighting modules and other components for integration can be 3-D printed as well, after which they can be plugged into the matching sections as a straightforward insertion of a known component in an accessible position. As noted herein, one principal advantage of this assembly technique is that it may facilitate straightforward repairs and replacements of modules and systems requiring service.

This procedure is in stark contrast to the challenges of subsystem management present in conventional systems, in which facilitating access to specific subsystems for purposes of installation or repair may not be straightforward. One example of a classic shortcoming in transport structures relates to lighting systems. Conventional transports include instruments and lighting that may be designated to fit into the transport with little, if any, regard to ease of access, meaning for example that other subsystems may present obstacles to the installation, or that the frame is not simply not amenable for easy integration with lighting and other components. The problem may be exacerbated if the various instruments having different functions are combined with one another and/or have unique or difficult external connections.

Oftentimes the sheer amount of time to remove and replace instruments subject to these undesirable locations, painstakingly complex wiring profiles, and other obstacles, is so economically inefficient that practitioners opt instead to replace a much larger portion of adjacent working components to enable an easier repair. In contrast to this not uncommon scenario, AM provides adaptability. That is, by designing an architecture that provides easy access to almost every component in the vehicle, reparability becomes easier and less expensive. Automated transports having a modular layout facilitate easy, almost seamless reparability as compared with conventional vehicles.

Another exemplary embodiment involving AM exoskeleton structures is to specify the model design of a portion of the structure such that the exoskeleton is on the outside and the panel inlays are on the inside. The exoskeleton is sealed in this manner. Significant weight savings may be achieved as exterior panels in this embodiment are eliminated. These transports may have excellent crash absorbing abilities because appropriate crash-absorbing features with ideal geometries may be 3-D printed on the outside of the transport. Such results are incredibly difficult to achieve using conventional manufacturing techniques.

Figure 33:
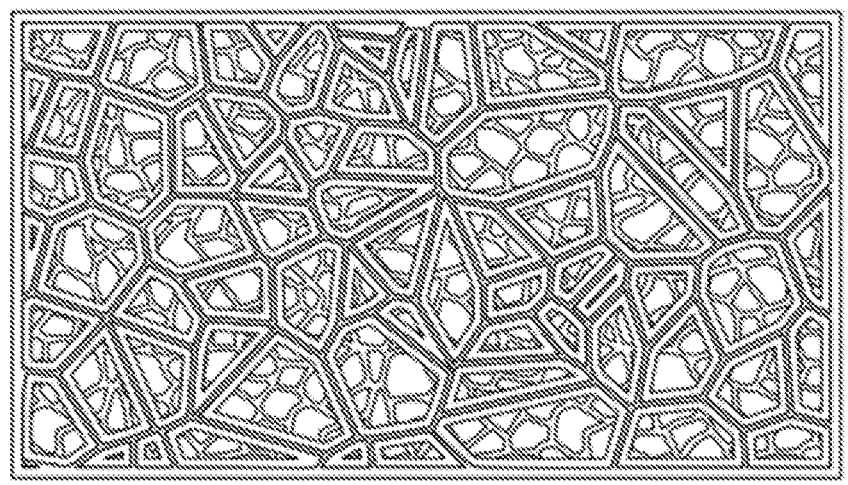
FIG. 33 illustrates panels shaped in Voronoi patterns for assembly with an AM frame of a transport structure in accordance with an aspect of the present disclosure.

FIG. 33 illustrates panels shaped in Voronoi patterns for assembly with an AM frame of a transport structure in accordance with an aspect of the present disclosure.

In another exemplary embodiment, the entire structure can be 3-D printed with interior features based on the model of the 3-D exoskeleton, as before. This time, however, the entire structure can be 3-D printed to accept panels. In one embodiment, the panels can be printed as an integrated structure with the frame. The printed panel sections could resemble Voronoi patterns or other patterned features. An example of a Voronoi pattern 3300 is shown in FIG. 33.

Figure 34:
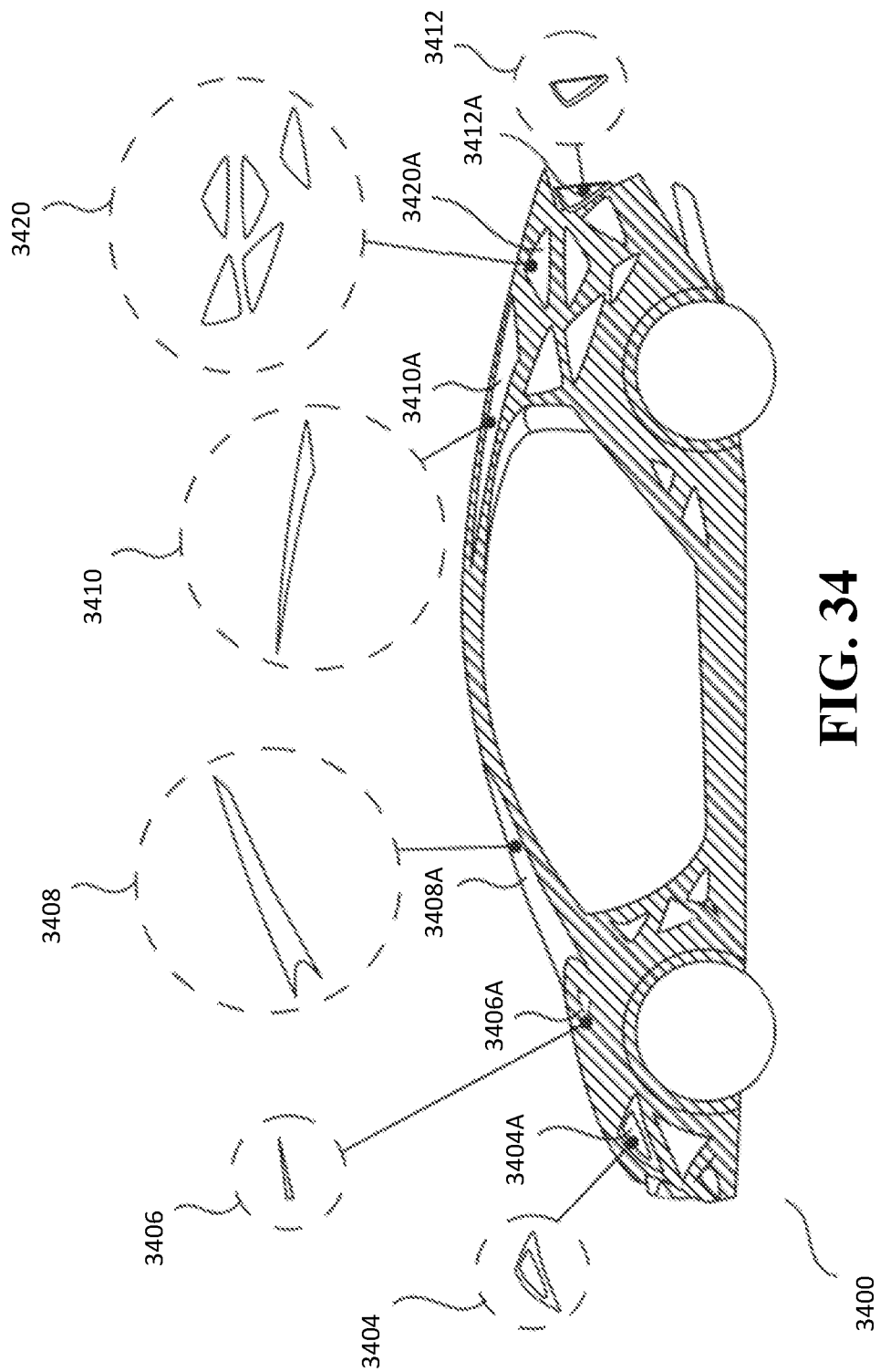
FIG. 34 illustrates a side view of an AM vehicle having crumple zones characterized by a plurality of Voronoi patterns in accordance with an aspect of the present disclosure.

FIG. 34 illustrates a side view of an AM vehicle having crumple zones characterized by a plurality of Voronoi patterns in accordance with an aspect of the present disclosure.

FIG. 34 illustrates a side view of an AM vehicle 3400 having crumple zones 3420a characterized by a plurality of Voronoi patterns 3420. The Voronoi pattern, or similar patterns on the transport, can reduce the weight by eliminating solid structures when they are unnecessary, while concurrently improving the structural integrity of the material. These patterns can provide additional reinforcement against impact by serving as discrete crumple zones. Vehicle 3400 represents a printed exterior frame including a plurality of apertures and cavities for serving various purposes. Upon rendering of the exoskeleton frame 3400, a plurality of appropriately-sized 3-D printed components (or in some cases, commercial off the shelf (COTS) parts) are integrated with frame 3400 to form the substantially finished vehicle. Headlamp 3404, windshield wiper 3406, windshield 3408, rear windshield 3410 and tail lamp 3412 may be inserted into their respective cavities 3404a, 3406a, 3408a, 3410a, and 3412a and secured via any suitable attachment means (such as adhesive, bolts, thermal fusion, etc.). The Voronoi pattern of 3-D printed plastic sheets or panels are then fused to their respective cavities 3420a.

It should be noted in FIG. 34 that to avoid unduly obscuring the concepts of the present disclosure, certain steps have been omitted concerning the assembly of the vehicle. One such set of steps is the assembly of the vehicle 3400 from its basic frame. A comprehensive assembly process ensures that all relevant parts of a plurality of parts are incorporated into the vehicle and functioning normally. These include internal combustion engine, electric motor(s), all electronics, fluid compartments, battery, suspension system, wheel system, spark plugs, braking systems, accelerator, all relevant dash components and a number of other components and subsystems. In an exemplary embodiment, many or most of these parts are additively manufactured. Other sets include the panoply of quality control tests and functional tests to which the vehicle would be subject. A number of steps have been omitted, however, to avoid unnecessarily obscuring the underlying concepts of the disclosure.

In other embodiments, the 3-D printing of the frame, the construction of the mobile transports for moving parts, people and robots to and from the various assembly cells, and the construction of modular components is performed by automated constructors armed with instructions to build the vehicle seamlessly.

The present disclosure addresses key obstacles and provides solutions for a various shortcomings in the art. One such obstacle includes the viability of additively manufacturing a vehicle frame and the limitations on the current sizes of available built plates and 3-D platform geometries for printing. One of multiple solutions to this problem is to include the frame itself as one of the modular subsystems and to reconnect the frame into one cohesive unit after multiple renderings of the individual segments of the frame. The modular design may present easier reparability options for the consumer. As build plates and printer profiles evolve to match or exceed the size of such transports, the manufacturer has the option to decide to maintain modularity of the frame. In some embodiments, the frame can be printed in a single rendering with built in indentations or connections to maintain modularity.

Figure 35:
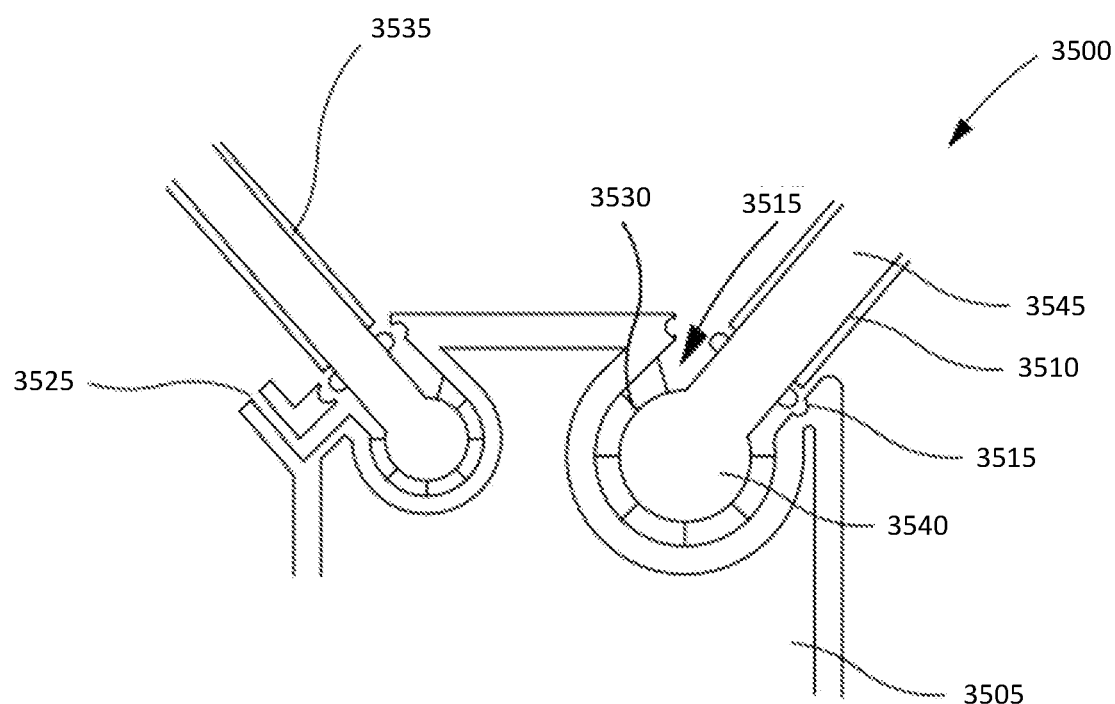
FIG. 35 illustrates an embodiment of an apparatus comprising a joined node and component in accordance with an aspect of the present disclosure.

FIG. 35 illustrates an embodiment of an apparatus comprising a joined node and component in accordance with an aspect of the present disclosure. The joined node and component, and any structure described herein, can be formed of one or more of the alloys described herein. The apparatus 3500 includes a node 3505, an interconnect 3510, a socket 3515, an injection port 3525, support structure 3530, and a tube 3535. The interconnect 3510 comprises head 3540 at the proximal end and a shaft 3545 at the distal end.

The node 3505 and the interconnect 3510 are co-printed, or additively manufactured together during the same printing process. For instance, the interconnect 3510 and the node 3505 may be designed in a Computer Aided Design (CAD) file that is transferred to a 3-D printing device. The 3-D printer may then process the file and initiate a print process based on the file. The node/interconnect structure may then be printed during the same print process.

During the printing process, support structure 3530 may also be co-printed to hold the interconnect 3510 and node 3505 together in the socket 3515. Support structure 3530 may comprise thin spokes and/or protrusions that are configured to break apart so that the interconnect 3510 is then free to move around in a rotational and/or linear manner depending on the configuration of the socket 3515. The support structure 3530 may also be used to confine the movement of the interconnect 3510. For instance, protrusions may be used to confine the angular rotation of the interconnect 3510 to be within a specific range.

As shown, the head 3540 may be spherical in shape. Additionally, the head 3540 is arranged with the socket 3515 to form a joint. The joint may be a rotating or linear joint. The interconnect 3510 is configured to connect the node 3510 to a component. In some embodiments of the apparatus, the component may be a tube such as the tube 3535. The shaft 3545 may be configured to slide into an end portion of the tube 3535. In some embodiments of the apparatus 3500, the distal end of the interconnect 3510 may have an end cap that is configured to slide over an end portion of the tube. An end cap may be a component that has a cylindrical shape like a tube with a slightly larger diameter that is designed to fit over a tube. Although the tube is cylindrical in this example, one having ordinary skill in the art will appreciate that a number of different shapes may be utilized for the tube and/or end cap arrangement such as a multisided polygon, without departing from the scope of the disclosure.

Additively manufacturing parts provides the ability to utilize techniques that are not available in traditional manufacturing processes that typically weld parts and/or components together. For instance, complex structures like the adhesive port 3525 may be printed in the node 3505. The adhesive portion 3525 may include a channel that extends from an exterior surface of the node to the support structure 3530. The adhesive port 3525 is configured to inject an adhesive material into the joint formed by the socket 3515 and head 3540. The adhesive material may be injected when the head 3540 is positioned in such a manner that enables the shaft 3545 to slide into the tube 3535. In some embodiments of the apparatus 3500, the shaft 3545 may be inside of the tube 3535 prior to adhesion injections. In some embodiments of the apparatus, the adhesive material may be a polymer such as an epoxy, resin, or any material that forms a strong bond between the interconnect 3510 and the node 3505. In some embodiments of the apparatus, and as will be discussed with respect to FIG. 41, a second port may also be formed in the additively manufactured node 3505. The second port may be a vacuum port. The vacuum port, in some embodiments of the apparatus, may include a channel extending from an exterior surface of the node 3505 to the socket 3515 for enabling at least a partial vacuum environment during the adhesion process. For instance, the vacuum port may help to pull the adhesive material injected through the adhesive port 3525 through and around the socket 3515 by reducing the air pressure in the socket. This enables the adhesive to be applied to the socket 3515 in a uniform manner free of bubbles or defects. Thus, the structural integrity of the part is maintained after adhesion.

One of ordinary skill in the art will appreciate that the node/interconnect structure described with respect to FIG. 35 is simply an example of a structure that connects a node 3505 to a component such as a tube 3535 and that simple variations to the parts described may be used without departing from the scope of the disclosure.

Figure 36:
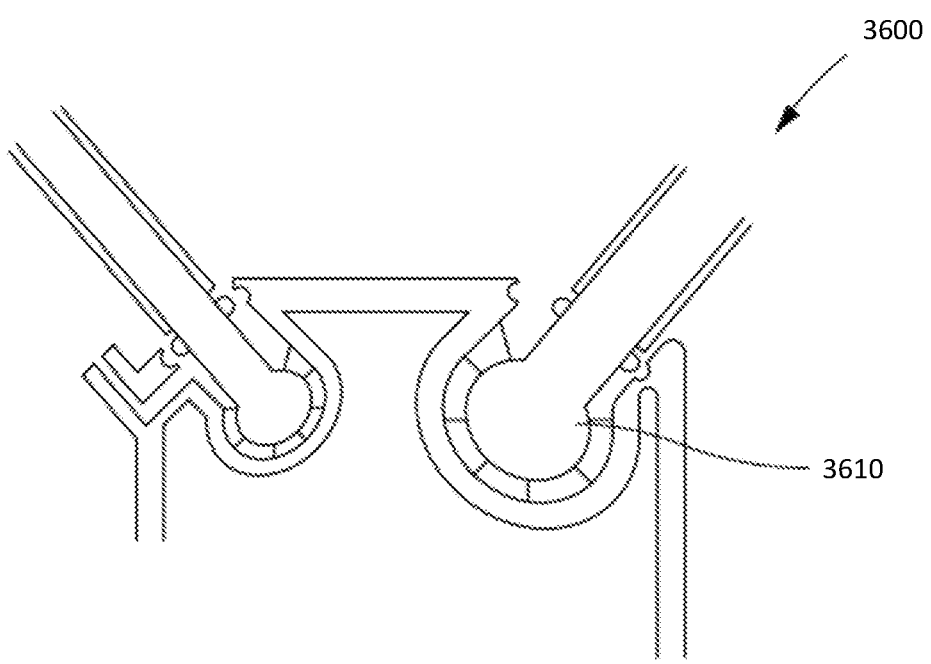
FIG. 36 illustrates an embodiment of an apparatus comprising a joined node and component in accordance with an aspect of the present disclosure.

FIG. 36 illustrates an embodiment of an apparatus comprising a joined node and component in accordance with an aspect of the present disclosure.

For instance, FIG. 36 illustrates an exemplary embodiment of an apparatus 3600 comprising a joined node and component. The apparatus 3600 has many similar features to those discussed with respect to FIG. 35. However, the head 3610 of the interconnect has an ellipsoidal shape rather than the circular shape described with respect to FIG. 35. The ellipsoidal shape may provide a different range of motion for the joint. Thus, the node/interconnect structure can be designed or configured in a variety of different ways to adapt to the manufacturing constraints or needs that may exist when manufacturing a complex mechanical structure. Additionally, one of ordinary skill in the art will appreciate that the illustrated socket and/or head of the node and interconnect, respectively, need not be confined to the spherical or ellipsoidal shapes discussed herein. In fact, any suitable shape that provides the requisite mobility for manufacturing the complex mechanical structure may be utilized without departing from the scope of the disclosure.

Figure 37:
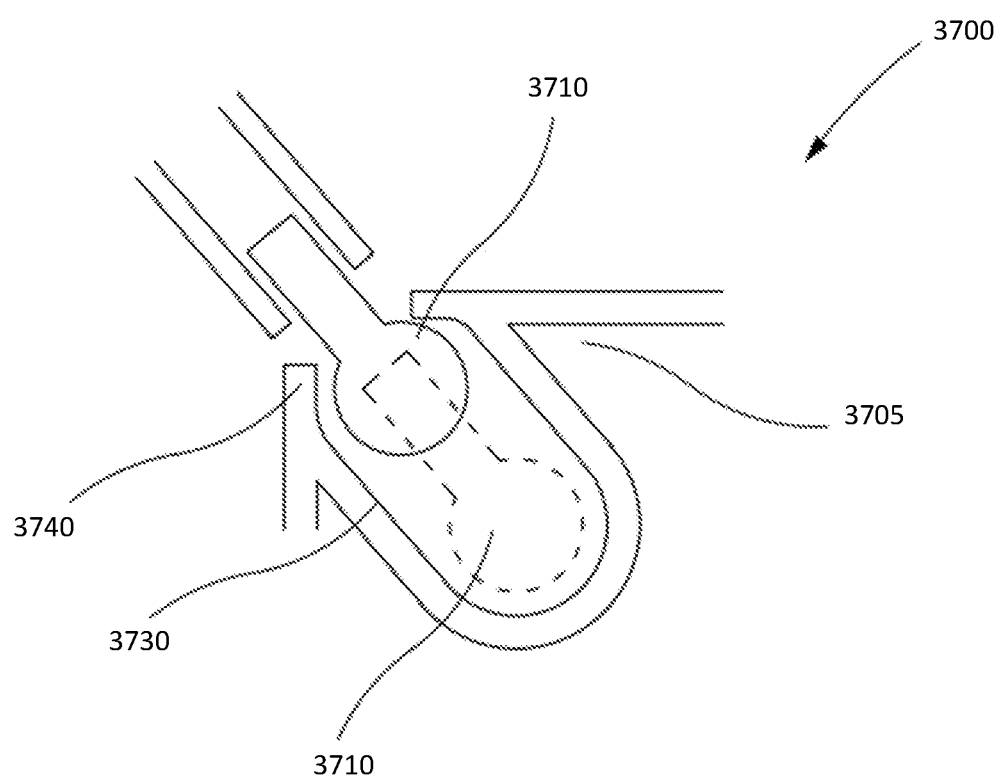
FIG. 37 illustrates an embodiment of an apparatus having a node and component in accordance with an aspect of the present disclosure.

FIG. 37 illustrates an embodiment of an apparatus having a node and component in accordance with an aspect of the present disclosure.

FIG. 37 illustrates an exemplary embodiment of an apparatus 3700 having a node and component. As shown, the apparatus 3700 includes a node 3705, an interconnect head 3710, and a socket 3730, each similar to the node 3505, interconnect head 3540, and support structure 3530, respectively. The interconnect head 3710 and socket 3730, together, forms a joint. The joint is similar to that of FIG. 35. However, it varies in that the interconnect head 3710 is confined by an elongated socket 3730 and opening defined by edge 3740 such that significant linear movement is available, but rotational movement is minimized.

Figure 38:
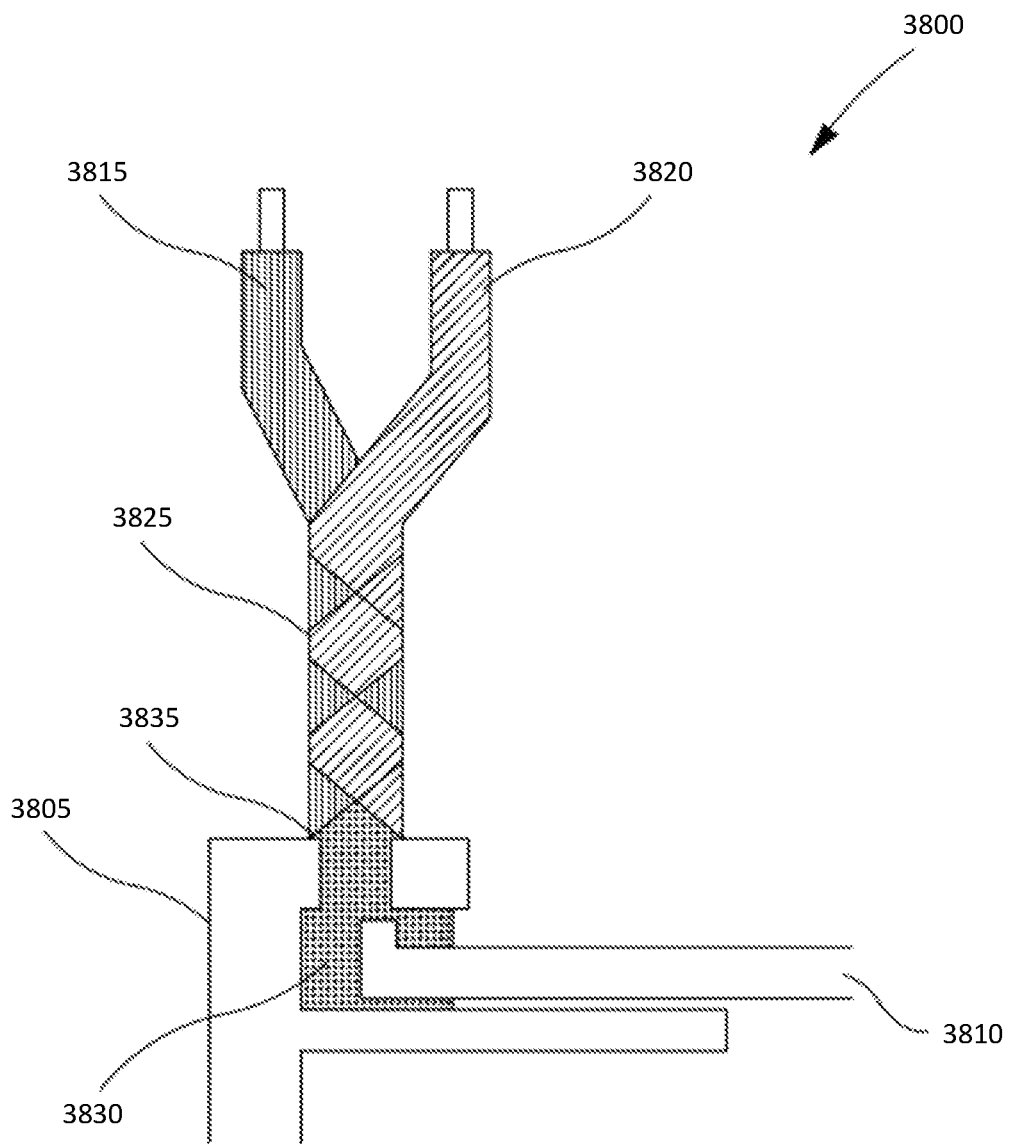
FIG. 38 illustrates a component with a detachable adhesive mixer in accordance with an aspect of the present disclosure.

FIG. 38 illustrates a component with a detachable adhesive mixer in accordance with an aspect of the present disclosure.

In some embodiments of the apparatus, a mixture that forms an adhesive material may be applied. For instance, FIG. 38 illustrates a component 3800 with a detachable adhesive mixer 3825. As shown, the apparatus 3800 includes the detachable adhesive mixer 3825, a node 3805, an interconnect 3810, a first material 3815, a second material 3820, a socket 3830, and injection port 3835. The detachable adhesive mixer may be connected to the adhesive port 3835. A mixture of the first and second materials 3815 and 3820 may be injected into the injection port 3835. The mixture may then fill the socket 3830 such that the interconnect 3810 is adhered to the node 3805 by way of the socket 3830. The detachable adhesive mixer allows for the use of two-part adhesives in the adhesion process.

As discussed herein, additively manufacturing parts provides the capability of printing nodes and/or interconnects in a variety of different shapes. This provides greater customizability to meet a variety of needs when manufacturing a complex mechanical product. Such customizability reduces cost and manufacturing time.

Figure 39:
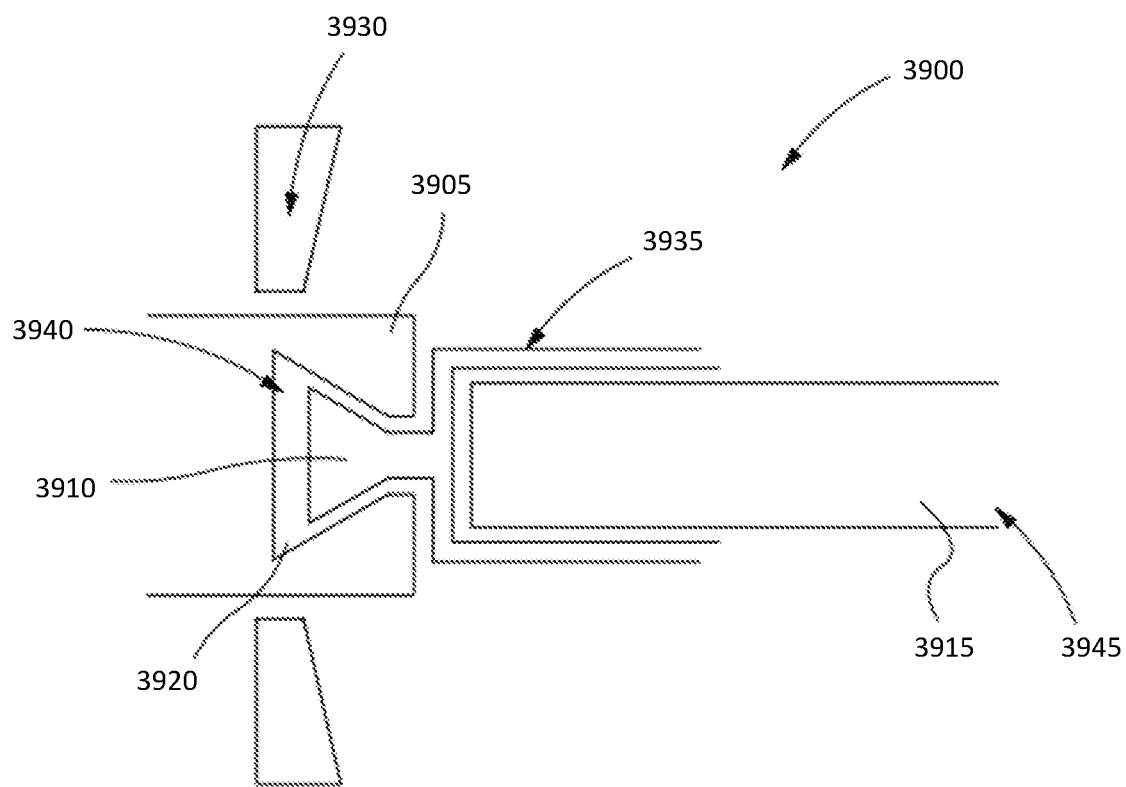
FIG. 39 illustrates an embodiment of an apparatus with a dovetail joint in accordance with an aspect of the present disclosure.

FIG. 39 illustrates an embodiment of an apparatus with a dovetail joint in accordance with an aspect of the present disclosure.

FIG. 39 illustrates an exemplary embodiment of an apparatus 3900 with a dovetail joint. As shown, the apparatus 3900 includes a node 3905, an interconnect 3910, a tube 3915, a socket 3920, and a crimper 3930. The node 3905 includes a distal end 3945 and a proximal end 3940.

As shown, the distal end 3935 of the node 3905 has an end cap configured to slide over an end portion of the tube 3915. The proximal end 3940 of the node 3905 has a dovetail shape. The proximal end 3940 fits into the dovetail shaped socket, such as the socket 3920. The socket 3920 and the proximal end 3940, together, form a dovetail joint.

As discussed with respect to FIG. 35, the apparatus 3900 may also be printed with support structures that may be broken after printing so that the proximal end 3940 of the node 3905 can move around within the socket 3920, similar to that of the head 3540 and socket 3530 of FIG. 35. Also similar, the socket 3920 may be configured to allow the interconnect 3910 to have rotational and/or linear motion. Once the node 3905 distal end 3935 is in place, it is secured via swaging. That is, the node 3905 is deformed by the crimpers 3930 such that the node 3905 is held in place.

Optionally, the apparatus 3900 may also include an injection port and/or vacuum port, as described herein to apply an adhesive to fix the interconnect 3910 in place. The adhesion process may be used in addition to or in lieu of swaging the node 3905.

Figure 40:
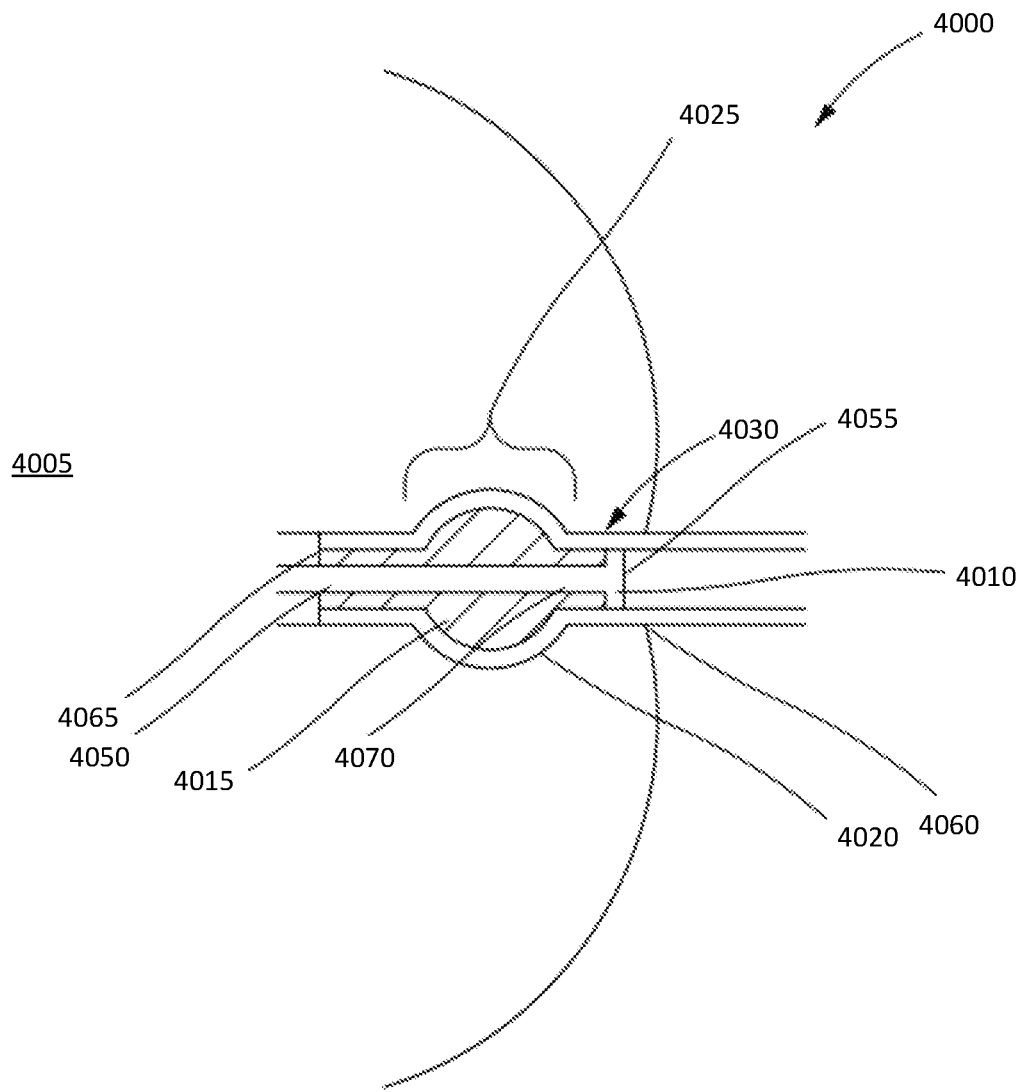
FIG. 40 illustrates an embodiment of an apparatus having a socket with an outward bulge in accordance with an aspect of the present disclosure.

By additively manufacturing parts, a variety of different shapes and configurations can be realized that were not possible with traditional manufacturing techniques for complex mechanical structures. The dovetail joint is one example of a configuration that can be generated by additively manufacturing a node and interconnect. FIG. 40, as will be discussed below, illustrates another example of a node and interconnect that can be generated by additively manufacturing the node and interconnect.

FIG. 40 illustrates an embodiment of an apparatus having a socket with an outward bulge in accordance with an aspect of the present disclosure.

FIG. 40 illustrates an exemplary embodiment of an apparatus 4000 having a socket with an outward bulge. As shown, the apparatus 4000 includes a node 4005, an interconnect 4010, material 4015, and a tube 4020. The node 4005 includes a socket 4030 with a section 4025 having an outward bulge.

In some embodiments of the apparatus, the socket 4030 is substantially cylindrical. The interconnect 4010 includes a shaft 4070 that is connected to an interior surface 4065 of the socket 4030 opposite an opening 4060 of the socket 4030. In some embodiments of the apparatus, the interconnect is a mandrel. Additionally, the interconnect includes head 4055 at the proximal end as well as a distal end 4050. As shown, the head 4055 is extendable beyond the opening of the socket 4030. As described herein, the socket 4030 includes a section 4025 with an outward bulge around a portion of the interconnect shaft 4070.

As shown, an end portion of the tube 4020 is positioned over the interconnect 4010. The end portion of the tube 4020 also includes a section 4025 that has an outward bulge around the shaft 4070 of the interconnect 4010.

The injected material 4015 may be a polymer such as silicone or a hydraulic fluid. As shown, the material 4015 is applied in between the end portion of the tube 4020 and the interior surface 4065 of the socket 4030 and the head 4055 of the interconnect 4010.

In some embodiments of the apparatus, a hydroforming process is utilized to cause the tube 4020 to deform. For the hydroforming process, the material 4015 is a hydroforming material such as silicone that is injected in the tube 4020 after the tube 4020 is inserted in the socket 4030. The injected material in combination with the interconnect 4010 generates pressure within the tube 4020. The pressure causes the tube 4020 to deform by bulging along the portion 4025 of the socket 4030 that has the outward bulge. This deformity forms a mechanical seal between the tube 4020 and the node 4005. At the culmination of the hydroforming process, the material is expelled from the socket 4030 and the tube 4020 is connected to the node 4005.

Figure 41:
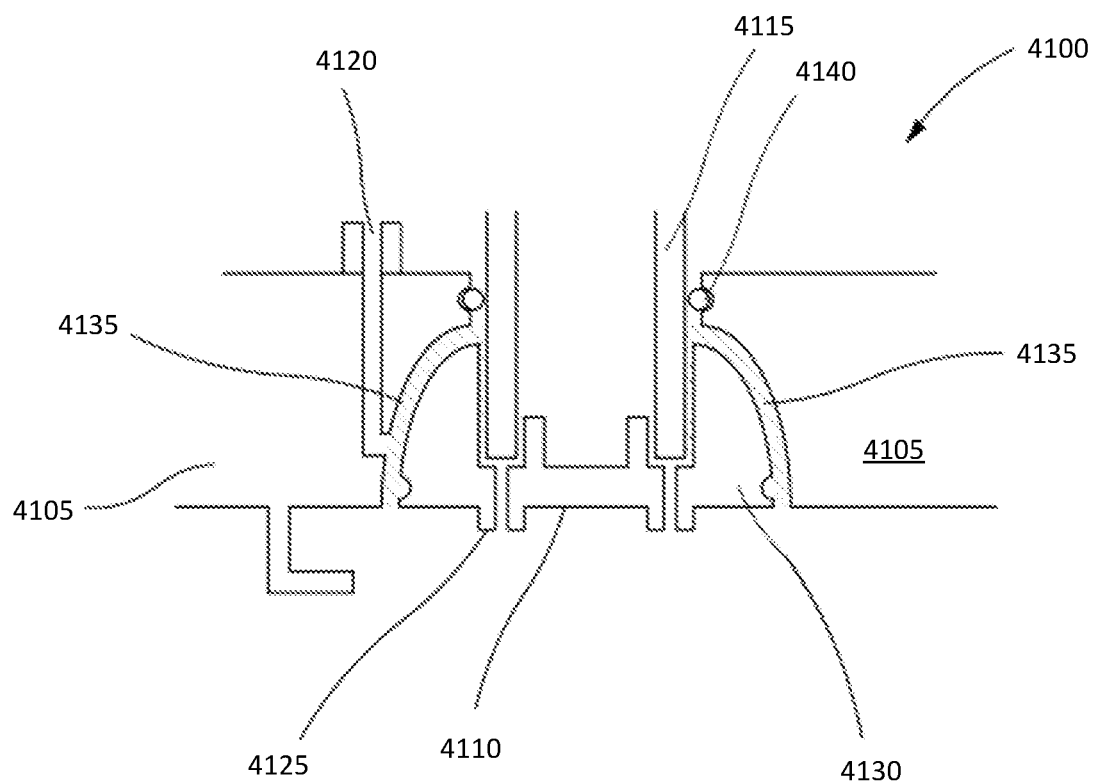
FIG. 41 illustrates an embodiment of an apparatus having a pair of nodes in accordance with an aspect of the present disclosure.

FIG. 41 illustrates an embodiment of an apparatus having a pair of nodes in accordance with an aspect of the present disclosure.

In some embodiments of the apparatus, more than one node may be utilized to connect a component such as a tube.

FIG. 41 illustrates an exemplary embodiment of an apparatus 4100 having a pair of nodes. As shown, the apparatus 4100 includes first and second nodes 4105 and interconnect 4110. The nodes 4105 and interconnect 4110 are co-printed by additive manufacturing. The apparatus 4100 also includes a tube 4115, and injection port 4120, a vacuum port 4125, at least one slide 4130, adhesive material 4135, and screw threads 4140.

As shown, the interconnect 4110 is configured to connect the first and second nodes 4105 to the tube 4115. In some embodiments of the apparatus, the interconnect 4110 comprises an end cap having one or more slides 4130 configured to slide into an end portion of the tube 4115. For instance, the slides 4130 may comprise several semicircular slides configured to slide into an end portion of the tube 4115.

The first and second nodes 4105 may be arranged with the end cap to form a slot through which the tube 4115 slides through to attach the end portion of the tube 4115 to the end cap.

The left-most node 4105 includes the injection port 4120, which includes a channel extending from an exterior surface of the node to the slot for adhesive injection. The node 4105 also includes the vacuum port 4125, which includes a second channel extending from the exterior surface of one of the nodes 4105 to the slot. The injection port 4120 and the vacuum port 4125 cooperatively work to inject and pull the adhesive material 4135 through the slot to hold the slot and tube in place. In some embodiments of the apparatus the vacuum port may enable at least a partial vacuum environment through the slot. Screw threads 4140, in conjunction with threaded screws, may alternatively be used to hold the tubes 4115 in place instead of the adhesive material 4135.

Figure 42:
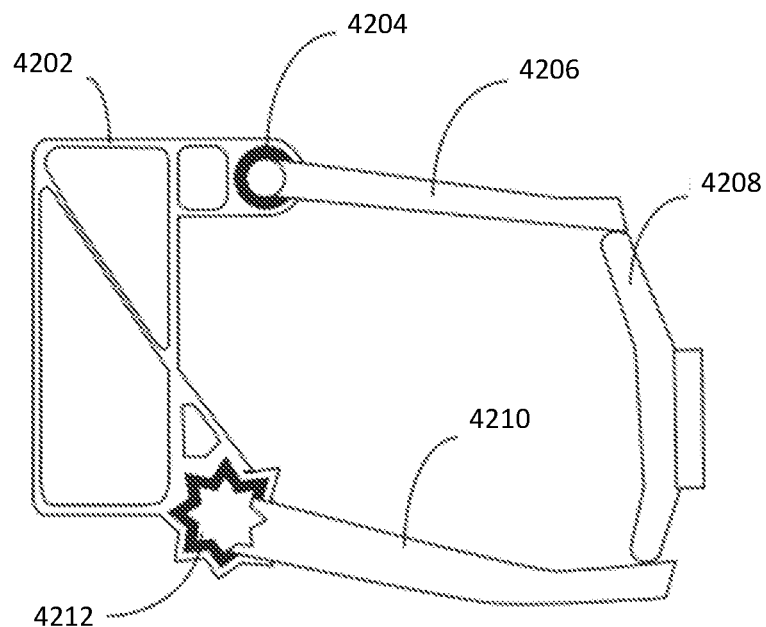
FIG. 42 shows a 3-D printed member including a body structure, upper control arm, lower control arm and other portions of a 3-D printed aluminum assembly in accordance with an aspect of the present disclosure.

FIG. 42 shows a 3-D printed member including a body structure, upper control arm, lower control arm and other portions of a 3-D printed aluminum assembly in accordance with an aspect of the present disclosure. FIG. 42 shows a front view of an exemplary control arm configuration. Referring to FIG. 42, body structure 4202, upper control arm 4206 and lower control arm 4208 all include sections of the 3-D printed aluminum assembly. The body structures, control arms, and all structures described herein can be formed of one or more of the alloys described herein. The upper and lower control arms 4206 and 4210 are connected via upright 4208 on one side. Upper control arm 4206 may be connected on the other side to a polymer bushing 4204. The polymer bushing 4204 may provide positional stability with limited rotation and vibration isolation. Lower control arm 4210 is in this embodiment connected to a larger star-shaped polymer bushing 4212, which may provide positional stability, spring rotation and vibration isolation. The rubber bushing used in elements 4204 and 4212 may be molded in place via injection of molten rubber material into the cavity. In another exemplary embodiment, the rubber/elastomer can be 3-D printed instead. Alternatively, feeder tubes used to inject rubber/elastomer can be 3-D printed with the rest of the structure.

Figure 43:
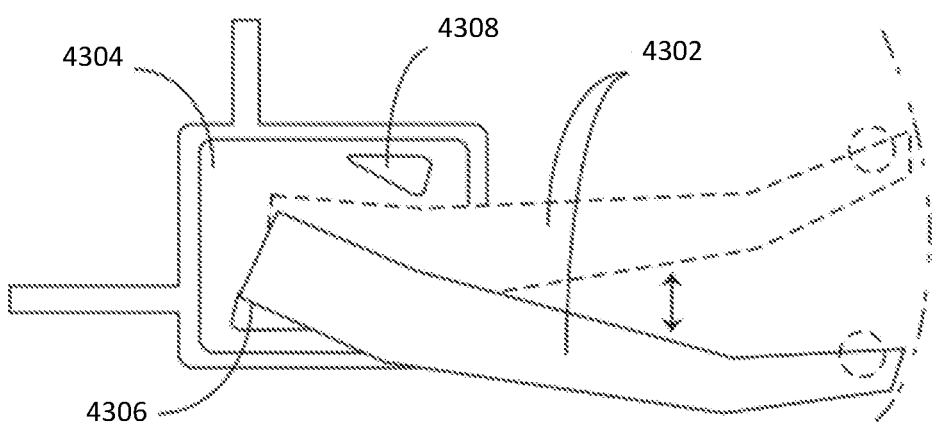
FIG. 43 shows an illustration of control arm moving between two different positions using a geometrically diverse nominal gap to effect different physical characteristics in accordance with an aspect of the present disclosure.

FIG. 43 shows an illustration of control arm moving between two different positions using a geometrically diverse nominal gap to effect different physical characteristics in accordance with an aspect of the present disclosure.

FIG. 43 shows an illustration of control arm 4302 rotating between two different positions using a geometrically diverse nominal gap in an exemplary embodiment. The composition of the area defined by element 4304 includes the rubber/elastomer material. As shown by the rectangular shape of element 4304, shapes may generally vary to affect spring and rotation characteristics. In addition, components 4306 and 4308 may constitute fluid or gas filled cavities which may be incorporated into the rubber/elastomer material to affect spring rate.

Another example of 3-D co-printing includes printing the housing for the electric motor with the control arm. Co-printing these components can enable the design of superior propulsion systems for vehicles, which are only possible through AM. The electric motor can also be mounted on the center of mass of the control arm, as shown with reference to FIG. 43.

Figure 44:
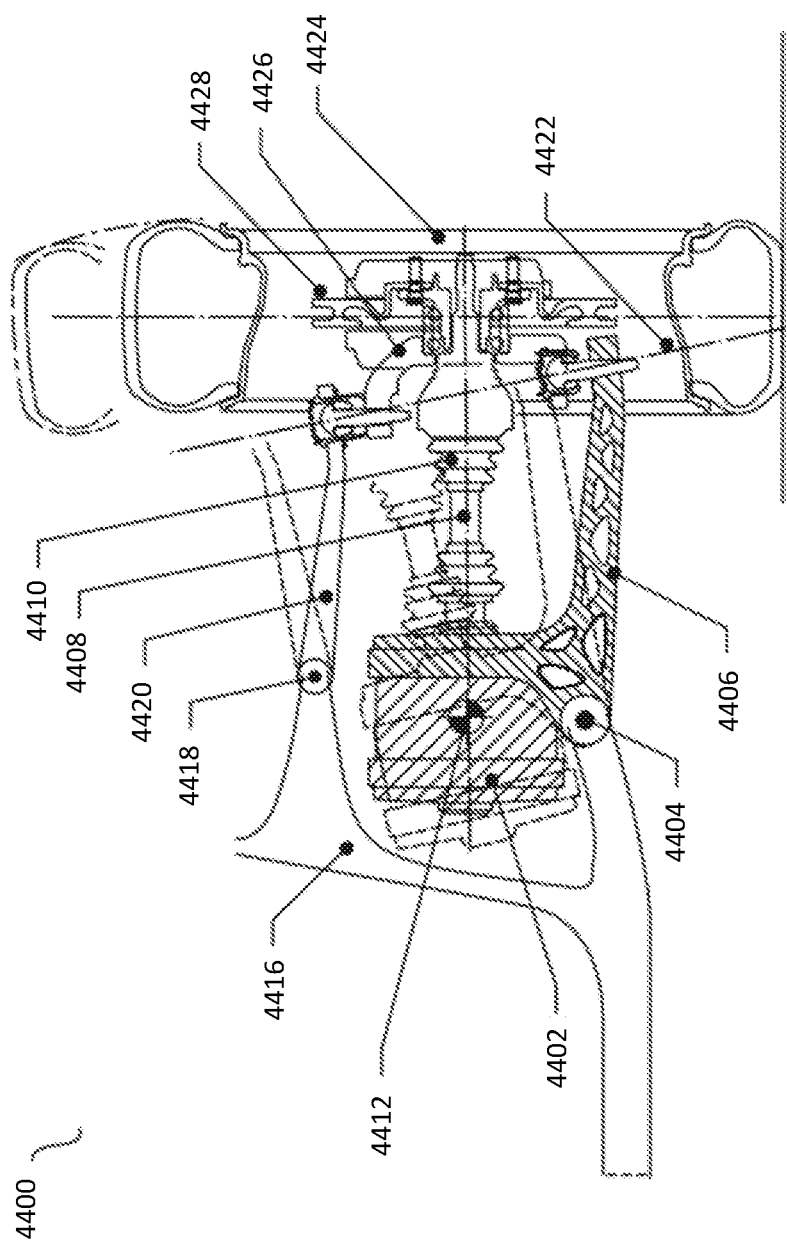
FIG. 44 illustrates a short long arm (SLA) suspension geometry with an electric motor mounted to the lower control arm at the pivot axis in accordance with an aspect of the present disclosure.

FIG. 44 illustrates a short long arm (SLA) suspension geometry with an electric motor mounted to the lower control arm at the pivot axis in accordance with an aspect of the present disclosure.

FIG. 44 illustrates a short long arm (SLA) suspension geometry 4400 with an electric motor 4402 mounted to the lower control arm 4406 at the pivot axis 4404. Conventionally, in electric powered vehicles, the motors are often located at the center of the front or rear axles. In some cases, the motors are incorporated into the wheel hubs. In the example of FIG. 44, the electric motor 4402 is mounted close to the lower control arm pivot 4404 and rocks with the suspension system as it travels into jounce and rebound. Although there is some inertia involved, the increase in unsprung mass is minimal as compared to a hub motor because the motor travel is minimized. A key advantage to this concept, therefore, is that it provides package efficiency without negatively affecting vehicle handling. The motor 4402 is connected to the drive wheel hub via a short drive shaft 4408 with constant velocity (CV) joints 4410 to accommodate any angular changes between the wheel hub and the control arm/motor. The motor housing can be additively manufactured together with the lower control arm 4406 to create a full optimized housing. The motor housing may include the features discussed herein as well as the motor's center of mass 4412, the vehicle structure/suspension cradle 4416, the upper pivot 4418, the upper control arm 4420, the steering axis 4422, control arm 4424, upright 4426, and brake rotor 4428.

Figure 45:
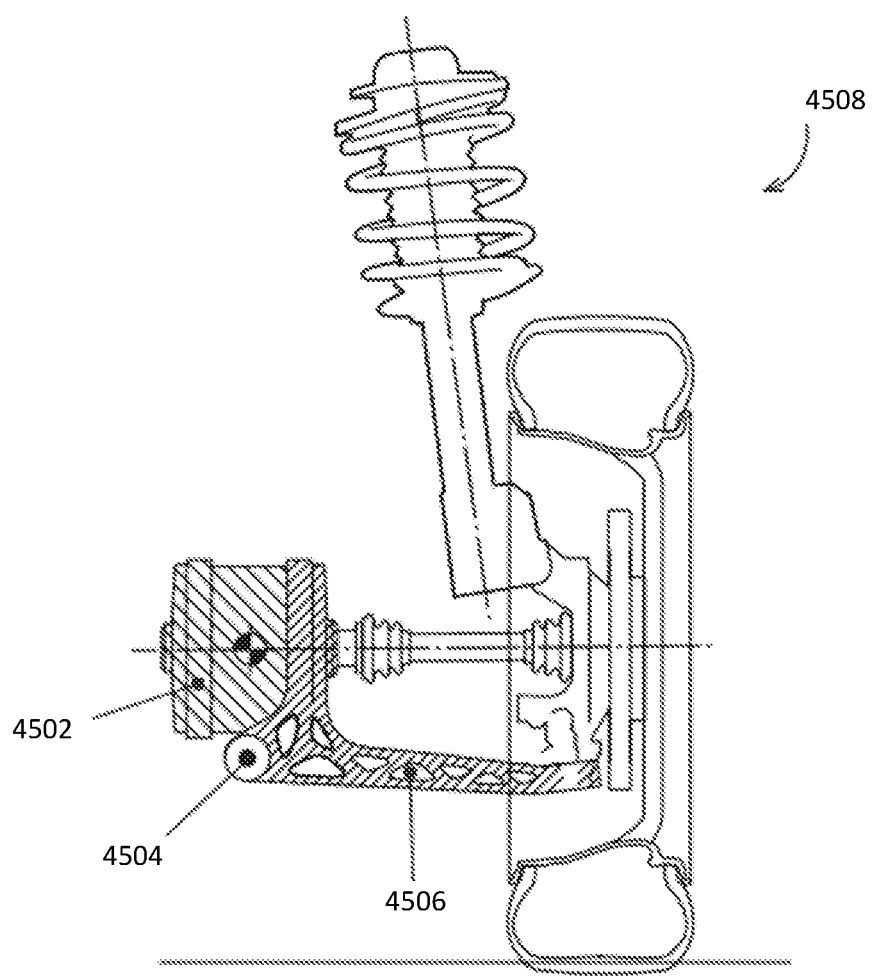
FIG. 45 illustrates an example of a McPherson strut type suspension coupled to an electric motor mounted to the lower control arm at a pivot point in accordance with an aspect of the present disclosure.

FIG. 45 illustrates an example of a McPherson strut type suspension coupled to an electric motor mounted to the lower control arm at a pivot point in accordance with an aspect of the present disclosure.

FIG. 45 illustrates a McPherson strut type suspension 4508 with an electric motor 4502 mounted to the lower control arm 4506 at the pivot axis 4504. It should be noted that this control arm mounted motor system will work with any suspension system in which the control arm pivot is perpendicular to the wheel rotation axis. In an exemplary embodiment, one or more of these parts may be additively manufactured an included as a modular component in the vehicle frame.

Figure 46A:
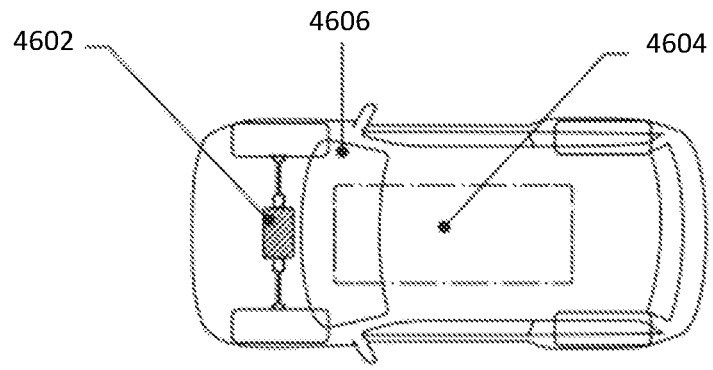
FIGS. 46A-C illustrate different embodiments of a vehicle with the electric motor mounted in different configurations in accordance with an aspect of the present disclosure.
Figure 46B:
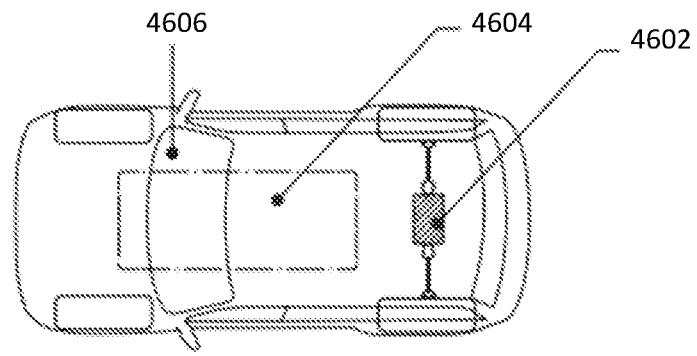
Figure 46C:
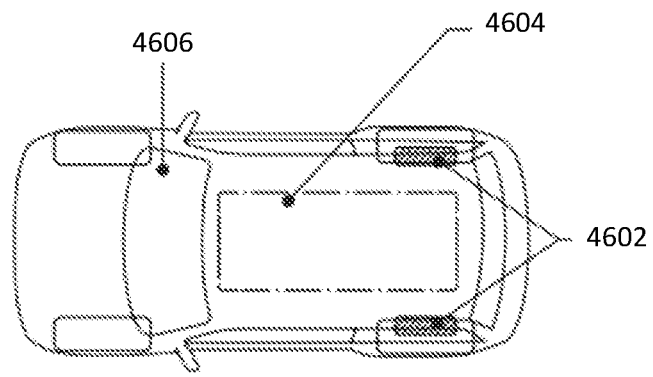

FIGS. 46A-C illustrate different embodiments of a vehicle with the electric motor mounted in different configurations in accordance with an aspect of the present disclosure.

FIGS. 46A-C illustrate different embodiments of a vehicle with the electric motor mounted in different configurations. In FIG. 46A, the electric motor 4602 is mounted at the center of the front axle in the front crush space. In FIG. 46B, the electric motor 4602 is mounted at the center of the rear axle in the rear cargo area. In the case of FIGS. 46A and 46B, the motors occupy valuable cargo or seating space and because the motors do not crush under impact, they also require additional crush space to added to the front (FIG. 46A) or rear (FIG. 46B) of the vehicle. FIG. 46C represents an embodiment where the hub electric motors 4602 are mounted efficiently at the rear wheel, but they add unsprung mass to the wheel, which may have a negative effect on the wheel's handling. For FIGS. 46A-C, the battery pack and electrical components are placed in area 4604, and the windshield is shown as 4606.

In another exemplary embodiment, interface centers can be provided at predetermined regions of the vehicle while being manufactured. These regions can serve as joints between two or more sections of the vehicle that fail during a crash. The repairs on the vehicle are effected simply by removing the damaged section and 3-D printing a new one with the remaining part of the vehicle. This approach is in contrast to the conventional approach where not only the damaged structure is replaced, but the surrounding parts as well. This novel approach also makes recycling of damaged parts much easier.

Figure 47:
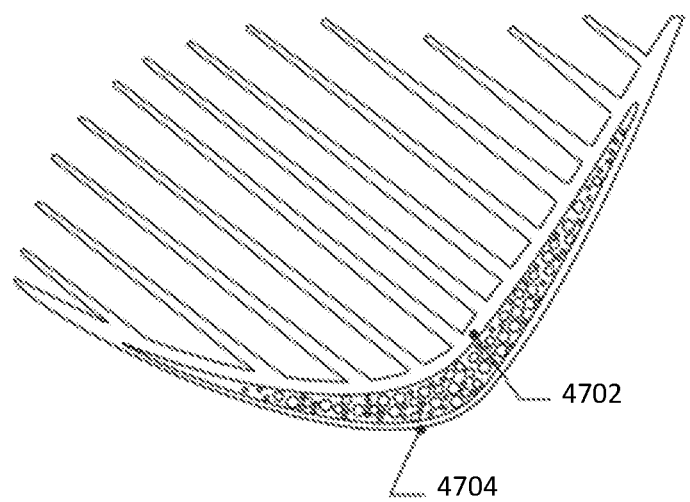
FIG. 47 show an additively manufactured structural interior trim for head impact protection in accordance with an aspect of the present disclosure.

FIG. 47 show an additively manufactured structural interior trim for head impact protection in accordance with an aspect of the present disclosure.

Interior structural components can be produced through AM using modular techniques. For example, FIG. 47 shows an AM structural interior trim that can be added in places where head impact protection is required. The trim may be supported by rigid structure 4702 from where the prongs of the trim emanate. By contrast, element 4704 may be placed adjacent the likely position of the head of an occupant when an impact occurs. Element 4704 may be head injury criterion (HIC) compliant.

Figure 48:
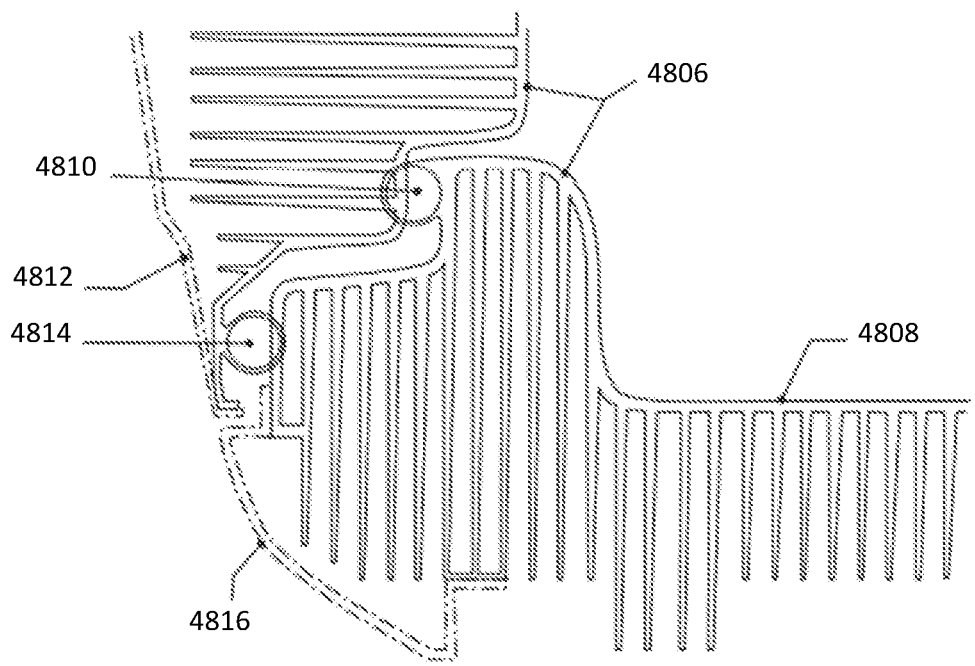
FIG. 48 shows an additively manufactured structural interior trim with exterior panels added for aerodynamics, aesthetics and pedestrian protection in accordance with an aspect of the present disclosure.

FIG. 48 shows an additively manufactured structural interior trim with exterior panels added for aerodynamics, aesthetics and pedestrian protection in accordance with an aspect of the present disclosure.

FIG. 48 shows an additively manufactured structural interior trim with exterior panels added for aerodynamics, aesthetics and pedestrian protection. The trim in one embodiment includes a single piece "cage". The trim may include structural interior panels 4806 for the door, sill and floor. The trim further includes a floor 4808. Seals 4810 and 4814 may be used to seal the interior structural panels 4806 to the floor 4808. The interior trim may be bordered by exterior sill panel 4816 and exterior door panel 4812, which may be part of a separate component set from the single-piece interior trim.

Instrument panels and firewalls constitute some of the most complex areas of a vehicle. Typical dash structures have numerous parts and require complex fixturing. Using AM and modular designs, the dash can be optimized to reduce total part count and lower fixturing needs. Moreover, AM can enable lightweight yet durable materials to be 3-D printed, which may result in significant cost savings. Among other advantages, this approach can create significant opportunities for OEMs to increase production of diverse dash assemblies and to enable the OEM to produce multiple variations of the assemblies while reducing capital expenditure.

In an aspect of the disclosure, a 3-D printed mega dash is disclosed. The 3-D printed mega-dash according to an exemplary embodiment may replace numerous individual stampings such as the dash, upper and lower cowl, strut towers, upper load path beams, and cowl sides. A pillar lowers outers, hinges, reinforcements and brackets. Further, the 3-D printed mega dash concept can easily be implemented into a traditional Body-in-White (BIW) build strategy.

Figure 49:
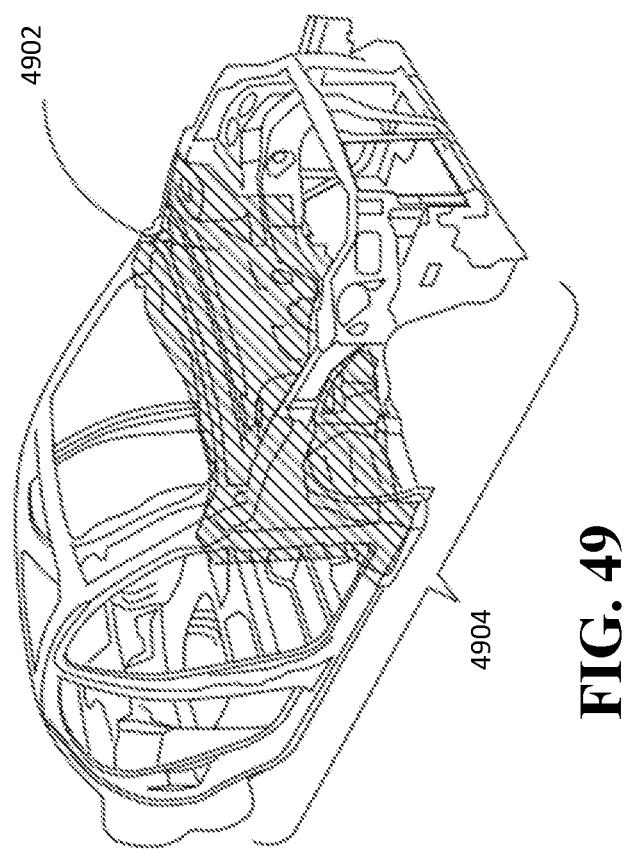
FIG. 49 is a perspective overview of an additively manufactured dash assembled into a vehicle frame in accordance with an aspect of the present disclosure.

FIG. 49 is a perspective overview of an additively manufactured dash assembled into a vehicle frame in accordance with an aspect of the present disclosure.

FIG. 49 is a perspective overview of an additively manufactured mega-dash 4902 assembled into a vehicle frame 4904. As can be seen, the dash 4902 can be co-printed with the frame or it can be 3-D printed and added to the frame afterwards.

Currently, the dash assemblies include significant flexibility, and are at the heart of any platform-derivative strategy. The dimensional range of derivative vehicles using alternative dashboards is currently severely restricted in view of the massive investment in tooling, fixturing, and real estate.

Figure 50:
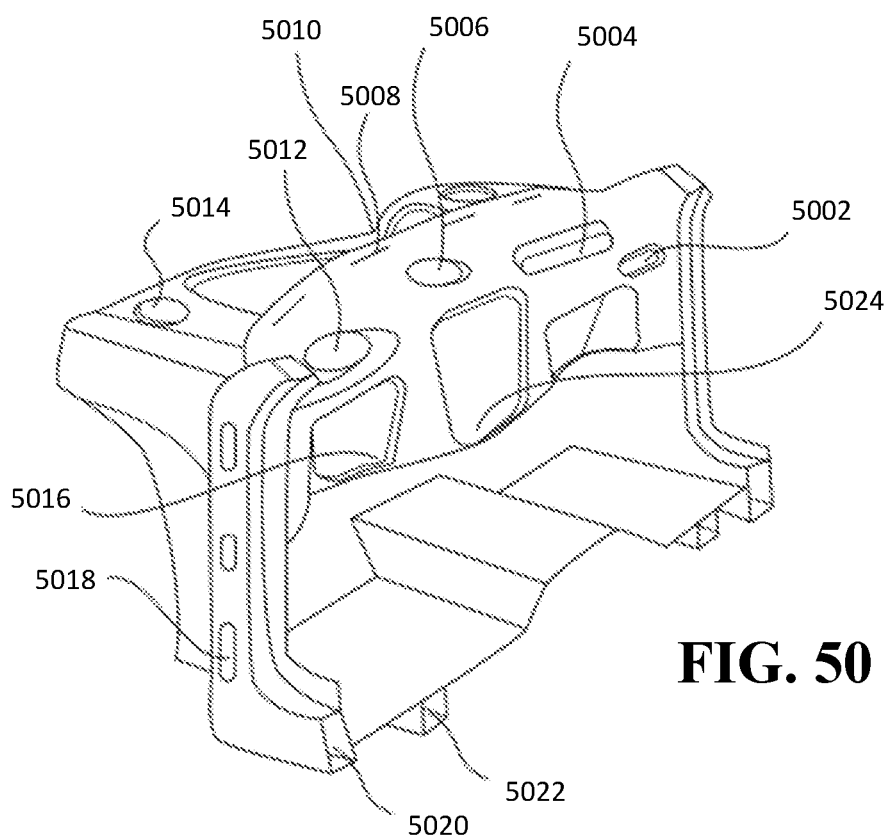
FIG. 50 is a perspective view of a 3-D printed dash in accordance with an aspect of the present disclosure.

FIG. 50 is a perspective view of a 3-D printed dash in accordance with an aspect of the present disclosure.

In contrast to conventional technologies, the AM mega-dash structure can be fully optimized for attachment of all key components that fit within the dash. The AM dash structure can be configured to include apertures and/or mounts for the various components of the assembly. FIG. 50 is a perspective view of a 3-D printed dash. The 3-D printed dash includes fittings for all key components. These include outboard vent aperture 5002, passenger airbag aperture 5004, speaker aperture 5006, defroster ducts 5008, cross brace 5010, cluster aperture 5012, strut mounting 5014, steering column mounting 5016, hinges 5018, sill section with seal flange 5020, rail 5022 and center stack aperture 5024. In one embodiment, the HVAC unit may be mounted on the front side of the dash.

The AM dash can also be optimized to assist the occupant in impact events. In particular, the AM dash may be designed in a manner such that a majority of the frontal impact forces may be transferred into the underbody structure rather than the dash itself. Such a design protects the occupant's head and other vital organ areas. Further, the AM dash may be appended to interior safety items including, for example, a steering column, knee blockers, pedals and airbags, The latter are mounted to the cross car section which is attached to a pillar/cowl side. The steering column can be made to give way in the event of a head strike.

Auto experts expect vehicle crashes to reduce in frequency over the next several years. This prediction is due in large part to the advances in autonomous/assisted driving technologies. As these technologies mature, active safety may enable further mass optimization of transport structures. The vehicles can in such case be made considerably lighter and can operate with greater efficiency. The ability to concentrate on other design considerations can in turn lead to advances in the overall design of vehicles of the transportation system in general. For example, automated vehicles may potentially result in a significant reduction in traffic congestion. More vehicles can be accommodated on roads due to the precise automation of movement and the automated coordination between vehicles. These vehicles can be made to move more smoothly as automated vehicle systems tirelessly monitor conditions and execute necessary instructions to prevent crashes from occurring. Furthermore, increased active safety may also enable vehicle structural technologies to result in more environmentally-friendly transport structures. This in turn may curb down on emissions and pollutants, and the AM nature of transports would enable the transportation industry to become more eco-friendly.

In another aspect of the disclosure, an advanced vehicle system is configured to enable hydrogen to be utilized relatively safely as a fuel. The major advantage of hydrogen is that it is a clean fuel as its product after combustion is water. However, hydrogen storage and transport is not easy and gives rise to many safety considerations. For one, hydrogen is highly flammable. Currently, hydrogen vehicles function using fuel cells. These cells generate electricity via the combustion of hydrogen and charge one or more batteries. The stored electrical energy, like any electric car, is thereupon converted into kinetic energy for moving the vehicle. In short, these batteries power electric motors to achieve motion.

In an embodiment, AM may optimize the layout of the vehicle systems by providing significant freedom with respect to hydrogen tank, battery and motor placement. Conventional packaging systems are constrained by available tooling. That is, in current fuel cell vehicles, packaging the hydrogen gas is a major obstacle. To obtain approximately the same range as a vehicle using a conventional internal combustion engine, a hydrogen fuel cell powertrain may require gas tanks 2-3 times larger by volume, even when the hydrogen gas is compressed to 10,000 psi. In addition to requiring high volumes and pressures, hydrogen fuel tanks are limited to using cylindrical ends to withstand the high pressure, unlike conventional gas tanks which may conform to package constraints. Additionally, these high pressure hydrogen tanks are expensive.

Figure 51:
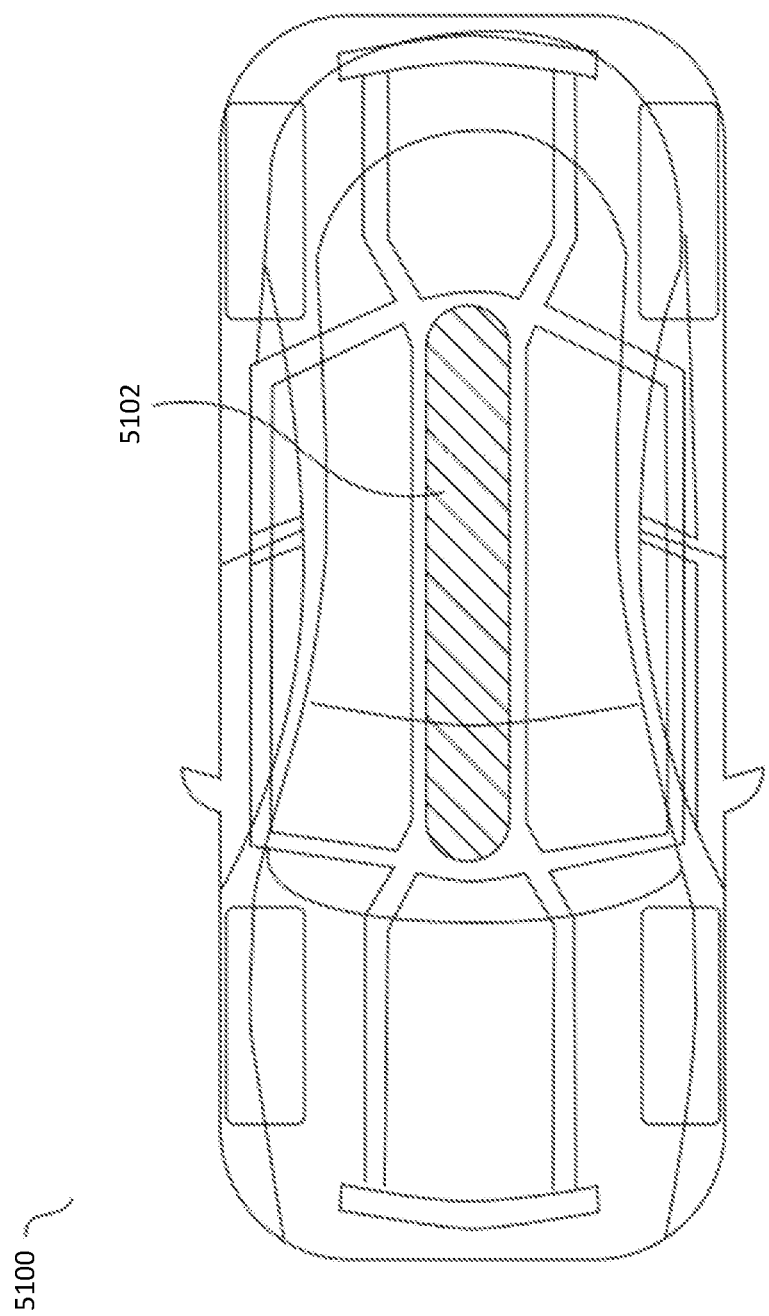
FIG. 51 is a plan view of a vehicle with a hydrogen fuel tank located along the vehicle center in accordance with an aspect of the present disclosure.

FIG. 51 is a plan view of a vehicle with a hydrogen fuel tank located along the vehicle center in accordance with an aspect of the present disclosure.

FIG. 51 is a plan view of a vehicle 5100 with a hydrogen fuel tank 5102 strategically located along the vehicle center. In this figure, the hydrogen fuel tank 5102 becomes a structural 'backbone' member, located in a void space within the package. This location has a number of advantages. First, it does not compromise the vehicle package and does not require significant changes in the layout of current vehicle systems. Instead, the tanks are packaged under the floor raising heel heights and/or cargo floor height. Second, the tank doubles as a backbone to the body structure, adding torsional stiffness to the body without additional weight. Third, the potential increase in size allows a reduction in pressure, speeding up fill times and reducing tank wall thickness. This feature is especially beneficial because high pressure filing equipment is both expensive and requires a long fill time. Fourth, the central location of the tank is the safest location.

Figure 52:
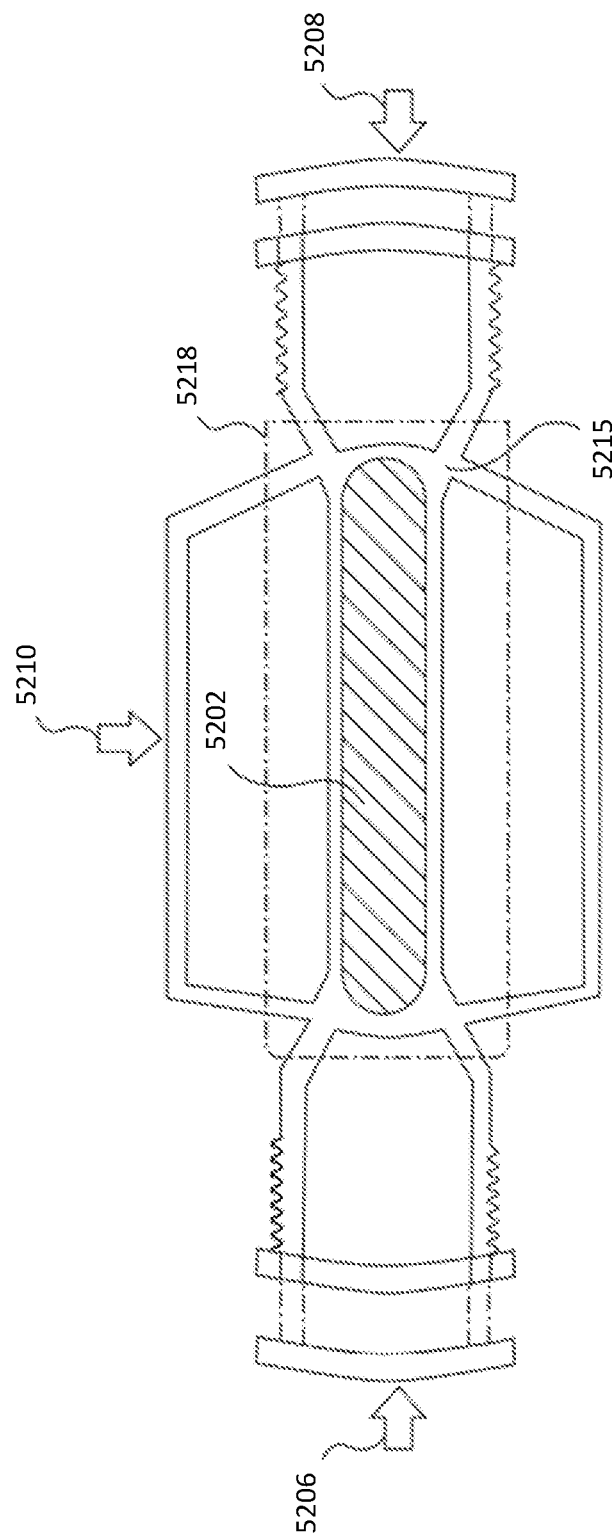
FIG. 52 is a plan view of an underbody crash structure in accordance with an aspect of the present disclosure.

FIG. 52 is a plan view of an underbody crash structure in accordance with an aspect of the present disclosure.

The underbody crash structure is illustrated in FIG. 52, which is a plan view of an underbody crash structure. As shown in FIG. 52, the frame 5215 surrounding the backbone structure means that the rectangle 5218 defines a rigid portion of the vehicle. The fuel tank 5202 is located along the vehicle center. This location places the tank at the furthest distance away from all exterior impact points and efficiently packages the fuel in a space that is often unused in many vehicles. Thus, a front impact 5206, a rear impact 5208, and a side impact 5210 are all as far away as possible from the backbone, which gives time for the transfer of energy due to an impact to dissipate via frame 5215 and other structures.

Figure 53:
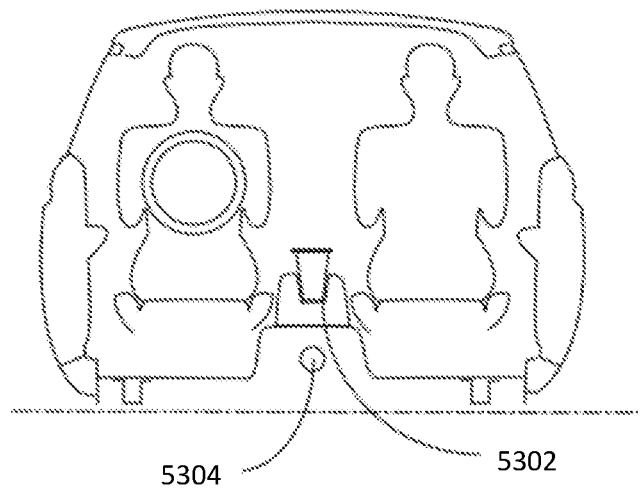
FIG. 53 is a rear view section of a vehicle package in accordance with an aspect of the present disclosure.

FIG. 53 is a rear view section of a vehicle package in accordance with an aspect of the present disclosure.

FIG. 53 is a rear view section of a traditional vehicle package. As can be seen, between the two occupants in this view is center console 5302, which is used for storage and driver interfaces. Below the center console 5302, a floor tunnel 5304 is conventionally used to house the prop shaft and/or the exhaust system.

Figure 54:
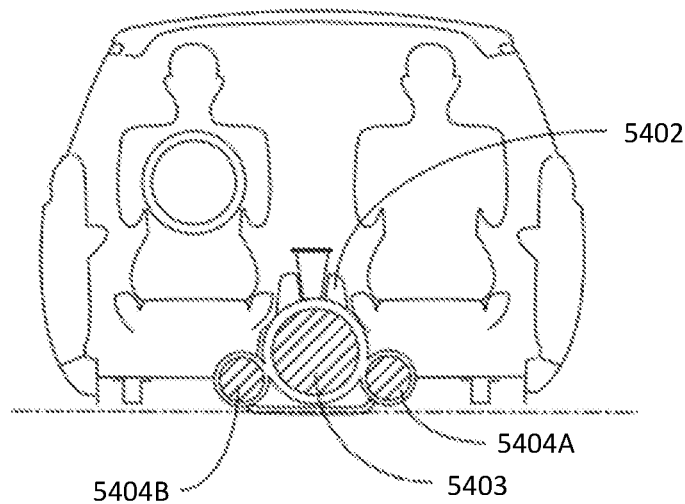
FIG. 54 is a rear view section of a 3-D printed backbone fuel tank in accordance with an aspect of the present disclosure.

FIG. 54 is a rear view section of a 3-D printed backbone fuel tank in accordance with an aspect of the present disclosure.

FIG. 54 is a rear view section of a 3-D printed backbone fuel tank. Center console 5402 remains in position between the occupants. Hydrogen fuel tank 5403, which may be 3-D printed, is used to fill a void space. Additional tanks 5404*a* and 5404*b* can be incorporated adjacent the backbone fuel tank if necessary. As can be seen from FIG. 54, the use of the 3-D printed backbone does not compromise vehicle packaging and results in a highly efficient use of space.

Experts generally do not expect the battery efficiency driven by hydrogen to go higher. Accordingly, in an alternative exemplary embodiment, the hydrogen tank may store liquid hydrogen for use directly in an internal combustion engine. With AM technologies, hydrogen storage tanks can be designed with reinforcements to satisfy safety requirements, such as thick metal walls and custom handles to move the tank while avoiding contact with the cold temperatures. 3-D printing allows for flexibility in the placement of vehicle systems. Coupled with a modular design, customers may simply extract a used hydrogen tank and pop a filled one right in. To address some of the design and efficiency concerns around internal combustion engines (ICEs) using hydrogen as a fuel, the engines manufactured using 3-D printing can be made more efficient than current engines designed to handle smaller amounts of liquid hydrogen at a time.

The previous description is provided to enable any person ordinarily skilled in the art to practice the various aspects described herein. Various modifications to these exemplary embodiments presented throughout this disclosure will be readily apparent to those of ordinary skill in the art, and the concepts disclosed herein may be applied to aluminum alloys. Thus, the claims are not intended to be limited to the exemplary embodiments presented throughout the disclosure but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An alloy, comprising:
   aluminum (Al);
   silicon (Si); and
   magnesium (Mg), wherein the alloy has a Si/Mg ratio greater than 0.13 and wherein a composition of the alloy comprises less than or equal to 20% by weight of Si and less than or equal to 10% by weight of Mg, such that the alloy is a eutectic or near eutectic alloy.

2. The alloy of claim 1, the alloy consisting essentially of Al, Si, and Mg.

3. The alloy of claim 1, wherein a yield strength of the alloy is at least 450 Megapascals (MPa).

4. The alloy of claim 1, wherein an elongation of the alloy is at least 4%.

5. The alloy of claim 1, wherein a material hardness of the alloy is at least 80 on a Rockwell hardness (HRB) scale.

6. The alloy of claim 1, further comprising at least one of silver, nickel, and manganese.

7. The alloy of claim 1, further comprising calcium.

8. The alloy of claim 7, wherein the alloy comprises between 0.1 and 0.45 percent by weight of calcium.

9. The alloy of claim 1, further comprising zirconium.

10. The alloy of claim 9, wherein the alloy comprises between 2 and 3.5 percent by weight of zirconium.

11. The alloy of claim 1, further comprising calcium and zirconium.

12. The alloy of claim 11, wherein the alloy comprises between 0.1 and 0.45 percent by weight of calcium and between 2 and 3.5 percent by weight of zirconium.

13. The alloy of claim 1, wherein the alloy is produced by an additive manufacturing process.

14. The alloy of claim 13, wherein the additive manufacturing process includes a cooling rate of at least 1000 degrees Celsius per second.

15. The alloy of claim 13, wherein the additive manufacturing process includes at least one of Laser-Powder Bed Fusion, Electron Beam Powder Bed Fusion, or Directed Energy Deposition.

16. The alloy of claim 1, wherein the alloy is a hyper-eutectic alloy.

17. The alloy of claim 1, wherein the Mg is greater than or equal to 7% by weight and less than or equal to 10% by weight of the alloy.

18. The alloy of claim 17, wherein the Si is greater than or equal to 5% by weight and less than or equal to 20% by weight of the alloy.

19. The alloy of claim 1, wherein the Mg is greater than 8% by weight and less than or equal to 10% by weight of the alloy.

20. The alloy of claim 19, wherein the Si is greater than or equal to 5% by weight and less than or equal to 20% by weight of the alloy.

* * * * *